(12) United States Patent
Podoleanu

(10) Patent No.: US 12,467,735 B2
(45) Date of Patent: Nov. 11, 2025

(54) APPARATUS AND METHOD FOR LIGHT SHEET IMAGING WITH OPTICAL COHERENCE GATING

(71) Applicant: University of Kent, Canterbury (GB)

(72) Inventor: Adrian Podoleanu, Canterbury (GB)

(73) Assignee: University of Kent, Canterbury (GB)

( * ) Notice: Subject to any disclaimer, the term of this patent is extended or adjusted under 35 U.S.C. 154(b) by 422 days.

(21) Appl. No.: 18/022,307

(22) PCT Filed: Aug. 19, 2021

(86) PCT No.: PCT/GB2021/052154
§ 371 (c)(1),
(2) Date: Feb. 21, 2023

(87) PCT Pub. No.: WO2022/038361
PCT Pub. Date: Feb. 24, 2022

(65) Prior Publication Data
US 2023/0324166 A1 Oct. 12, 2023

(30) Foreign Application Priority Data

Aug. 21, 2020 (GB) ........................ 2013069

(51) Int. Cl.
*G01B 9/02091* (2022.01)
*A61B 3/10* (2006.01)
(Continued)

(52) U.S. Cl.
CPC .......... *G01B 9/02091* (2013.01); *A61B 3/102* (2013.01); *A61B 5/0066* (2013.01);
(Continued)

(58) Field of Classification Search
CPC .............. G01B 9/02091; G01B 9/0209; G01B 9/02044; G01B 9/02034; G01B 9/02035; G02B 21/361; A61B 3/102; A61B 5/0066
See application file for complete search history.

(56) References Cited

U.S. PATENT DOCUMENTS

| | | | |
|---|---|---|---|
| 2008/0170204 A1* | 7/2008 | Podoleanu | G01B 9/02028 356/516 |
| 2013/0093998 A1* | 4/2013 | Bishop | G02C 7/027 351/208 |
| 2017/0138721 A1* | 5/2017 | Podoleanu | G01B 9/02027 |

OTHER PUBLICATIONS

Karim et al., "Combined optical coherence tomography and light sheet fluorescence microscopy for embryonic imaging," Proc. SPIE 11952, Multimodal Biomedical Imaging XVII, 1195202 (Mar. 2, 2022); https://doi.org/10.1117/12.2610091 (Year: 2022).*

(Continued)

*Primary Examiner* — Kara E. Geisel
*Assistant Examiner* — Jonathon Cook
(74) *Attorney, Agent, or Firm* — Cesari and McKenna, LLP

(57) ABSTRACT

Methods and devices are disclosed to perform depth resolved imaging using parallel lateral detection employing a photodetector block in a detection path that is substantially perpendicular to the direction of light excitation, with applications in microscopy of samples. The photodetector block either comprises a single 1D array of photodetectors or a 2D array of photodetectors. Methods and devices are disclosed to perform coherence gating in configurations of light sheet tomography, to enable simultaneous depth resolved measurements of structure and of index of refraction variation.

21 Claims, 23 Drawing Sheets

(51) Int. Cl.
*A61B 5/00* (2006.01)
*G01B 9/02* (2022.01)
*G02B 21/00* (2006.01)
*G02B 21/36* (2006.01)

(52) U.S. Cl.
CPC ....... *G01B 9/02035* (2013.01); *G02B 21/008* (2013.01); *G02B 21/361* (2013.01)

(56) References Cited

OTHER PUBLICATIONS

Bradu, A., et al., "Combining Confocal Microscopy and Optical Coherence Tomography for Imaging in Developmental Biology," SPIE Digital Library, Biophotonics: Photonic Solutions for Better Health Care, edited by Jurgen Popp, et al., SPIE, PO Box 10 Bellingham, WA, 98227-0010, USA, Proc. of SPIE, vol. 6991, May 2, 2008, pp. 69910K-1 to 69910K-7.

Wu, Chen, et al., "A Dual-Modality Optical Coherence Tomography and Selective Plane Illumination Microscopy System for Mouse Embryonic Imaging," Progress in Biomedical Optics and Imaging, SPIE—International Society for Optical Engineering, Bellingham, WA, USA, Diagnosis and Treatment of Diseases in the Breast and Reproductive System, edited by Mellissa C. Skala, Paul J. Campagnola, CCC Code: 1605-7422/17, Proc. of SPIE, vol. 10043, Feb. 8, 2017, pp. 100430L-1-100430L-4.

Ash, William M. III, et al., "Digital Holography of Total Internal Reflection," Optics Express, Optical Society of America, OSA, vol. 16, No. 13, Jun. 23, 2008, pp. 9811-9820.

Bradu, A., et al., "Combining Confocal Microscopy and optical Coherence Tomography for Imaging in Developmental Biology," SPIE, PO Box 10 Bellingham, WA 98227-0010, USA, vol. 6991, May 2, 2008, pp. 69910K-69910K-7.

Chen, Shichao, et al., "Swept Source Digital Holographic Phase Microscopy," Optical Society of America, Optics Letters, Letter, vol. 41, No. 4, Feb. 15, 2016, pp. 1-4.

"United Kingdom Search Report and Written Opinion," United Kingdom Application No. GB2013069.6, Date of Mailing: May 19, 2021, pp. 1-4.

"PCT International Search Report and the Written Opinion of the International Searching Authority" International Filing Date: Aug. 19, 2021, International Application No. PCT/GB2021/052154, Date of Mailing: Nov. 22, 2021, pp. 1-9.

Wu, Chen, et al., "A Dual-Modality Optical Coherence Tomography and Selective Plane Illumination Microscopy System for Mouse Embryonic Imaging," Progress in Biomedical Optics and Imaging, SPIE—International Society for Optical Engineering, Bellingham, WA, USA, vol. 10043, Feb. 8, 2017, pp. 100430L-100430L.

Zhang, Lei, et al., "Oblique Scanning Laser Microscopy for Simultaneously Volumetric Structural and Molecular Imaging Using Only One Raster Scan," Nature, Scientific Reports, Open, vol. 7, No. 8591, Aug. 17, 2017, pp. 1-11.

* cited by examiner 100-14

APPARATUS AND METHOD FOR LIGHT SHEET IMAGING WITH OPTICAL COHERENCE GATING

CROSS-REFERENCE TO RELATED APPLICATIONS

The present application is the National Stage of International Application No. PCT/GB2021/052154, filed on Aug. 19, 2021, which claims priority from British Patent Application No. 2013069.6 filed on Aug. 21, 2020, the disclosure of both of which should be understood to be incorporated into this specification.

FIELD OF THE INVENTION

The present invention relates to non invasive high resolution microscopy. The invention should allow imaging of early and adult stage embryos, animal models and tissue, microfluidic devices, roots, stems and leaves in agriculture, trabecular meshwork in glaucomatous eyes, aquatic microbes in their natural setting.

BACKGROUND AND PRIOR ART

Several technologies are known in the field of microscopy, and we will restrict the list to only those of interest to the current disclosure, such as confocal microscopy (CM), Light Sheet Microscopy (LSM) and optical coherence tomography (OCT).

LSM has progressed considerably in the last decade, especially based on fluorescence (FLSM), allowing precise tracking of multi-fluorescently labelled cells. LSM version based on scattering, denominated as light sheet tomography (LST), has known a much reduced number of reports in literature, such as S. L. Reidt, D. J. O'Brien, K. Wood, and M. P. MacDonald, "*Polarised light sheet tomography*," *Opt. Express* 24, 11239-11249 (2016). In comparison with flying spot technology, consisting in point scanning, the basic implementation of FLSM and LST employs full field imaging, using orthogonal orientation of excitation and observation of fluorescent light in FLSM and scattered light respectively in LST.

As shown in FIG. 1, in FLSM and LST, an optical source, 1', launches light into a sample launching block 2', that by using a cylindrical lens outputs an excitation wave 30' that at the focal length produces a sheet of light, 3', that illuminates an ultra-thin plane of a sample 4. An en-face image of the light sheet is conveyed by a forming image interface 5' on a photodetector block 6', usually a 2D camera, where also usually the camera plane is parallel to the plane of the light sheet 3', as presented in several review papers on LSM, such as "Light-sheet microscopy: a tutorial" by Olarte, Omar E., Andilla, Jordi, Gualda, Emilio J., Loza-Alvarez, Pablo, published in Advances in Optics and Photonics, Vol. 10, No. 1, (2018), 111-179, https://doi.org/10.1364/AOP.10.000111. A signal processing and display block 8' produces directly an en-face LSM image based on the image acquired by the camera.

One of the main advantages of FLSM is that it reduces the photon burden to the sample and due to elimination of the out-of-focus spread of light, avoids photobleaching. For fluorescence detection, filters are also used as known by those skillful in the art (not shown), intercepting the sample wave 40', scattered by the sample 4. Additionally, the use of a wide-field camera 5' for detection allows highly parallelized signal acquisition, on all its camera pixels. A single exposure is sufficient to record the entire plane and the pixels collect photons for the entire duration of the exposure time. In the LSM practice, light sheets are also produced by scanning a thin beam 30 perpendicular to the plane of FIG. 1. Technology of Airy and Bessel beams have been developed, to produce beams as thin as possible for as long as possible along the propagation axis, as for instance disclosed in the U.S. Pat. No. 10,353,188, "Airy beam light and airy beam light sheet microscope".

Another technology of interest here is confocal microscopy (CM). A CM microscope employs scanning the beam laterally over the sample and capturing back-reflected light through a pinhole to reject off axis and multi-scattered rays.

Another technology of interest is optical coherence tomography (OCT). An OCT system is constructed around a CM system, whereby creating a reference wave from the same optical source that excites the sample. This is superposed on the detector (mainly a single point photodetector), where interference takes place with the scattered wave returned by the sample. Lateral resolution is determined by the numerical aperture of the CM optics interface at the core at the OCT system. Axial resolution is determined by the coherence length, $L_c$, of the optical source used. For a bandwidth $\Delta\lambda$ and central wavelength $\lambda$, considering a Gaussian spectrum, the coherence length in air is: $L_c = 0.88 \lambda^2 / \Delta\lambda$. For time domain (TD)OCT and spectrometer (Sp) based OCT, $\Delta\lambda$, is the optical spectrum bandwidth of a broadband source (a superluminiscent diode, a supercontinuum laser, a tungsten lamp) whilst for swept source (SS) OCT, that employs a swept (tuning) laser (such as based on Fabry-Perot, frequency domain mode—locking, dispersive cavity, vertical cavity surface emitting lasers), $\Delta\lambda$ is the tuning bandwidth. In the current document we should make distinction between $L_c$ and the instantaneous coherence length of tunable lasers, that can exceed milli-meters and even several centi-meters, parameter that determines the axial range of swept source OCT.

Looking at FIG. 2a, in CM and OCT, all scattering centres along the excitation direction, illustrating only a few, labelled as a, b, c, d, return back-reflected rays along the same direction, to a single detecting photodetector. In the LSM sketch in FIG. 2b, light scattered at an angle, typical 90°, from scattering centres, a, b, c, d, goes mainly to separated detecting pixels on the camera sensor, a', b', c', d', respectively. In CM and OCT, to separate the contributions from different depths where points a, b, c, d are, either focus selection or coherence gating is used. There is no such need in LSM, contributions are already laterally separated, giving LSM (FLSM and LST) both elegance and simplicity. In CM in FIG. 2a, to separate contributions from the points a, b, c, d, a high numerical aperture (NA) microscope objective, 22' is needed. In FIG. 2b, separation is simpler obtained, directly, along the lateral size of the camera along X-axis, for a similar NA of a microscope objective used in front of the camera (not shown). A small NA 22' microscope objective will normally secure 1-10 micrometers lateral resolution, in FIG. 2a along Y-axis and Z-axis but of much extended axial resolution interval, tens to hundreds of micrometers. In FIG. 2b, a small NA 22' microscope objective gives a thickness of the beam 30' of 1-10 micrometers. In this way, a problem for CM in FIG. 2a to perform depth separation of light from scattering centres a, b, c, d is simply addressed in FIG. 2b, where depth coordinate along X in FIG. 2a becomes lateral coordinate along X in FIG. 2b.

However, a problem for full field systems (using parallel photodetectors in an array, or a camera) in FIG. 2b is to distinguish between scattering centres positioned at different depths along axis Z, that is a similar problem faced by CM in FIG. 2a. For this problem, LSM has provided another elegant solution, a thin sheet of light in the plane X,Y, with a small thickness along Z. Tremendous research effort has been put in LSM into controlling the thickness of the light sheet, replacing the excitation beam created by cylindrical or Powel lenses with Bessel beams and Airy beams.

In a nutshell, LSM is better than CM for two reasons: 1. problem of depth resolved separation is switched from depth to lateral direction (of a display device such as a camera) and 2. Problem of axial (depth) resolution along the detection path, i.e. axis of detection (Z) in LSM is addressed by making the excitation sheet thin. In other words, the two resolution parameters, determined by a single microscope objective in a CM instrument, along lateral and axial directions are now separated in LSM, a microscope objective, preparing the light sheet dictates the axial resolution in the LSM detection path, which could reach thicknesses less than a few microns, while the microscope objective in the detection path is only responsible for the lateral resolution (1-10 microns).

However, in comparison with CM, due to changing from a scanning spot (flying spot method, that irradiates a single point at a time) to reading all pixels in parallel with the camera (full field), confocality is jeopardised (no way to use small pinholes) and blur is created by out of depth of focus rays. In addition, cross talk between pixels is present, due to off-axis rays coming from scattering centres in the sample outside the scattering centres conjugated to each camera pixel. Therefore, structured illumination was added to the excitation path that reduced some of the blur in selective plane illumination microscopy (SPIM) versions of SLM. This is based on the fact that intensity distributions that cannot be modulated become zero or are attenuated in the final image obtained by 3 phase shifted patterns along Y in FIG. 1.

In conventional fluorescence microscopy based on FIG. 2a (filters now shown), structured illumination improves the axial resolution. Instead, in FIG. 2b, structured illumination allows discriminating against specimen-induced blur. Specimen- and aberration-induced blur are removed or attenuated, that improve contrast and resolution as documented in Tobias Breuninger, Klaus Greger, and Ernst H. K. Stelzer, "Lateral modulation boosts image quality in single plane illumination fluorescence microscopy", 32(13), Optics Letters, 1938-1940, (2007). As a first observation for the development of this invention is that there are only a few reports on LST while many more on LSFM. Rejection of excitation is easier in FLSM, as a filter eliminates the excitation light and another filter favours the fluorescent emission from sample. Optical imaging applied to thick tissue is marred by scattering and therefore, to improve sensitivity and specificity, improved imaging techniques are necessary. For highly scattering samples, structured illumination is insufficient to improve contrast and resolution in LST.

Also, even in an optically cleared sample, the thickness of the light sheet is rarely diffraction limited, since it is generally broadened by effects such as residual scattering or aberrations, which lead to both degradation in axial resolution and to introduction of out-of-focus background.

Therefore, there is a need to extend LSM to image highly scattering samples, with no need to inject a dye into the sample, ie to extend LST studies to in-vivo studies, studies that cannot tolerate invasive injections.

Also, the method, using a single wave of light in CM and LSM is insensitive to movements inside the sample imaged.

There are important time varying processes whose rate of variation in cells can deliver information on their liveliness. Movement, flow and internal index of refraction variations cannot be quantified with a single wave. Therefore, there is a need to create a reference and by comparison of phases between the waves scattered and the reference wave, to obtain microscale information on the intimate movements or phase changes in the sample observed, ie to establish phase sensitive measurements.

LSM has taken its advances from the advantages presented above due to parallel detection using a camera and simplicity in providing axial depth resolution. However, majority of development around LSM were directed towards reducing the cross talk and blur in the image, consequence of departing the detection path from an ideal CM system. If some of the confocality could be restored, then better contrast and better resolution can be achieved when inspecting thick, highly scattering samples, at oblique orientation from the direction of excitation.

Therefore, there is a need for devising a method and creating devices to restore confocality at least in one direction, to reduce the multiple scattering contributing to blur, to improve contrast and resolutions.

The weak signal demands cameras working at more than 12 bits, that in general limits the speed of acquiring data volumes well below that required by the study of fast evolving phenomena such as cardiac movement in small animal models and fast spread of spray droplets in sensing. Therefore there is a need for fast delivery of LSM-like images.

In order to perform better light sheet imaging without any dye, enable phase imaging with all its consequences in opening new avenues in microscopy, improve depth selection, contrast, enlarge the size of the image, speed up the process of imaging, the present invention employs the principle of interference-based coherence gating. Light sheet configurations were mainly used in combination with fluorescence, while OCT is totally insensitive to fluorescence. On the other hand, OCT is based on interference, where the interference signal is given by the product of amplitudes of the object and reference wave, giving a boost to the interference signal obtained in comparison to the case where the object signal alone was used, such as in CM and LSM. Such boost can allow imaging with less sensitive cameras.

By adding the heterodyne mechanism of interference to LSM, output signal can be made phase sensitive, with enhanced capability in rejecting multiple scattered light, especially useful in examining highly dense scattering specimens in biosciences. In addition, the principle of heterodyne brings novel capability in terms of quantifying movement, flow or internal index of refraction variations, not possible to be achieved by CM, FLSM and LST. The heterodyning principle, governing the process of interference, allows phase relative and frequency relative measurements in respect to a phase and respectively frequency of a wave taken as a reference, such as the ubiquitous reference beam in any OCT system. This allows sensitivity to movement of scattering centres, via Doppler shifts and speckle fluctuation, opening functional characterisation in top of morphology imaging. Such a principle has enabled angiography with no dye, termed as OCT-A, with commercially available OCT instruments for ophthalmology. Related to this, interest has grown into sensing dynamic vibration of living cells. Only living tissue executes tiny vibrations, that could be used as a clear evidence of liveliness. If imaging can be made sensitive to such tiny structural modifications in time, then regions in the images so obtained can be spatially mapped and quantified and can also be used as another factor in gating the spatial distribution of the signal, contributing to improvement in the lateral resolution in microscopy. Such a phenomenon cannot be observed in LSM (either LST or LSFM).

Therefore, there is a need for devising methods and devices to add heterodyne detection with depth resolved capability, ie coherence gating to a conventional LSM architecture. Now, referring to prior art OCT, excitation and detection are mainly colinear.

1. Reports such as that of Pyhtila, John W. et al., "Rapid, Depth-Resolved Light Scattering Measurements using Fourier Domain, Angle-Resolved Low Coherence Interferometry," Optics Express, vol. 12, No. 25, December 13, 6178-6183, 2004, have indicated that applying coherence gating to scattered light at off set angles from the excitation provides information on structure and function of organs and tissue. The scattering depends on discontinuity in the index of refraction, size and shape of scattering features. For anisotropic structures, performing OCT along a detection direction different from excitation direction can open novel perspectives in diagnostic of tissue and material characterisation, recovering size and shape information about the scattering features. Therefore, it would be interesting to perform OCT at directions differing from the excitation direction.
2. Another disadvantage of performing OCT along the excitation direction is collection of a strong specular reflected signal from the sample surface. This creates noise and autocorrelation artefacts in the OCT images. Therefore, this is a second reason to perform OCT at directions differing from the excitation direction.
3. Path variations along the depth coordinate in OCT images present an entanglement of the geometric length and index of refraction. Geometric length is important on displaying patterns of features, but the index of refraction may contain functional information. Denser structures have larger values of the index of refraction, can show strengthening in stems and roots in plants, development of embryos, and discontinuities may suggest cellular division. Therefore, it would be important to measure the local index of refraction and its variations.
4. The spatial distribution of scattering centres is also affected in OCT by the height of the sample. This means that an en-face image, at a constant depth is distorted by the topography of the sample and can only be generated if the sample top is flat and perpendicular to the optic axis. Therefore, there is a need for devising methods and devices to disentangle the depth from the topography of the sample, important especially when the sample has similar sizes in all directions.
5. In conventional OCT and CM, light scattered exactly back is assessed only, and the effects of forward scattering, important in assessing the size and density of scattering centres cannot be evaluated, important in characterising materials and tissue.

The benefits of heterodyne detection due to light interference are already applied in flying spot microscopy (or scanning laser microscopy). For instance, inclined, tilted scanning via a microscope objective was reported, such as in the paper "Oblique scanning laser microscopy for simultaneously volumetric structural and molecular imaging using only one raster scan", by L. Zhang, A. Capilla W. Song, G. Mostoslavsky & J. Yi, published in Scientific Reports, 7: 8591, DOI:10.1038/s41598-017-08822-0, where spectral domain OCT produces cross section OCT images of light collected via scanning. However such architectures are limited to observation of small microscopy samples and requires control of aberrations due to use of lateral parts of lenses. Due to using scanning, simplicity of acquiring an image along the excitation direction using an array of photodetectors, a camera, such as in conventional LSM, is not possible.

Digital holography is based on interference and mostly used on thin samples. In the paper "Digital holography of total internal reflection," by W. M. Ash III and M. K. Kim, published in Opt. Express 16, 9811-9820 (2008), https://doi.org/10.1364/OE.16.009811, interference using a coherent laser was used to probe total internal reflection of a sample placed in one interferometer arm. The use of total internal reflection, based on leaky modes, limited the depth penetration in the sample to depths very close to the supporting interface, restricting in this way the method to cells and small droplets. Due to using a coherent laser, no depth resolved process could be implemented. To obtain interference from all lateral pixels of the sample, a highly coherent laser was used to secure interference from all lateral points of the sample. Also, no advantage could be taken of sheet projection like in conventional LSM due to the peculiar excitation of evanescent waves.

In the paper "Swept source digital holographic phase microscopy," published in Optics Letters 41, 665-668 (2016), https://doi.org/10.1364/OL.41.000665, en-face phase images of a sample were evaluated based on swept source spectral domain imaging. The sample was placed in transmission, hence there was no way to perform depth resolved imaging and the transmission configuration prevents a light sheet configuration architecture again. Spatial differentiation of scattering is not possible, as all scattering waves are collected along a single direction.

Hence, there is a need for devising methods and devices to combine heterodyne detection with depth resolved capability, to enable imaging of thick and larger size samples, preferably in architectures that allow pixel to pixel correspondence between the conventional LSM architecture and coherence gated full field images.

SUMMARY OF THE INVENTION

There is provided an apparatus for imaging a sample, comprising:

an optical source of coherence length $L_c$ in air, where Lc is less than 20 microns;

a photodetector block, wherein the photodetector block comprises an array of H photodetectors;

wherein the optical source is arranged to drive a first optical splitter with two outputs, where the first optical splitter is arranged such that, at its 1st output, an excitation sample wave is sent towards an excitation launcher, wherein the excitation launcher is arranged to launch the excitation sample wave along an axis X towards the sample to be imaged, irradiating H scattering centres $x_1, x_2, \ldots x_h, \ldots x_H$ in the sample, and where the spatial extension of the excitation sample wave along its transversal direction, w, is less than $11L_c$, wherein from each scattering centre $x_h$, the excitation sample wave is scattered into a component scattered sample wave along a detection path, where the component scattered sample wave travels a length SL(h) up to pixel h of the array of the photodetector block;

where the fraction of the excitation sample wave intercepted by the scattering centre h, leading to the scattered sample wave, represents a component of the excitation sample wave, with h=1, 2 ... H, where each such component travelled a length EL(h) from the first optical splitter up to scattering centre at xh, where the detection path is along an axis Z that makes a detection angle that is substantially perpendicular to the direction of the excitation wave, X, and where the axis Z is also along the depth direction in the sample, a forming image interface placed along the detection path, conveying the H component scattered sample waves onto the photodetector block, where the photodetector block is oriented substantially perpendicular to the detection path, where the forming image interface forms an image of each scattering centre in the sample at $x_1, x_2, \ldots x_h, \ldots x_H$ onto respective photodetectors $1, 2, \ldots h, \ldots H$ of the array of the photodetector block, and where due to travelling through the sample, due to the optical properties of the sample and due to the geometrical distance between scattering centres $x_h$ and $x_{h+1}$ along axis X, the component excitation sample wave travelling from the scattering centre at xh−1 to the scattering centre at $x_h$ encounters an optical path length variation $\delta EL(h)$ given by the product of the distance between $x_{h-1}$ and $x_h$ multiplied by n, where n is the index of refraction of the sample, and where the first optical splitter is arranged such the 2nd output of the 1st optical splitter delivers a reference wave that is conveyed towards the photodetector block via a reference block, where the reference block is equipped with a device to adjust the length of the reference wave travelled RL(h) from the point of splitting in the 1st optical splitter through the reference block up to each photodetector h of the photodetector block, and where the optical path difference OPD(h) between the path lengths EL(h)+SL(h) and RL(h) differ from photodetector h to photodetector h+1, where the variation of OPD(h) from one edge of the photodetector block to the other measured within the detection plane, |OPD(H)−OPD(1)|, is greater than $50L_c$, and where the optical source, the 1st optical splitter and the two paths lengths travelled by each component excitation sample wave plus each component scattered sample wave up to the photodetector h on one side and the path travelled by the reference wave up to photodetector h on the other side, form a two beam interferometer for each photodetector h, where such H interferometers present similar optical coherence tomography axial resolution intervals of $L_c$, where the apparatus further comprises:

a signal processing block for processing the signals delivered by the H photodetectors of the array, wherein the signal processing block is configured to carry out a procedure to process the interference signal due to superposition of scattered sample waves and reference wave on each photodetector h, where the signal processing block produces a raw en-face image of scattering centres $x_1, x_2, \ldots x_h, \ldots x_H$, whose intensity for each photodetector in the image is modulated by the strength of interference of signal from respective photodetectors $1, 2, \ldots h, \ldots H$ and where the depth resolution of the en-face image along Z is due to the combined effect of the thickness of the excitation sample wave, w, and of the coherence length in the sample, obtained by dividing the coherence length in air, $L_c$, by the index of refraction n of the sample.

Substantially perpendicular means between about 85 degrees to about 90 degrees.

In an embodiment, the array of photodetectors of the photodetector block is either:
  a one-dimensional (1D) array of photodetectors, $(1, 2, \ldots h, \ldots H)$; or
  a two-dimensional (2D) array of photodetectors (H, V),
where in both cases each photodetector represents a pixel.

The photodetector block either comprises a single 1D array of photodetectors or a 2D array of photodetectors.

In an embodiment, the reference block prepares a tilted reference wave reaching the photodetector array by an angle θ, where the direction of the reference wave is within the plane formed by axis X and the detection path Z, and where the forming image interface creates the image of line of scattering centres $x_1, x_2, \ldots x_H$ with a magnification m, where sin θ=n/m, where n is the average index of refraction of the sample and where by adjusting the angle θ the RL(h) variation is adjusted to match the EL(h) variation along the row of photodetectors $1, 2, \ldots H$.

In an embodiment, the excitation launcher comprises a cylindrical lens, that is used to generate a light sheet propagating through the sample along X, extending along an axis Y substantially perpendicular to axis X, and substantially perpendicular to axis Z, creating V distinctly resolved lines of light along axis X at positions $y_1, y_2, \ldots y_v, \ldots y_V$ along axis Y and where different sets of scattering centres $x_1, x_2, \ldots x_H$ along each such line at $y_v$, scatter waves, $SW(y_1), SW(y_2), \ldots SW(y_v) \ldots SW(y_V)$ each composed of H scattered sample waves and in order to intercept the V lines of scattered sample waves, the apparatus further comprises a 2D camera array of (H,V) photodetectors,
  where the forming image interface projects each line of scattered sample waves from line $y_v$, on a different line v of the array of photodetectors part of the 2D camera, where H and V are positive integers and each is greater than or equal to 2.

Substantially perpendicular means between about 85 degrees to about 90 degrees.

In an embodiment, the 2D camera is placed behind a fibre bundle.

In an embodiment, the excitation launcher comprises: (i) an excitation optics interface that prepares a thin excitation beam or prepares an Airy or a Bessel excitation beam, and (ii) an excitation scanner of light from the excitation optics interface, that scans the excitation sample wave in the Y direction, wherein the Y direction is substantially perpendicular to axis X and axis Z, creating V distinctly resolved lines of light extending along X at scanned positions $y_1, y_2, \ldots y_v, \ldots y_V$, and where different sets of scattering centres $x_1, x_2, \ldots x_H$ along each such line at $y_v$ along X, scatter distinct waves, $SW(y_1), SW(y_2), \ldots SW(y_v), \ldots SW(y_V)$, each composed of H scattered sample waves, and in order to intercept the V lines of sample waves, the photodetector block further comprises V 1D arrays each of H photodetectors in the form of a 2D camera array of (H,V) photodetectors, where the forming image interface projects the scattered waves from scattering centres along line $y_v$, on a different line v of 1D array of photodetectors part of the 2D camera, where H and V are positive integers and each is greater than or equal to 2.

Substantially perpendicular means between about 85 degrees to about 90 degrees.

In an embodiment, the excitation launcher comprises: (i) an excitation optics interface that prepares a thin excitation beam or prepares an Airy or a Bessel excitation beam, and (ii) an excitation scanner of light from the excitation optics interface, that scans the excitation beam in the Y direction substantially perpendicular to axis X and axis Z, creating V distinctly resolved lines of light extending along X at scanned positions $y_1, y_2, \ldots y_v, \ldots y_V$, and where different sets of scattering centres $x_1, x_2, \ldots x_H$ along each such line at $y_v$, scatter distinct waves $SW(y_1)$, $SW(y_2)$, ... $SW(y_v)$, ... $SW(y_V)$, each composed of H scattered sample waves, and in order to incept the successive lines of scattered sample waves, the apparatus supplementary comprises a de-scanning scanner in the forming image interface to project each of the V scattered wave for each line $y_v$ of scattered waves onto the photodetector block, where H and V are positive integers and each is greater than or equal to 2.

In an embodiment, the de-scanning scanner and the excitation scanner are provided by the same scanner using a mirror with two facets, one for the excitation sample wave and the other for the reference wave.

In an embodiment, the optical source is a swept source, and where the coherence length $L_c$ is inversely proportional to its tuning bandwidth, and where the signal processing block comprises a storage for the signal delivered by each h pixel obtained from all 2R camera frames acquired during one frequency sweep of the swept source, where the storage is used to create from all stored values a pixel composed signal for each pixel h with 2R samples, and where either:
  (i) the procedure of the signal processing block is Fast Fourier Transformation and the signal processor comprises of a Fourier transform block that performs a Fourier transform over the pixel composed signal to produce a reflectivity profile in depth A-scan covering for each h, a number of R OPD(h) values along the coordinate Z,
  or
  (ii) the procedure of the signal processing block is Complex Master Slave OCT and the signal processor comprises of a Complex Master Slave processor for each h, R OPD(h) values out of the set of 1, 2, . . . R samples in depth along the Z axis.

In an embodiment, the optical source is a broadband source, where the coherence length $L_c$ is inverse proportional to its bandwidth, and where the signal processing block controls repetitions of image collection for at least 3 different OPD values differing by less than a central wavelength of the optical source obtained by actuating on a device to adjust the length of the reference wave. In an embodiment, a 2nd reference wave is produced from the optical source by using a 2nd optical splitter, that conveys a 2nd reference wave and where the sample returns back-reflected light via the excitation scanner and the 1st splitter towards a 3rd splitter to produce interference between the backreflected wave from the sample and the 2nd reference wave in a 2nd OCT system equipped with a point photodetector, and where the signal processing block combines the information from the sample wave towards the photodetector block with the information provided by the point photodetector.

There is provided a method to produce coherence gating images of a sample, the method comprising:
  using an optical source of coherence length $L_c$ that is split in a splitter into an excitation sample wave and a reference wave,
  using at least a 1D array of photodetectors h=1, 2 . . . H in a camera, oriented perpendicular to a detection direction, and where the excitation sample wave is launched towards a sample with scattering centres along an excitation direction substantially parallel to the camera, to excite the sample, and where the excitation direction is substantially perpendicular to the detection direction, where the detection direction and excitation directions define a detection plane and where the scattering centres in the sample generate scattered sample waves along the detection direction intercepted by a forming image interface that conveys an image on the camera of the scattering centres in the sample and where due to the non-zero value of the angle between the detection direction and the excitation direction and due to the index of refraction of the sample, the length travelled by the excitation sample wave through the sample varies by a differential path |x'−x| from a scattering centre at x to the next at x', where the scattering centres at x and x' are conjugate via the forming image interface with camera photodetectors h and h+1 respectively, from a camera photodetector h to next, h+1 in its row placed in the detection plane, and where the signals produced by each camera photodetector h are subject to coherence gating, that is implemented by using a reference wave superposed on the camera, and where for each photodetector h, an optical path difference OPD(h) can be defined between: (i) the length of the sample wave from the splitter up to photodetector h made from the length of the excitation sample wave up to the scattering centre x and the length of the scattering sample wave from the scattering centre up to photodetector h and (ii) the length of the reference wave from the splitter up to photodetector h, and a signal processing procedure is applied to the signal from each photodetector to: (i) evaluate its strength of interference versus OPD, (ii) integrate the interference signal along OPD axis to deliver an overall strength of interference signal from each photodetector and (iii) produce an interference 1D en-face image of pixels, with a pixel for each photodetector by using for each pixel signal, the overall strength of interference so evaluated for each respective photodetector and where the thickness of the en-face image is determined by a combination of two factors, the thickness of the excitation sample wave w and the coherence length in the sample, Lc/n, where n is the index of refraction of the sample.

In an embodiment, the interference en-face image is assembled from the overall strengths of interference for all H pixels, irrespective of the EL(h) value imprinted by the variation of path length from one pixel to the next.

In an embodiment, elementary en-face 1D OCT images are each acquired for a different OPD(h), and where the image for OPD(h−1) is deducted from the image for OPD(h) to obtain an en-face corrected OCT image with brighter pixels in the image mainly corresponding to photodetectors in the row h, and where the interference en-face image is assembled by superposing all en-face corrected OCT images for all H pixels.

In an embodiment, a V number of 1D array of photodetectors h=1, 2 . . . H are used in a 2D camera of (H,V) photodetectors with v=1, 2, . . . V and where the sample is excited with a light sheet parallel with the camera plane and where an interference 2D en-face image of pixels, with a pixel for each photodetector is assembled from the supplementary 1D en-face interference images for each v.

In an embodiment, the signal processing procedure uses a reference wave inclined on the camera at an angle θ, where sin θ=n/m, where n is the average index of refraction of the sample and m the magnification of the forming image interface creating an image of the sample on the camera. In an embodiment, the optical source is a swept source, and where a pixel composed signal for each camera pixel is created from the pixel values of all camera frames acquired during one frequency sweep of the swept source, to produce full field swept source OCT images from the sample, obtained by processing the pixel composed signal for each pixel.

In an embodiment, the excitation sample wave is being scanned in a plane intersecting the sample, that sequentially covers line by line a sheet of light through the sample using a first scanner and where the camera comprises a 1D array of photodetectors, and a second scanner is used inside the forming image interface in such a way as to produce a stationary image of the scattered sample wave projected over the camera irrespective of the tilt of the first scanner.

In an embodiment, the signal processing procedure applied to cope with the path variation from one pixel to the next employs either: (i) a Fast Fourier Transform (FFT) method to process the pixel composed signal for each pixel, where from one pixel in the camera to the next along the excitation direction, the A-scans resulting by FFT are shifted relatively in depth by the differential path D, or (ii) a Complex Master Slave (CMS) method using a set of masks to process the pixel composed signal for each pixel, where from one pixel in the camera to the next along the excitation direction, the set of masks input to the CMS method is advanced by $\delta EL(x'-x)$.

In an embodiment, the information on the pitch of pixels in the camera is combined with the optical delay measured by the procedure used by the signal processing block to infer information on the index of refraction of the sample.

In at least some embodiments, by deforming the sample in front of the forming image interface, expansion of optical path inside the sample allows better axial resolution than $L_c/n$, where n is the index of refraction of the sample.

In a first aspect, the invention provides embodiments and methods to superpose a reference wave on the scattered wave emanated from the sample traversed by the light sheet, for a variety of versions of light sheet configurations otherwise used in fluorescence microscopy and light sheet tomography. In this aspect, the present invention discloses devices and methods to improve depth selection, ie the axial resolution, based on low coherence interference. A coherence gate is added based on principles of optical coherence tomography (OCT). This not only improves the axial resolution, but contributes to deblurring of images around the scattering centre where the path along the sheet turns towards camera, at 90°. By adding axial coherence gating, better selection of photons is achieved leading to less blur due to multiple scattering. In addition, for an aberrated light sheet, whose thickness increases especially at edges, coherence gating becomes the dominating factor in providing depth selection. The invention allows use of deliberately made relatively thick light sheets in comparison with conventional LSM, relaxing the spatial conditioning of the excitation beam. The invention adds coherence gating along the direction perpendicular to the light sheet, of a width given by the coherence length $L_c$. Using broadband optical sources or broadband tuning band lasers can lead to a few microns and submicron spatial coherence gating. By using suitable signal processing, coherence gating can be used as an equivalent tool to that provided by using a thin light sheet, ie the axial resolution is determined by two factors, the light sheet thickness and the coherence gate width.

In a second aspect, the invention discloses systems and methods to allow the operation of a coherence gate in optics configurations where the excitation and observation directions make large angles, here usually 90 degrees. In such configurations, the sample wave consists in two parts, a first part being an excitation sample wave up to a scattering centre in the sample wherefrom the sample wave continues with a second part, scattered sample wave that is scattered by the scattering centre. The path of the second part is oriented at a large angle (usually at 90 degrees) in comparison with the path of the first part. Systems and methods according to the invention are disclosed that disentangle the two contributions to the path length of the sample wave and decode its path length variation in order to produce LSM like images based on coherence gating. In one implementation, the main bulk of the path length variation due to the travel of the excitation sample wave through sample is compensated for by producing a reference wave whose length is advanced in steps matching the excitation path length variation, from one pixel in the camera to next in a row parallel to the excitation direction.

In a third aspect, the invention discloses systems and methods to decode the variation of path length of the sample wave from one lateral pixel to the next of a camera in a photodetector block, by decoding the signal based on a Fast Fourier Transform (FFT). Using FFT, reflectivity profiles (A-scans) versus optical path difference (OPD) (or axial direction) are obtained from signals delivered by successive pixels of the photodetector block, where for each photodetector in the block, a pixel corresponds in the final image created. Then relative shifts of A-scans along the OPD axis are applied, to synchronise coherence gating for as many pixels as possible.

In a fourth aspect, the invention discloses systems and methods to decode the variation of path length of the sample wave from one lateral pixel to the next of a camera in a photodetector block, by decoding the signal based on a Master Slave protocol with sliding masks. A signal processing method, compatible with a single depth or a restricted range of depths is disclosed making use of the Master Slave OCT principle.

In a fifth aspect, an additional novel mode of scanning the sample in depth in light sheet imaging is implemented, that eliminates the need of prior art to translate the sample along Z, at least for a limited axial range along Z. Here coherence gating is used to produce volume imaging of the whole sample with no need to move the sample along a direction perpendicular to the light sheet plane, direction Z. Therefore, depth resolved en-face OCT images can be delivered quicker than in conventional LSM, leading to quicker volume imaging.

In a sixth aspect, the invention provides a method and signal processing blocks to deliver a reflectivity value by processing signal from each camera pixel that can be used to assemble an en-face OCT image in pixel to pixel correspondence with the equivalent image delivered by the LSM set-up at the core of the novel embodiments.

In a seventh aspect, the invention provides systems and methods to reinstate confocality in LSM along the lateral direction perpendicular to that of the excitation length direction, when producing depth resolved images of the sample excited by light sheets.

In an eighth aspect, the invention provides a method and systems for dual inspection heads, suitable for relatively large samples and thick sheets. In combination, dual heads are employed to disentangle the two contributions to the sample wave delay, coming from the excitation path and from the scattered wave path.

In a ninth aspect the invention provides systems and methods to measure the index of refraction or its spatial variations in the sample in at least one direction.

In a tenth aspect, the invention provides a method and systems to make use of structured illumination while employing coherence gating, for further reduction of the blur and for contrast enhancement.

In an eleventh aspect, the invention provides a method and systems for no dye angiography, flow measurements and mapping. This includes speckle variance, amplitude decorrelation, or phase decorrelation, that enhance sensitivity to movement and allows display of vasculature, according to OCT Angiography (OCTA) as well as en-face images of vibration dynamics from the sample.

In a twelfth aspect, a method is presented to handle the sample, by employing effects of its topography to increase the separation of scattering centres in depths in the A-scan, applicable to resolve A-scan peaks due to scattering centres in the sample that are physically separated by less than the OCT axial resolution interval.

In a thirteenth aspect, the invention provides systems and methods that while capable to perform OCT in light sheet microscopy architectures, present compatibility with other regimes of operations, such as non OCT, to produce in pixel to pixel correspondence with OCT images, LSM images, or fluorescence, Raman or stimulated emission depletion (STED) microscopy images, as well as with architectures that from the same excitation light produce OCT imaging from the same direction as the excitation, as in conventional OCT.

In a fourteenth aspect, the invention provides systems and methods to evaluate the forward scattering in a sample, not possible to be achieved using conventional OCT, CM or digital holography based on backscattering or working in transmission.

For simplicity, we will refer to the image produced by the invention as a light sheet optical coherence microscopy (LSOCM) image. This is an en-face oriented image of the light sheet, of similar structure to that delivered by the LSM alone, with the added advantages of coherence gating. As further disclosed below, a LSOCM image can be obtained from either several en-face OCT images or from assembly of OCT A-scans.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which preferred embodiments of the invention will be illustrated by ways of example. It is expressly understood, however, that the drawings are for the purpose of illustration and description only and are not intended as a definition of the limits of the invention. Embodiments of this invention will now be described in association with the accompanying drawings in which:

FIG. 16' illustrates the A-scans in FIG. 16 showing trailing edges.

DETAILED DESCRIPTION OF THE PREFERRED EMBODIMENTS

Figure 1:
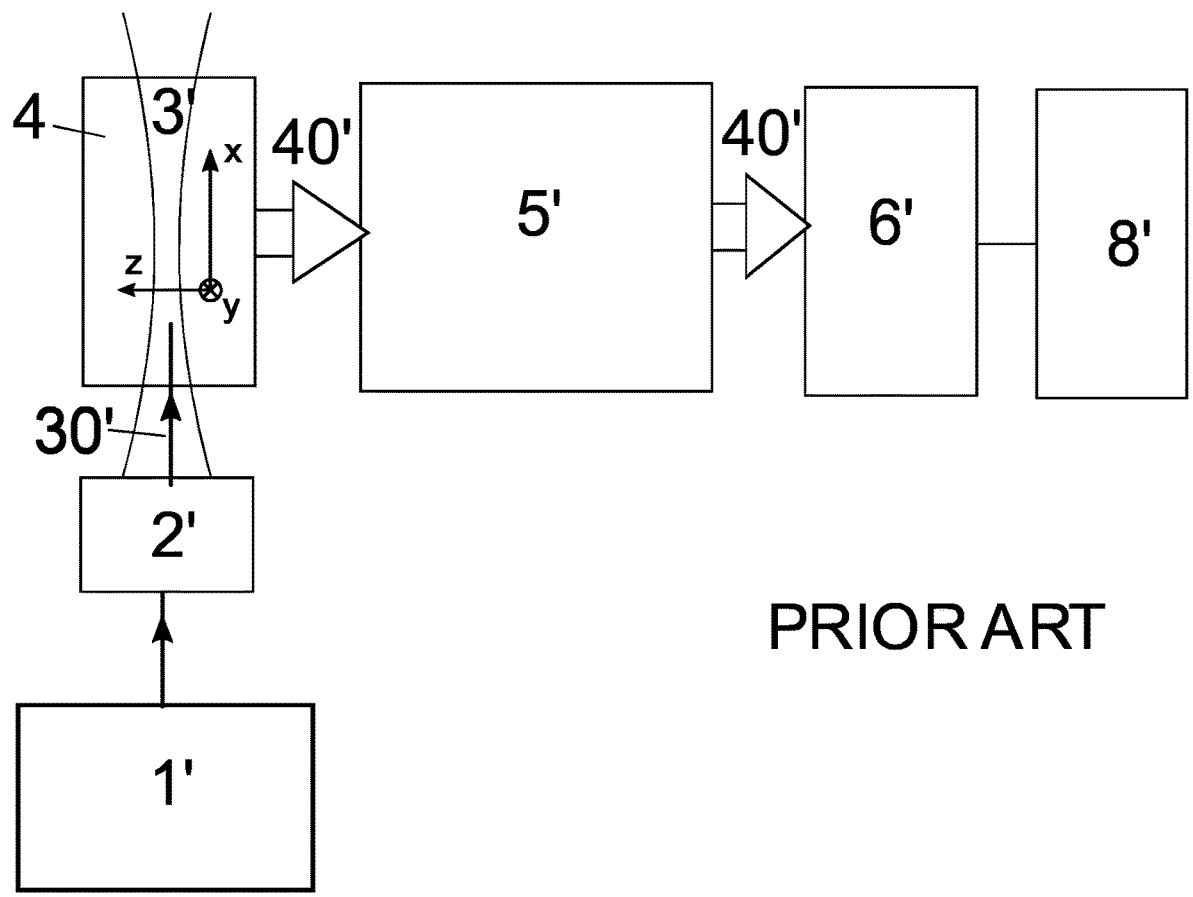
FIG. 1 shows, in diagrammatic form, the main elements of prior art light sheet microscopy

Various features of the present invention, as well as other objects and advantages attendant thereto, are set forth in the following description and the accompanying drawings in which like reference numerals depict like elements.

The foregoing disclosure has been presented for the sake of illustration and description only. As such, it is not intended to be exhaustive or to limit the invention to the precise form disclosed. Other variations are possible in light of the above teaching which are considered to be within the scope of the present invention. Thus, it is to be understood that the claims appended hereto are intended to cover such modifications and variations, which fall within the true scope of the invention.

Other modifications and alterations may be used in the design and manufacture of the apparatus of the present invention and in the application of the methods disclosed without departing from the spirit and scope of the accompanying claims.

Figure 3:
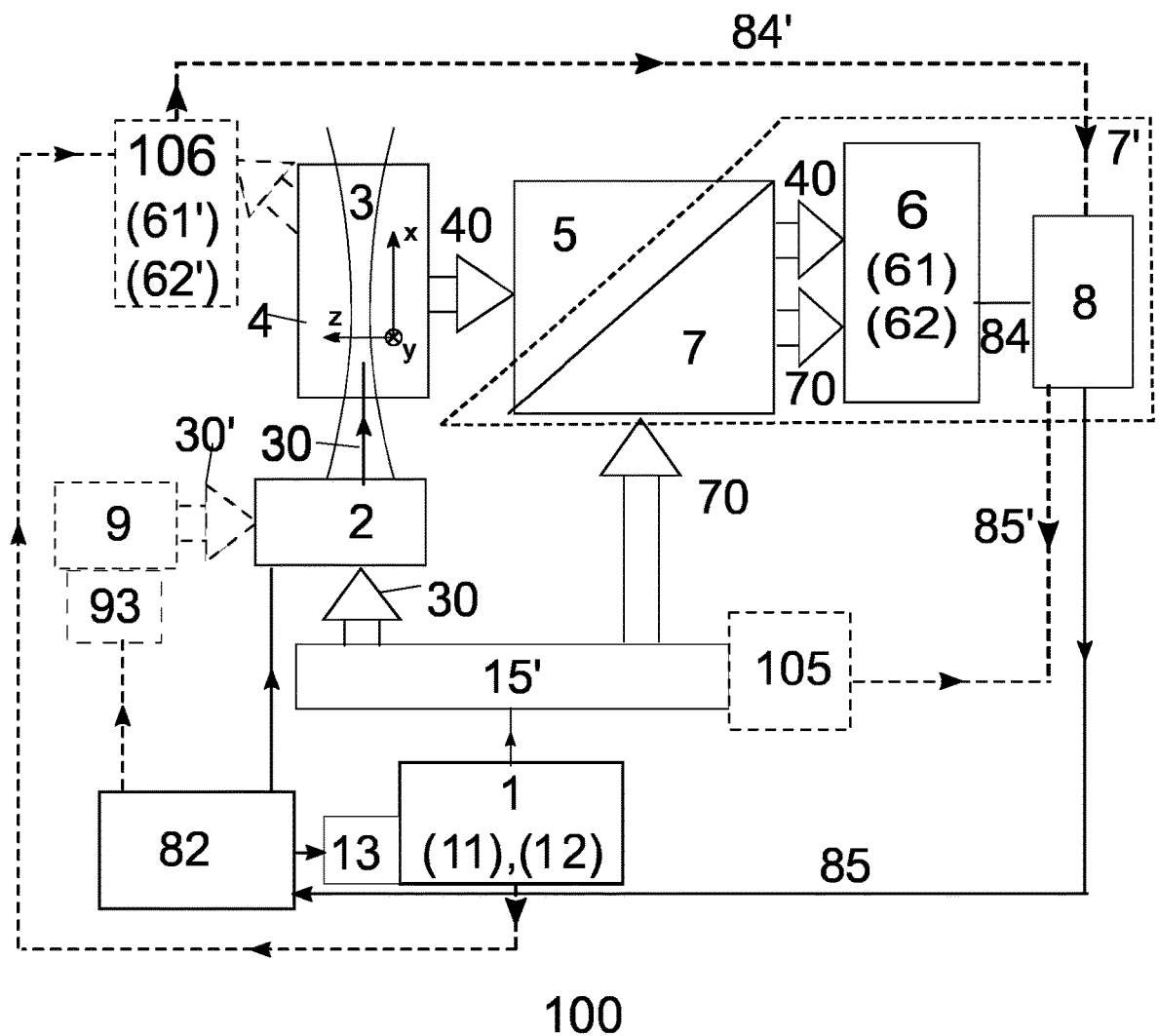
FIG. 3 shows a block diagram of the invention
Figure 4A:
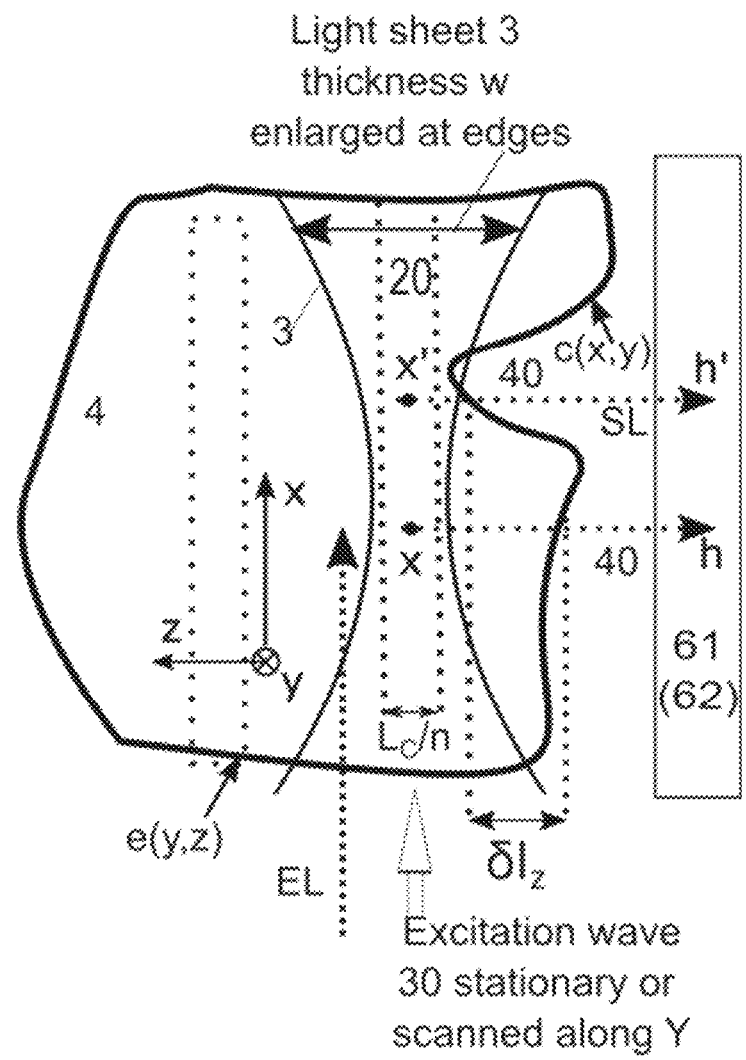
FIG. 4a shows the path length of the sample wave due to the path travelled by the excitation wave, EL, the path length due to the scattered wave, SL, and the combined effect of depth selection along Z due to coherence gating and thickness of the light sheet.
Figure 4B:
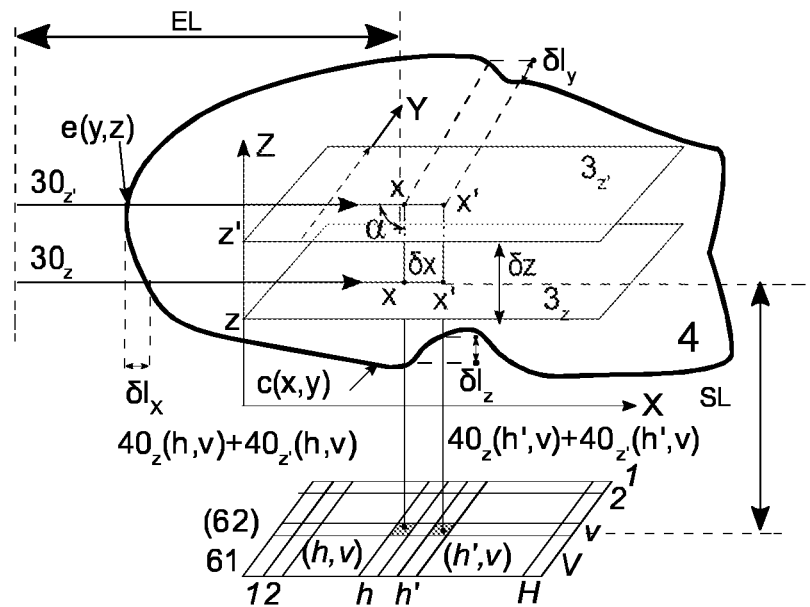
FIG. 4b illustrates the cumulation of optical paths encountered by the sample waves reaching the camera pixels, along the excitation path and scattered path.
Figure 4B:
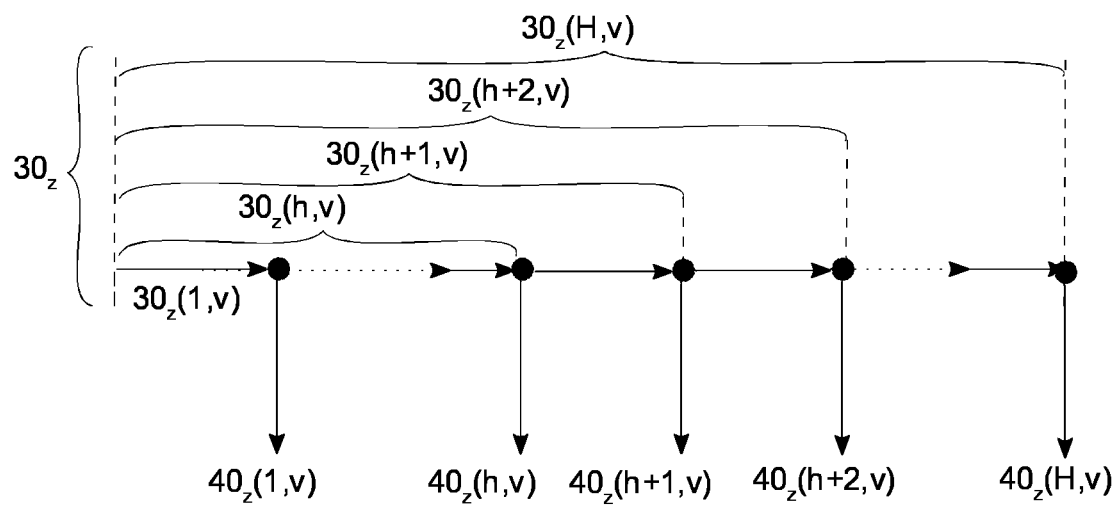

FIG. 3 shows a block diagram of the invention, 100. We will refer to the apparatus combining light sheet excitation with coherence gating in a full field architecture as a Light Sheet Optical Coherence Microscope (LSOCM). An optical source 1 is connected to a splitting block 15'. There are two waves interfering on each camera pixel, travelling along two interferometer arms. The two waves, sample wave and reference wave start at the splitter 15'. We refer to the wave that starts at the splitter 15' and continues propagating through the sample 4, as the sample wave. After a launcher 2, as already stated above, this consists in two parts, an excitation sample wave, 30 and a scattered sample wave, 40, as shown in FIG. 4a and FIG. 4b. The excitation sample wave, 30, is launched into either (i) a filiform shape, of a thin beam 30 or, (ii) a thin sheet 3 of light at some distance from the launcher in the plane X,Y where the sample 4 is positioned or into (iii) a filiform shape, of a thin beam 30 that is fast scanned along Y within an equivalent sheet of light 3 in the plane X,Y where the sample 4 is positioned. Once launched to the sample 4, the sample wave travels as an excitation sample wave 30, that encounters scattering centres, wherefrom the sample wave continues via a scattered sample wave, 40, that starts at a scattering centre, travels through sample 4 and air up to the photodetector block 6. The scattered sample wave 40 forms an image of the scattered centre via the forming image interface 5, on a photodetector pixel of the photodetector block 6. The photodetector block 6 either comprises a single 1D array of photodetectors or a 2D array of photodetectors, as detailed below. Via the forming image interface 5, as shown in FIG. 4b, a scattering centre in the sample 4 is conjugated to a photodetector pixel, (h,v). The scattered sample wave 40 propagates through the forming image interface 5, along Z, towards the photodetector block 6, where Z is also along the detection path that is substantially perpendicular to the direction of the excitation sample wave 30, X. In other words, the detection path direction, perpendicular to the plane of the photodetector block 6, makes an angle with X close to 90 degrees.

Therefore, the scattering sample wave 40 reaching the photodetector block 6 consists in a stream of scattering sample wave components, with a component 40(h,v) for each camera pixel. Each such component has an optical path length that includes the length EL travelled by the excitation sample wave, 30 and the length SL of the scattered sample wave 40 up to the photodetector block 6. The reference wave starts at the point of division of light from the optical source 1 (splitter 15' in FIG. 3) and is conveyed via a reference block 7 towards the photodetector block 6. The length EL travelled by the excitation sample wave also starts at the point of division between the sample wave and reference wave in splitter 15'. As shown in FIG. 4b bottom, the excitation sample wave $30_z$ consists in a streams of components $30_z(1,v)$, ... $30_z(h,v)$, ... $30_z(H,v)$ as shown, where the path length EL(h,v) travelled by each such component starts at splitter 15' and continues up to the respective scattering centre in the sample 4. Each such component creates a respective scattering sample wave $40_z(1,v)$, ... $40_z(h,v)$, ... $40_z(H,v)$.

In FIG. 4a, $x_1$ and $h_1$ are both to the left of the figure, where the excitation sample wave travels to $x_H$, that is deeper in the sample than $x_1$, ie $x_H > x_1$. In practice, when a forming image interface 5 is used between the sample 4 and array of pixels (h, v), axis h will point to the left of the figure, according to the simple law of conjugation from object, scattering centres $x_h$, to image, pixel (h,v).

Signal processing to produce images is performed by a Signal Processor and Display 8. The blocks 6, 7 and 8 are part of the Path Length Compensating Block 7', unique to the invention. As further disclosed below, the path length compensating block implements path length correction to match the path length variation of the sample wave. Two solutions are provided: (i) hardware, by a suitable orientation of the incidence angle of the reference wave 70 in respect to the sample wave 40 reaching the photodetector block 6 and (ii) digital, based on processing the signal from pixel to pixel along camera pixels in a row along excitation direction X. Both solutions allow production of LSOCM images, where the depth of the en-face OCT image is mainly determined by the z coordinate of the excitation sample wave 30 (or of the light sheet 3) in the sample 4. In addition, depth resolved volumes similar to the OCT practice are produced.

Figure 8:
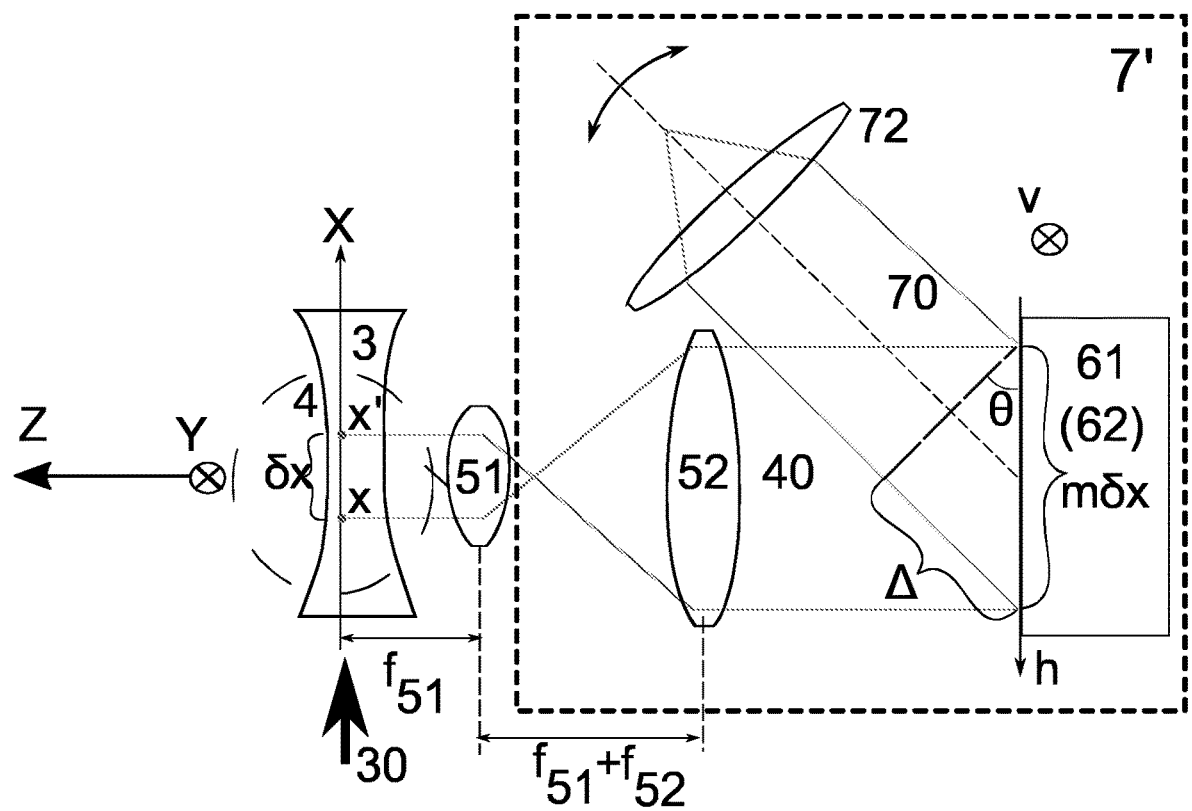
FIG. 8 shows an embodiment according to the invention to create a stream of rays within the reference wave exhibiting a progressively delay from one pixel to next to match the optical path of the stream of sample waves reaching the camera.

The paths of the two waves, 40 and 70 can be superposed, or can be adjusted at a suitable angle in respect to the normal to the facet of the camera in the photodetector block 6, as explained more in the embodiment of the Path Length Compensating Block 7' in FIG. 8. In case the two waves 40 and 70 propagate collinearly to the photodetector block 6, the signal processing performed by the path length compensating block, 7', that takes into account the optical path variation in the sample wave is digital alone. When at an angle (embodiment FIG. 8), less demanding digital signal processing is needed.

To maximise interference, control of polarisation is needed, and such polarisation controllers including polarisers and wave plates, may be included along any path of the excitation sample wave 30 (anywhere along from the splitting point in splitter 15', in the excitation launcher 2), along any path of the scattered sample wave 40 (anywhere in the forming image interface 5), along any path of the reference wave 70 (anywhere along from the splitting point in splitter 15', in the reference block 7) using either free space devices or in-fibre devices.

As further detailed below, the optical source 1 may be a tuning laser (swept source) 11 or a broadband optical source 12.

The excitation block 2 may also irradiate a similar volume of sample 4 by scanning the excitation sample wave 30 laterally, either along Y (for conventional light sheet orientation), as well as Z or in both directions, Y and Z. In different embodiments, the photodetector block 6 may consist in a 2D array of photodetectors in a camera 61 or a 1D camera (line camera) 62, of a 1D photodetectors array. Analog or digital data from cameras are sent to the Signal Processor and Display 8 via line signals within a link 84.

The launch of light is performed according to means known in the LSM art, using combination of lenses, cylindrical lenses, Powel lenses, axicon lenses, spatial light modulators (SLM)s. The launcher 2 may incorporate means to create Airy or Bessel beams, that may use SLMs or other diffractive elements to control the phase of the excitation sample wave 30. The sheet 3 may be stationary or the excitation sample wave 30 and/or sheet 3 can be scanned through the sample 4 using galvoscanners, resonant mirrors, polygon mirrors, acousto-optic deflectors, or electro-optic deflectors, such as potassium tantalate niobate (KTN) crystals. More sophisticated means may include projecting patterns of beams, or patterns created by interference of diffracted beams, or a lattice of thin beams, as disclosed in U.S. Pat. No. 9,279,972, "Spatial frequency interference illumination", by B. Judkewitz and C. Yang.

The invention is compatible with a priori art imaging using fluorescence, Raman (such as disclosed in U.S. Pat. No. 10,054,778, "Orthogonal confocal stimulated emission microscopy", by R. D. Frankel), stimulated emission depletion (STED) or coherence anti-Stokes Raman scattering (CARS) SLM, utilising an extra optical source 9 sending an excitation wave 30', to excite fluorophores or determine Raman or coherent anti-Stokes Raman scattering (CARS) imaging. In this case, the excitation block 2 and forming image interface 5 may contain suitable dichroic filters to select or reject different wavelengths.

Invention is also compatible with structured illumination, in which case one possibility is to modulate the intensity of the wave 30 or 30' by a modulator 82 in synchronism with the lateral scanning in 2, therefore the sources 1 and 9 are modulated in intensity by respective power controllers or choppers 13 and respective 93. Control of modulation pattern determined by excitation block 2 and of the structured illumination via modulator 82 is controlled by the Signal Processor and Display 8, via line 85.

In addition, light collected back into the splitting block 15' can be used by an optional OCT system, 105, operating conventionally, ie receiving light along the same direction as the excitation sample wave 30, system controlled by Signal Processor and Display bock 8 via line 85'.

In addition, another optional imaging system, 106, operates with either a 2D camera 61' or 1D camera 62', receiving light collected along the axis Y of the light sheet 3. (This system is practically above the plane of the sketch in FIG. 3, shown for clarity sideways). This implements coherence gating over a light sheet that is inspected in a line field configuration at 90 degrees, with the difference that in the case of system 106, the light sheet is thick, as further disclosed in FIG. 13.

For the description that follows, line field is in fact a 1D full field inspection, ie all pixels in a sensor array, either 1D or 2D are illuminated at once.

The information provided along line 84' is employed by the Signal Processor and Display block 8 to provide OCT cross-sections of the light sheet 4.

As a deviation from LSM prior art, the forming image interface 5 may contain a deflector (galvo scanner, resonant scanner, AOTF, electrooptic crystal modulator used for deflection). When the launching block 2 uses a deflector, the deflector in the forming image interface 5 is synchronised with the deflector in the launching block 2 to convey a stationary line of light from the sample 4 (parallel with the excitation direction) onto the photodetector block 6, in this way improving rejection of multiple scattered rays (hence confocality). According to means known in the art, the two deflectors in fact can be the same single deflector. This is achievable, by using a galvoscanner or resonant scanner equipped with a dual facet mirror, a facet for the excitation sample wave 30 and the other for the scattered sample wave 40. Even more, when the forming image interface 5 is equipped with a deflector, as another deviation from LSM prior art, the 2D camera can be replaced with a 1D camera with advantages in terms of cross talk reduction (better confocality), speed of imaging and cost. In this case, the reference block 7 part of the Path Length Compensating Block 7' conditions the reference wave 70 along a line on a 1D camera 62.

Relaxation of the Need for Thin Light Sheets

The light sheet 3, as shown in FIG. 4a, according to diffraction, registers a minimum thickness as shown in the middle of the image (along X), while at edges, its thickness w expands. The superposed rectangle, 20, shows a width given by the coherence length of the coherence gating that is along the detection path (along Z). The coherence gate width is not affected by defocus or aberrations. In the sample 4, the depth resolution interval is $L_c/n$, where $L_c$ is the coherence length in air and n is the index of refraction of the sample 4. Therefore, at the light sheet edges, coherence gating mainly determines the axial resolution. This is a unique feature of the invention, allowing extending the principle of LSM to larger light sheet dimensions along X.

Challenges in Combining LSM with OCT (ie to Perform Coherence Gating Over the Signal Produced by LSM)

Figure 5:
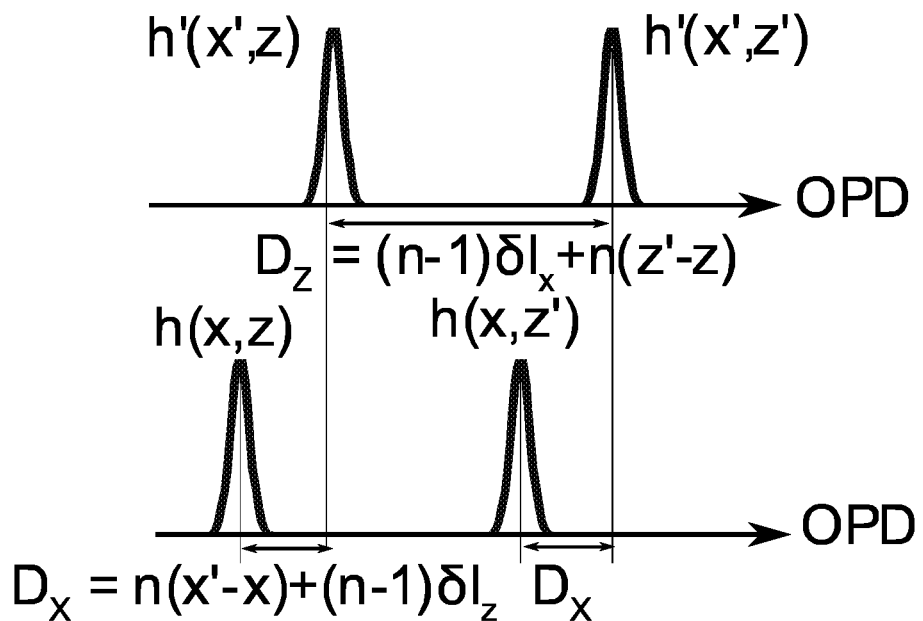
FIG. 5 shows the peaks in the A-scans that are obtained after OCT signal processing for 4 scattering centres in the sample intercepted by a light sheet.

There are three aspects to consider:

1. Mainly, OCT systems use a flying spot (scanning) CM set-up and combine the CM principle with the low coherence interferometry principle to perform coherence gating for depth resolved imaging. OCT systems based on cameras suffer from cross talk, as systems are not genuinely confocal. However, in the last decade, camera-based OCT technology has progressed along with digital holography, off axis interference systems and sub aperture adaptive optics correction. For instance, Master Slave OCT was implemented in a full field configuration using a fast 2D camera, as presented in J. Wang, A. Bradu, G. Dobre, A. Podoleanu, Full-Field Swept Source Master-Slave Optical Coherence Tomography, Photonics Journal, IEEE, (2015), 7(4), Art. #: 3800114, DOI: 10.1109/JPHOT.2015.2461571. Although cameras have started to be used in OCT, employing a camera at a large degree, more than 45 degrees and mostly dealt with here at 90 degrees from the excitation beam raises novel challenges for the forming image interface, where lateral reading becomes mixed with coherence gating, conventionally acting along depth in OCT, as explained below.
2. The main hurdle is in the control of the optical path difference (OPD) that is crucial in OCT, hence the Path Length Compensating Block 7' in FIG. 3. In conventional OCT, either TDOCT or SSOCT, lateral pixels in the en-face camera sensor receive light with similar optical path lengths travelled by the backscattered waves. This is not the case when trying to add coherence gating to a light sheet inspected at a large angle:
    (a) The sketches in FIG. 4b and FIG. 5 illustrate this problem. Let us consider two sheets $3_z$ and sheet $3_{z'}$, at two depths z and z', parts of a single thicker sheet. For any ray in the two light sheets, the excitation sample waves $30_z$ and $30_{z'}$ travel along different path lengths EL, in transmission through the sheet, along axis X up to scattering centres in the sample 4, that create scattered sample waves, as part of sample waves 40 in the direction of the camera, as illustrated in FIG. 4b bottom. These scattered sample waves travel scattering wave lengths, SL, through the sample 4 and through air along axis Z (along the detection path or axis of depth in the sample 4), to the points of interference on the camera pixel, placed in columns h and h'. 4 scattering centres are shown, two at coordinates (x, z) and (x, z') that scatter light to pixel (h, v) of the 2D camera 61. Two other centres are at coordinates (x',z) and (x',z') that scatter light to pixel (h',v) of the 2D camera 61. As further disclosed below in FIGS. 11 and 12, the photodetector block 6 can also be implemented using a 1D camera, where the rows v from 1 to V in an image raster would mean 1D different time acquisitions of the 1D array of H pixels. In full field conventional OCT, the two waves (beams) that interfere on each pixel camera (sample wave and reference wave) are colinear, and their path lengths do not depend on the pixel position in the camera. Here they do, hence the difference to the prior art OCT, or digital holography. In conventional off-axis full field OCT and in digital holography, the two waves (beams) superposed may make a slight angle, to obtain Fizeau fringes, ie a fringe pattern across the camera. For a number H of pixels across, maximum number of cycles in the fringe pattern is H/2. This corresponds to a tilt of the two wavefronts that at the extremity of images are approximately H/2 wavelengths. A 2D Fourier Transform across the image shows information in the interference translated around a carrier of H/2 frequency. In such cases there is a predicted variation of OPD from a pixel to the next in the camera along the row v, with two pixels per cycle, path variation from a pixel to next is half wavelength. For H=1000, at a wavelength of 600 microns, this gives 150 microns. This path variation is not due to the sample investigated, but involving a cosine projection of the angle only. In FIG. 4b, there is a much larger variation of the length δx in propagation through the sample 4 from the two pairs of centres at x, to the other two pairs of centres at x', whose respective rays end on different columns, h and h' of the camera. For a lateral size of the sheet of 1 mm, with an index of refraction n~1.4 of the sample 4, the path variation is 1.4 mm, ie much larger than 150 microns calculated above. This means that from one column to the next, such as from h and h', path length of the excitation wave varies by the optical length due to the geometric distance between x' and x, ie due to variations along the path length of the excitation wave length, EL.

To move the coherence gate from one pixel to its neighbour, with pitch $p_X$, the OPD has to be changed by $np_X$, ie in the sample, the axial resolution interval (coherence length in the sample) is $p_X$. For sufficient axial resolution, let us consider a $L_c$~20 microns in air, although modern art of OCT allows a few microns or even submicron. With such a conservative value $L_c$, a 1 mm lateral size is resolved into 70 distinct parts, ie the ΔOPD (from one edge of the camera to the other edge)=70$L_c$. Normally, we would like to have more than H=70 pixels in the camera, hundreds or a few thousands, with H=50 as a minimum number for a decent image. Therefore the larger OPD variation in the invention across the camera than in the prior art would equate to a variation of OPD larger than 50 $L_c$.

In addition, the shape variation of the sample surface affects the optical path travelled by the sample wave. Let us consider the topography of the sample 4 facing the forming image interface 5 described by the position where its surface intersects axis Z as c(x,y) and the topography of the sample 4 facing the excitation launcher 2, described by the position where the sample surface intersects axis X as given by e(y,z).

Due to topography of the sample facing the forming image interface 5, c(x,y), that varies from x to x', there is a path difference of lengths SL of the two scattered sample waves traveling to the camera, $c(x',y)-c(x,y)=\delta l_Z$, as shown in both FIGS. 4a and 4b. This means that processing of signal should be different from one pixel, (h,v) to another (h', v) in the same row v due to contributions of path lengths from both EL and SL. As shown in FIG. 5 bottom, this totals to an optical path difference $D_X=n(x'-x)+(n-1)\delta l_Z$, where n(x'-x) component comes from the excitation length, EL and second term is part of the scattered length, SL. However, if the sample 4 is squashed on a Petri dish placed parallel to X and to camera 61(62), the variation in the SL is reduced or cancelled, such as $\delta l_Z$ is brought to zero in FIG. 4a and FIG. 4b and $$D_X \sim n(x'-x) \tag{1}$$

On the other hand, the path difference between rays scattered at z and z', as shown in FIG. 5 top, is given by: $D_Z=(n-1)\delta l_X+n(z'-z)$, where $\delta l_X=e(y,z')-e(y,z)$ is due to the topography of the sample e(y,z), facing the excitation launcher 2. In this case, the first term is part of the excitation length, EL, affected by the topography and the second term is part of the scattered length, SL. It should be noticed that for thin sheets 3, the variation in topography facing the excitation launcher 2 can be ignored and $$D_Z \sim n(z'-z) \tag{2}$$

(b) As already illustrated in FIG. 5, coherence gating applied to a LSM architecture leads to a singular peak response of the A-scan. When the sheet is thin, the only useful information is at a single point along the A-scan, hence the OCT signal processing delivers a single peak along OPD. For each camera pixel, the peak in the A-scan is at the intersection between the excitation sample waves 30$_z$ and 30$_{z'}$ and the normals to the camera plane at pixels (h,v) and (h',v). This is different from any known process in prior art OCT. Therefore, signal processing should be different from that of conventional OCT, used to deliver extended A-scans and not a single peak. Here, the main peaks in the A-scans are due to the interference of the front edge of the excitation sample wave 30 with the reference wave 70. Scattering centres intercepted by wave 30, along the excitation path, may however contribute to delaying fractions of power of the excitation sample wave 30 leading to some enlargement of the main A-scan peak widths, as discussed more below. In extreme cases of the sample density, the delayed parts of the excitation sample wave may also contribute to some modulation of the lower intensity, A-scan tail. As scattering destroys coherence, it is expected that contributions to the tails of the A-scans are much smaller than the main A-scan peak, determined by the front edge of wave 30. For thicker sheets, the A-scans may contain more peaks, due to scattered waves generated by the front edge of the excitation sample waves within the sheet thickness, w.

The A-scan obtained from each pixel signal of the camera 61(62) corresponds to an optical path difference (OPD) made from two distinct components, a path length along the sheet, EL (along X), due to the length travelled by the excitation sample wave 30 and another path length, SL, along Z, travelled by the scattered sample wave 40. The two paths are at 90 degrees in FIGS. 4a and 4b, in general at large angles, ie the A-scan covers a discontinuous path (which is not the case in conventional OCT). Peaks delivered by signal from two pixels in such A-scans are shown in FIG. 5. They are obtained in the case of a thick sheet, containing the two excitation sample waves $30_z$ and $30_{z'}$. Scattered sample waves from these scattering centres (x,z) and (x,z') lead to pixel (h, v) in column h, shown by the A-scan peaks h(x,z) and h(x,z'). Scattered events from the two excitation waves $30_z$ and $30_{z'}$ intercepting scattering centres (x',z) and (x',z') lead to pixel (h',v) in column h', creating peaks h'(x', z) and h'(x',z') in the A-scan.

The scattering centres in the sample 4, illuminated by wave 30, contribute to the scattered sample wave components 40, towards camera 61(62), a component 40(h,v) for each pixel. Each of them can be considered as generated by scattering of a respective component of the excitation sample wave 30(h, v). As shown at the bottom of FIG. 4b, for each such component 40(h,v), a component 30(h,v) of the excitation sample wave 30 can be identified, where for calculation of the path travelled, essential in OCT, all components 30(h,v) can be considered as started at the splitting point between sample wave and reference wave, such as splitter 15' in FIG. 3.

In one aspect, the invention provides for a path length compensating block 7' that compensates, or estimates that path length variations, as well as uses the information on the path variation to build LSOCM images and OCT volumes. As further disclosed below, this block can employ a hardware method to compensate approximately for the main component of the OPD variation, which can be predicted, given by $D_X \sim n(x'-x)$, as disclosed further in FIG. 8. In addition, signal processing in Signal Processor and Display 8, provides further corrections to path calculations, infers quantitative data such as indices of refraction or their local variation and builds the LSOCM images and OCT volumes. In embodiments where the Path Length Compensating Block 7' does not employ solution of FIG. 8, Signal Processor and Display 8 also accomplishes the function of considering the main part of path variation along the excitation length, in order to process signal and assemble images.

Production of LSOCM Image

As commented above, each A-scan presents a single peak in case of thin sheets (that are thinner than the axial resolution interval of the OCT, given by $L_c$). The A-scan peaks correspond to those scattering centres along the depth z, seen by a camera pixel, that are intersected by the excitation sample wave 30 or light sheet 3. The intensity of the corresponding pixel in the image is determined by the A-scan peak. Therefore, even if such peaks, from one pixel to next vary in their depth position, this is irrelevant for generation of an en-face OCT image at the depth z of the sheet, ie the LSOCM image. This means that a LSOCM image can be generated for each of its pixels by using the amplitude of the single A-scan peak delivered by signal processing. This also means that sample topography variations, e(y,z) and c(x,y) that alter the main OPD variations given by equations (1) and (2), present no relevance for the LSOCM image. Even if the sheet is thick, and the A-scan peak is enlarged, and the topography e(y,z) may alter the OPD of the sample wave, the OPD values of the peaks as well as their axial range extension present again no relevance. By integrating each A-scan over the OPD coordinate and using such value for each camera pixel, an equivalent coherence gated LSM image is obtained, corresponding to cumulation of all contributions in depth in the sample, intersected by the thick light sheet.

Figure 16:
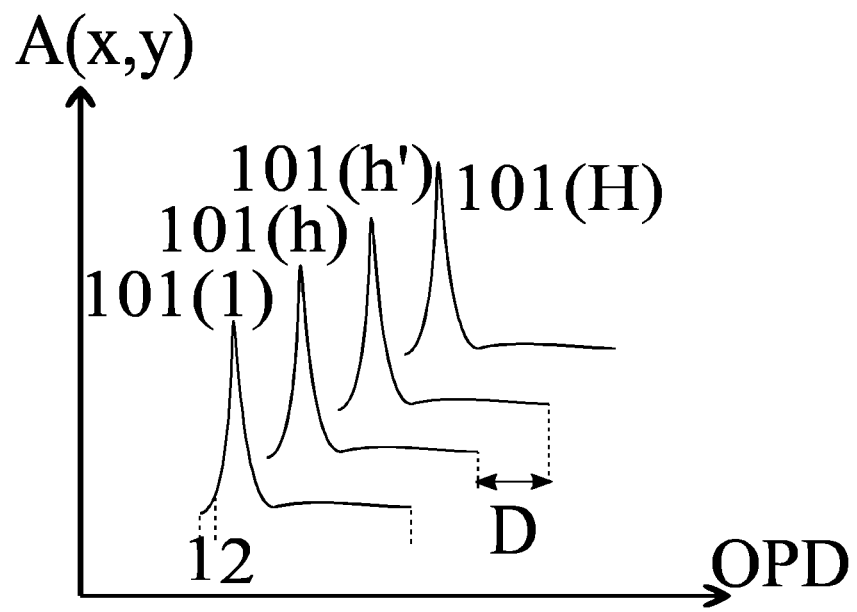
FIG. 16 illustrates the A-scans (obtained from photodetectors in a row in the camera along the excitation sample wave direction), relative to each other along the OPD (axial) direction.
Figure 16:
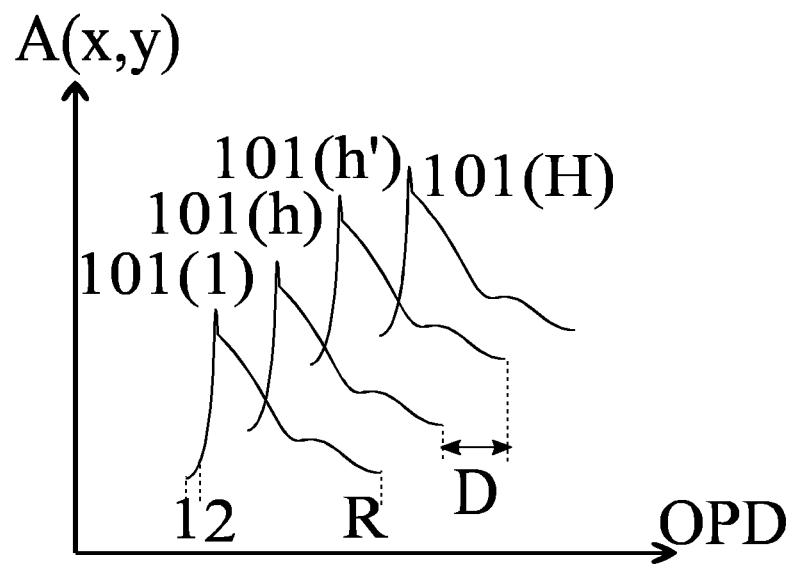

Another factor to consider in assembling of the LSOCM image is that the excitation sample wave 30 in propagation along X through the sample 4 can be considered as splitting at each scattering centre encountered, into a component that continues to propagate without intercepting the scattering centre (possible, especially when sheet thickness w is larger than the size of scattering centres) and another component that is delayed in the process of forward scattering and due to the denser material of the scattering centre. This impacts the process of image assembly due to: (i) interference of the reference wave 70 with the fast moving of the front edge of the waves 30 and (ii) interference of the reference wave 70 with the trailing edge of waves 30 (although of smaller intensity) leading to some extension of the trailing edges of the A-scan peaks in FIG. 5 (as shown in FIG. 16'). The larger the traveling path of the excitation length EL, along X, the wider the trailing edges of the A-scan peaks become, although of smaller intensity than the front edges of the A-scan peaks. This phenomenon, peculiar for the invention, will be further considered in the section below on Signal Processing.

FIG. 5 also illustrates a capability of the invention, that of measuring the index of refraction n of the sample. The delay of the two A-scan peaks produced by pixels (h, v) and (h', v) is proportional to the index of refraction, n. If the top of the sample (facing the camera 61) is considered flat at the same z (ie $\delta l_z=0$), as the distance between pixels in the camera is known, which for magnification 1 is equal to x'-x, an opportunity is open by the invention to a new type of measurement, that of the index of refraction, n. Considering a magnification m of the forming image interface between the sample 4 and the camera 61(62), and the pitch of the camera pixel, p, the OPD between the two A-scan peaks is $OPD=np/m$. This shows that n can be inferred by measuring the path difference between A-scan peaks obtained from different pixels in a row v.

In situations where the top of the sample 4 is not flat, or it is inclined in respect to Z, or corrugated, then the index of refraction cannot be measured accurately, but at least its variations can be sensed. Otherwise, if the sample 4 height variation can be inferred, as further commented below, accurate measurements of n become possible.

Obviously, in conventional full field OCT, the excitation and detection direction coincide, hence no such path variation exists between A-scans produced by different pixels in the camera. It is however exactly the existence of a large angle α (shown in FIG. 4b) that made LSM possible in the first place and for the scope of the invention, this will add the novel possibility of measuring the indices of refraction to at least a direction, as detailed below.

Figure 6A:
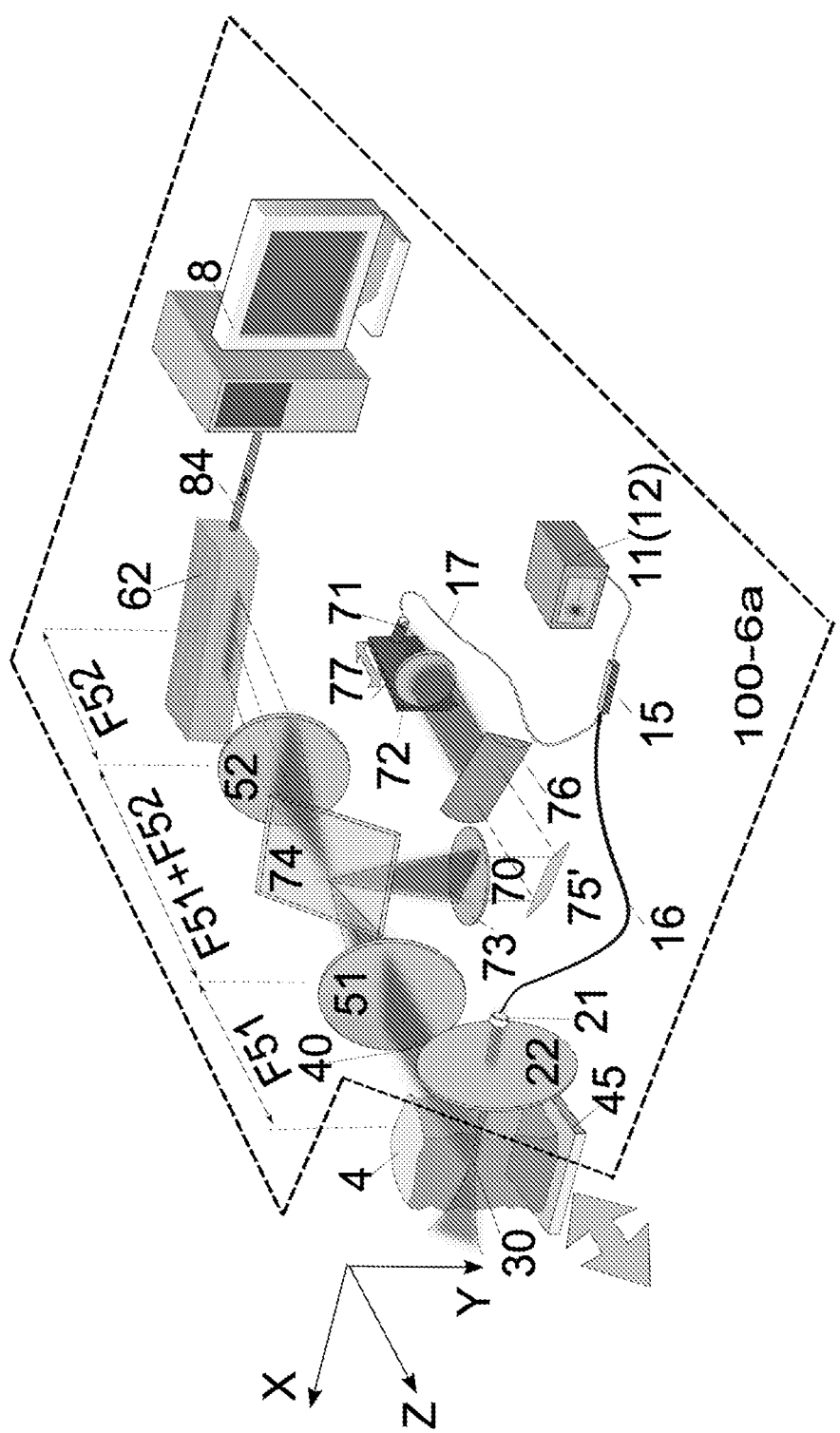
FIG. 6a shows a first embodiment of the invention using an excitation block that creates a filiform excitation sample wave through the sample and a 1D camera (line camera) is used in the photodetector block.

Filiform Excitation Sample Wave 30 Whilst the Photodetector Block 6 Consists in a 1D Camera 62, Digital Correcting Mechanism A more detailed embodiment of the invention, 100, version 100-6a, is shown in FIG. 6a, where an excitation collimator 22, part of the excitation block 2 in FIG. 3, creates a thin filiform beam of the excitation sample wave towards the sample 4.

Light from the optical source, either a swept source 11 or a broadband source 12 is divided by a splitting block 15' (FIG. 3), here a fibre splitter 15 with two branches, branch 16 launching light from its tip 21 to the excitation collimator 22 and branch 17 launching light from its tip 71 to a reference collimator 72.

The sample forming image interface 5 in FIG. 3, consists here in two lenses 51 and 52 in a telescope conveying the line of excited scattering centres in the sample 4, coordinates (x,y=1) onto the photodetector pixels of the 1D camera 62, part of the photodetector block 6. The en-face LSOCM image has H pixels along a single horizontal line of pixel coordinates (h, V=1).

These H pixels are conjugated with corresponding scattering centres (intercepted by the excitation sample wave 30), via the telescope of lenses 51 and 52. These scattering centres in the sample 4, illuminated by 30, contribute to the scattered sample wave components 40.

The sample wave originates as the excitation sample wave 30 in the splitter 15, continues along the launching block 2 (lens 22) that shapes its free space volume through the sample 4 up to the scattering centres as excitation sample wave 30, continuing from each scattering centre as H components scattered sample waves 40(h,1), flood illuminating all pixels (h,1) of camera 62, (as shown at the bottom of FIG. 4b for v=1), for h=1, 2 . . . H.

The reference wave 70 is prepared as a light sheet, it originates in the splitter 15, continues along fibre 17 of splitter 15 and then, via beamsplitter 74, flood illuminating all pixel in the 1D camera 62 to the same extent as the scattered sample wave 40 from sample 4 does. The convergence of the reference wave 70 should reach the beamsplitter 74 with a similar convergence to that of the scattered sample wave 40. In order to create colinear rays from the scattered sample wave 40 and from the reference wave 70 on each camera pixel of the photodetector array 62, the lenses 51, and 73 should have similar focal length. As an example, the shape conditioning of the reference wave may consist in an assembly of reference collimator 72, a cylindrical lens 76, optional mirror 75' and lens 73. Other arrangements are possible, as known in the art of projecting sheets of light. These may include slits in combination with cylindrical lenses, to spatially filter the reference wave, or spatial light modulators (SLM)s to create a 1D distribution of the reference wave 70.

To scan the sample 4 in depth along Z axis, the sample 4 is placed on a positioner 45. To adjust the optical path difference (OPD), the fibre tip 17 and collimator 72 are placed on a translation stage 77, that can adjust the distance between collimator 72 and lens 73, to vary the path length in air travelled by the reference wave 70.

To adjust the OPD, the path length RL travelled by the reference wave 70 can be adjusted to match the length of the sample wave, made of the path travelled by the excitation sample wave EL and the length of the scattered sample wave SL, with both EL and RL starting at the splitter 15. The RL continues through fibre 17, and then through air and elements of the reference block 7, ends on the camera 62. In air, the length from tip 21 at the output of fibre 16 up to the camera 62 should match the length in air from output of fibre 17, tip 71 up to the camera 62. This can be adjusted in both the excitation launcher 2 and in the reference block 7. Translation stage 77 can be used to move the fibre tip 71 of fibre 17 and collimator 72 together. Translation stage 77, fibre 17, collimator 72, lenses 76, 73 and mirror 75', all are part of the schematic reference block 7 in FIG. 3. Here reference block 7 and forming image interface 5 share the beamsplitter 74 and lens 52.

Preferably, the splitter 74 has a large transmission and much lower reflectivity.

The fibre splitter 15 conveys preferably most of the power towards the source collimator 22 and much less towards the reference collimator 72. A ratio between 99/1 and 99.999/ 0.001 or even bigger may be found useful between the power of light in the excitation sample wave 30 and that of the reference wave 70 after being transferred by the beamsplitter 74 towards the camera 2, given the low scattering intensity of the sample 4 at a large angle, typically here 90°. Obviously, for those skilled in the art, splitter 15 can be a bulk splitter or a plate beamsplitter. For a tuning band of the source 11 or bandwidth of the broadband source 12 less than 150 nm, the splitter 15 can be in fibre, for larger tuning bandwidth or bandwidth respectively, it is preferable to use a bulk splitter, such as a cube or a plate.

To produce a LSOCM en-face 1D image, path integration of each OCT A-scan gives the amplitude of the signal of each pixel irrespective of the thickness of the excitation sample wave 30. (More details on using FFT or Master Slave OCT to deliver A-scans in the section Signal processing).

Cross section imaging: Depth selection, along Z, is secured by the small thickness, w, of the excitation sample wave 30. This can be achieved by mechanically moving the sample 4 along the Z direction using translation stage 45. To adjust the focus, one of the lenses in the forming image interface 5 between sample and camera, such as 51, can be moved axially, or an electrical tunable lens can be employed instead, as reported in LSM, in Florian O. Fahrbach et al. "Rapid 3D light-sheet microscopy with a tunable lens". EN. In: *Optics Express* 21.18 (September 2013). pp. 21010-21026, doi: 10.1364/OE.21.021010.

Cross-section OCT imaging. High speed, hundred of kHz 12 bits cameras 62 can be used, either in Silicon or InGaAs covering spectral ranges from visible to long infrared. When using a swept source 11, for R=500 pixels in depth, 2R=1000 readings are required (according to Nyquist), a reading for each optical discrete frequency of the swept source 11. If the 1D camera 62 is run at 100 kHz, for 2R readings, an acquisition period $T_A$=10 ms is needed to obtain a cross-section OCT image.

Figure 6B:
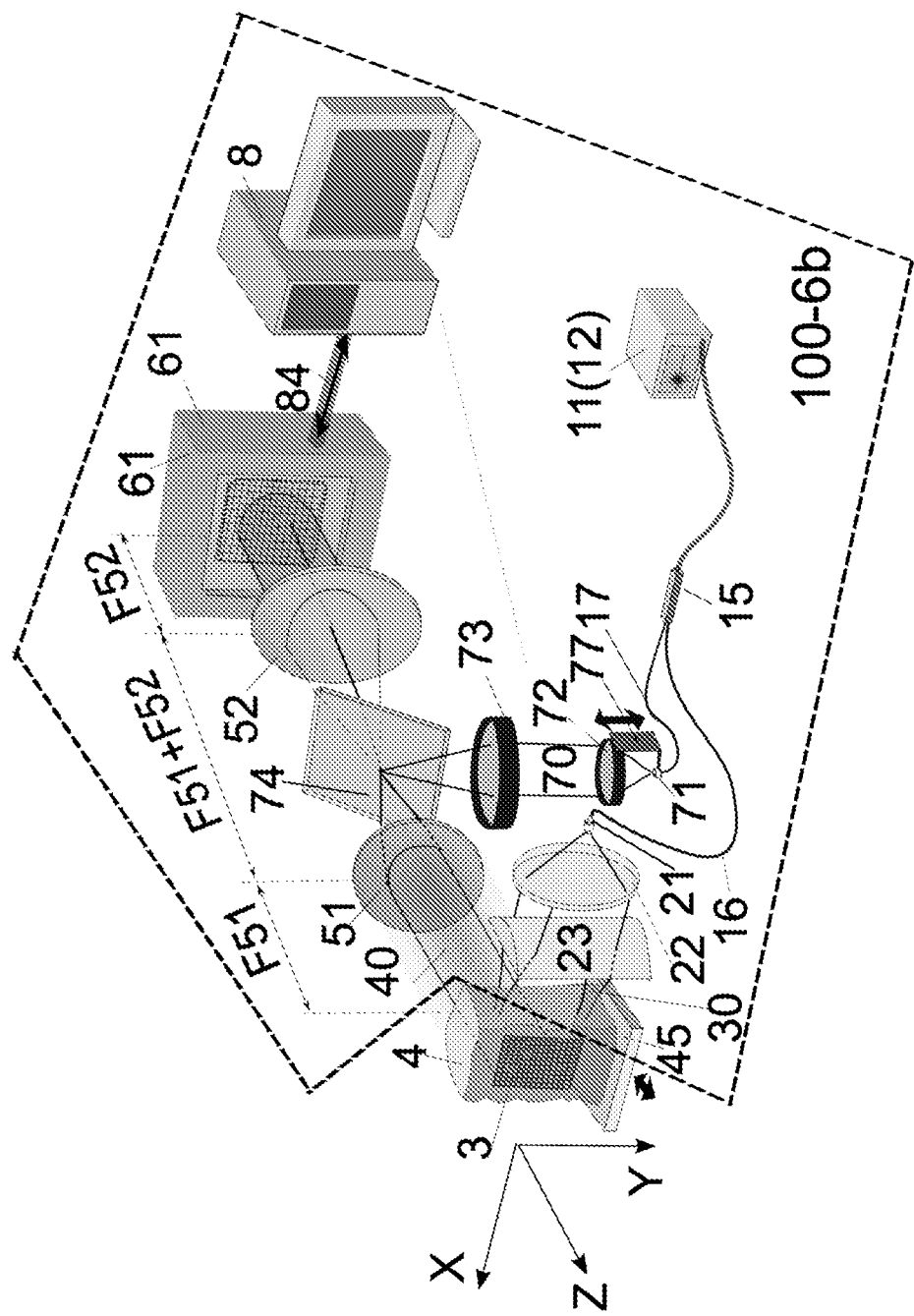
FIG. 6b shows a second embodiment of the invention using an excitation block that creates a light sheet and uses a 2D camera in the photodetector block.

Excitation by a Light Sheet 3 Created by a Cylindrical Lens 23 Whilst the Photodetector Block 6 Consists in a 2D Camera 61, Digital Path Correcting Mechanism Another detailed embodiment of the invention, 100, version 100-6b, is shown in FIG. 6b, where a cylindrical lens 23 conveys light from an excitation collimator 22 towards the sample 4, where the excitation wave 30 becomes thinner at the focal length distance of cylindrical lens 23, creating a light sheet 3. Collimator 22 and cylindrical lens 23 are part of the excitation block 2 in FIG. 3. The forming image interface 5 in FIG. 3, consists here in two lenses 51 and 52 in a telescope conveying the light sheet 3 in the plane (x,y), onto the plane (h,v) of the 2D camera 61, part of the photodetector block 6. The en-face SLM image has H pixels along the horizontal lines (rows) and V lines of pixels along the vertical direction. These (H,V) pixels are conjugated with corresponding scattering centres (x,y) in the sheet 3, via the telescope of lenses 51 and 52. The scattering centres at (x,y) in the sample 4, illuminated by the sheet 3, contribute to the scattered part of the sample wave, scattered sample wave 40 towards lens 51.

Light from the optical source, either a swept source 11 or a broadband source 12 is divided by a fibre splitter 15 with two branches, fibre 16 launching light from its tip 21 to the excitation collimator 22 and fibre 17 launching light from its tip 71 to a reference collimator 72, and then to a lens 73. The reference wave 70 originates in the splitter 15, continues along fibre of splitter 15 and air, through lenses 72 and 73, via beamsplitter 74, flood illuminating all HV pixels in the 2D camera 61 to the same extent as the sample wave 40 from sample 4 does.

The sample wave originates as the excitation sample wave 30 in the splitter 15, continues along the launching block 2 (lenses 22 and 23) that shapes its free space volume through the sample 4, continuing with the scattered sample wave 40 towards the camera 61.

In order to create colinear rays from the scattered sample wave 40 and from the reference wave 70 on each camera pixel as well as similar areas on the camera 61, the lenses 51, and 73 should have similar focal length.

Using high sensitivity 2D cameras, of 14 bits, but slow, a frame can be read at a rate of tens of Hz or slower. When using a swept source 11, for 500 pixels in depth, when 1000 frames are required, a frame for each optical discrete frequency of the swept source 11, for a camera frame rate of 10 Hz, the tuning period reaches $T_A=100$ seconds determining an equivalent volume acquisition.

However, given the reference power in OCT that acts as a signal boost, a lower bit depth may be sufficient, such as 10 or 12 bits for OCT operation. 12 bits Photron cameras for regions of interest of H horizontal pixels along X and V vertical pixels along Y, H×V=100×100 pixels can reach kHz to tens of kHz frame rates. Considering a 1 KHz frame rate setting, this means that for R=500 pixels in depth, demanding 1000 frames, a frame for each optical discrete frequency of the swept source 11, hence $T_A=1$ second tuning period and equivalent volume acquisition.

To produce a LSOCM image, path integration of each A-scan gives the amplitude of the signal of each pixel irrespective of the sheet 3 thickness, w.

Volumetric imaging: Depth selection, along Z, is secured by the small thickness of the thin light sheet 3. Volumetric imaging can be achieved by mechanically moving the sample 4 along the Z direction using translation stage 45. To adjust the focus, one of the lenses in the forming image interface 5 between sample and camera, such as 51, can be moved axially, or an electrical tunable lens can be employed instead, as reported in the paper "Rapid 3D light-sheet microscopy with a tunable lens", by Florian O. Fahrbach et al., published in *Optics Express* 21.18 (2013). pp. 21010-21026, doi: 10.1364/OE.21.021010.

Figure 7:
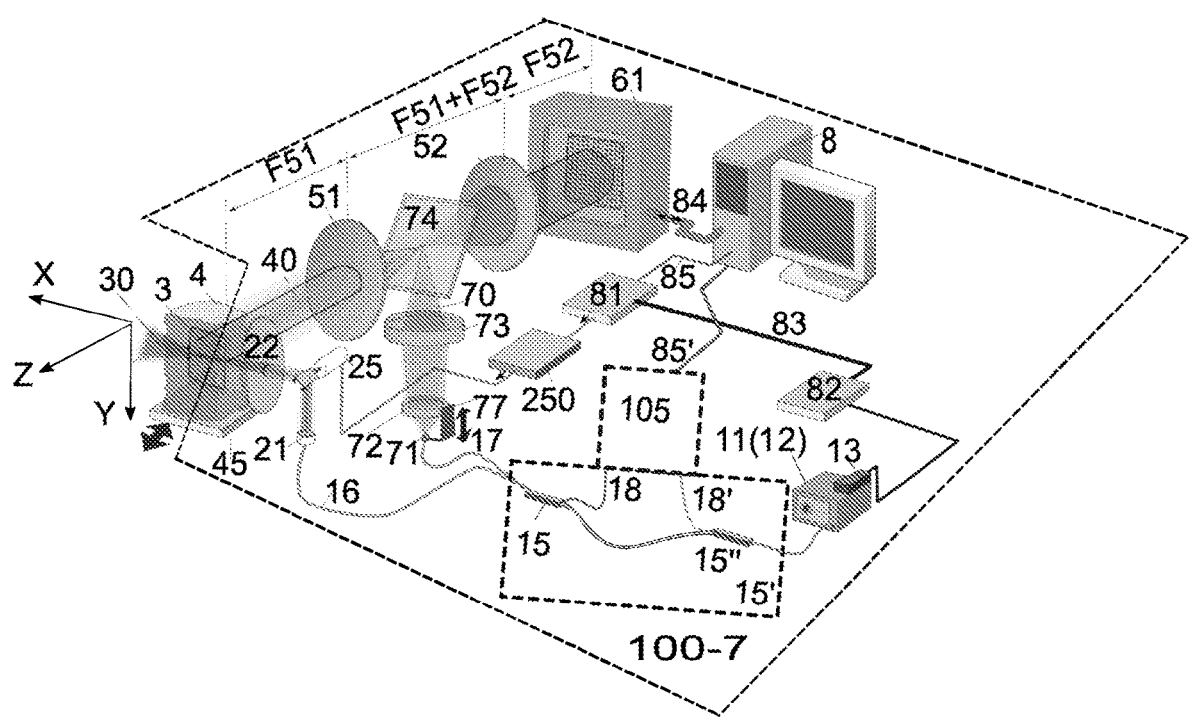
FIG. 7 shows a second embodiment of the invention using an excitation block that creates a light sheet by using an excitation scanner to scan an excitation sample wave through the sample volume.

Light Sheet Created by Lateral Scanning Using an Excitation Scanner 25, Photodetector Block 6 Containing a 2D Camera 61, Digital Path Correcting Mechanism FIG. 7 shows another embodiment of the invention using an excitation block 2 that comprises an excitation scanner 25 and a converging lens 22. The excitation scanner 25 scans the excitation sample wave 30 along a vertical direction, Y, through the converging lens 22. The wave 30 is swept through the equivalent volume of the light sheet created by the embodiment of FIG. 6b, generating a light sheet 3 in time. The excitation sample wave 30 in the sample 4 is positioned successively at V vertical y locations, illuminating H scattering centres along x for each selected y, to fill in the pixels of the 2D camera 61, row by row along h (direction parallel to X), with a row at v of H pixels for each coordinate y out of distinct V positions.

Combining LSOCM with Structured Light

To further reduce the contribution of multiple scattering, the light sheet can be interrupted by temporal modulation to enable structured illumination, or can be transferred via grids, diffracting elements, according to means known in the art of LSM. As disclosed in FIG. 7, a modulator block 13 modulates the optical source optical power with signal from a structured illumination (SI) driver 82. The modulation applied by the SI driver 82 is synchronised with the signal from generator 81 input to driver 250, powering scanner 25, via controlling line 83. The SI driver 82 creates a sinusoidal or a rectangular signal and its number of periods within the scanning interval of signal generated by 81 is controlled by the signal processing interface in the Signal processor and Display 8, via controlling link 85. This determines the frequency and shape of the signal generated by 81 as well as the number of cycles of 82 and its phase relative to the scanner signal, communicated via link 83. Two SI procedures are known in the art, a first method where 3 images are obtained, each for a different phase between the driving scanning signal and the optical source modulating signal, in steps of 120° each time, as presented in the paper "*Lateral modulation boosts image quality in single plane illumination fluorescence microscopy*", by T. Breuninger, K. Greger, and E. H. K. Stelzer, published in *Optics Letters*, 32(13), 1938-1940, (2007). For instance, for 5 cycles within the scanning interval, the sheet 3 will consist in 5 horizontal stripes, uniform along X, on-off or sinusoidally modulated along Y. Another method in the art is the HiLo method, as presented in the paper "*Three dimensional HiLo-based structured illumination for a digital scanned laser sheet microscopy (DSLM) in thick tissue imaging*", by D. Bhattacharya, V. R. Singh, C. Zhi, P. T. C. So, P. Matsudaira and G. Barbastathis, published in *Opt. Express* 20, 27337-27347 (2012). This employs an image with the SI grid applied plus a second image with uniform illumination.

Let us refer to a 3 phase imaging and a scanning interval of 1 ms. 3 images are collected, $I_1, I_2, I_3$, each corresponding to one of the phase value in the 3 phase steps sequence, this means a single en-face OCT image per depth requires at least 3 ms. A final image for the structured image, $I_S$ is obtained using:

$$I_S = \sqrt{(I_1-I_2)^2+(I_2-I_3)^2+(I_3-I_1)^2}. \tag{3a}$$

For SSOCT, tuning of source 11 will be repeated 3 times for each of the 3 phase steps, each time after a whole volume is acquired, each for a complete sweep in frequency. After obtaining the three volumes of intensities $I_{1,\nu}, I_{2,\nu}, I_{3,\nu}$, each corresponding to one of the phase value in the 3 phase steps sequence, a final volume for the structured image, $I_S$ is obtained using:

$$I_{S,\nu} = \sqrt{(I_{1,\nu}-I_{2,\nu})^2+(I_{2,\nu}-I_{3,\nu})^2+(I_{3,\nu}-I_{1,\nu})^2}. \tag{3b}$$

As proven with structured light illumination in prior art SLM, the contrast should increase due to elimination of blur due to multiple scattering. The same is expected here in the practice of OCT applied over the light sheet architecture.

For TDOCT, when a broadband source 1 is employed, a different strategy is applied, at each depth z, at least 3 images are collected for small OPD advancements, such as by ⅓ of the central wavelength of the source spectrum 12.

$$I = \sqrt{(i_1-i_2)^2+(i_2-i_3)^2+(i_3-i_1)^2} \tag{3c}$$

where $i_1$, $i_2$ and $i_3$ are en-face images for 3 steps of OPD change using translation stage 77. This means that for each final LSOCM image, 9 frames are needed, hence at least 9 ms.

For those skilled in the art, the modulator block 13 can also be a chopper or a grid placed in front of the excitation sample wave 30 in free space (not shown).

A single scanner is shown as 25, however this may also be a 2D scanning head, a group of two galvo-scanners, a group of an acousto-optic deflector or an electrooptic scanner such as a KTN deflector for fast scanning along Y with a galvanometer scanner for moving the sheet 3 to different Z positions.

The launching block 2 may include diffraction elements to create lattices of beams. In this case, the volume of SSOCT data is collected from the lattice, where each beam in the lattice determines its own spectral modulation.

To produce a LSOCM image, path integration of each A-scan gives the amplitude of the signal of each pixel (h,v) of the array 61.

Extra OCT Channel, Dual Mode of Operation, Dual View, Measurement of the Index of Refraction Along the Excitation Direction The embodiment in FIG. 7 can also optionally be equipped with another OCT system, 105, driven by the same source, 11(12). The splitting block 15' contains a second fibre splitter, 15", that delivers a reference wave via fibre 18' to the system 105, where system 105 receives light from the sample 4, returned back into splitter 15, along fibre 18. The extra OCT system 105 can serve two functions: (i) Index of refraction measurements and (ii) measuring of topography of the sample 4 in case there are large variations in the height e(y,z) of the sample 4 facing the excitation launcher, 2. A cross-section OCT image in the plane (x,y) with depth along X can be created by system 105 that can be compared with the LSOCM image. The lateral size of the LSOCM en-face image, ΔX, appears of optical path length nΔX along the depth axis of the cross-section OCT image of system 105. This suggests a unique possibility for index of refraction measurement n. Measurement of spatial variation measurements of n inside sample 4 becomes also possible, as the pitch of camera 61 is known and can allow accurate measurement of the geometric distance between scattering centres, that can be compared with the optical path between the same scattering centres measured in the cross section (B-scan) OCT delivered by the OCT system 105.

Creating a Reference Wave with Advanced Path Along Camera Pixels (Hardware Path Length Path Length Compensating Block 7')

FIG. 8 illustrates a hardware solution to compensate for the path variation of the excitation sample wave 30 along the lateral size, coordinate u, of the camera. This embodiment creates a reference wave 70 whose path lengths for the rays intercepting different pixels h, of the 2D camera 61 for each v=1, 2 . . . V (FIG. 6b, FIG. 7) or different pixels h of a 1D camera 62 for v=1 (FIG. 6a), match the path length of the scattered sample wave 40 progressing through the sample 4 along a line of scattering centres along X, parallel to the row of h pixels. Geometrical path length in the excitation sample wave 30 for a distance δx between the two scattering centres x and x' translates into an optical path length n(x'−x)=nδx, where n is an average index of refraction of the sample 4 imaged. Automatic adjustment of path difference is obtained by varying the tilt θ and magnification m of the forming image interface 5, here by using a magnifying telescope of lenses 51 and 52. Then the delay from a marginal ray to the next in the bunch of rays of the reference wave 70 is:

$$\Delta = m\delta x \sin\theta = n\delta x \quad (4)$$

giving:

$$m \sin\theta = n \quad (5)$$

With sin 30°=0.5, for an index of refraction n=1.4, m=n/0.5=1.4/0.5=2.82, this is feasible to be achieved. A lens 51 of focal length 5 mm and a lens 52 of focal length 2.82× 5=14.1 mm for instance can accomplish this condition. In this way, a reference path length is created for each lateral pixel in the camera that matches the path length of the scattered sample wave up to the scattering point in the sample 4 within the excited light path in the sample 4. The double are arrow shows that the angle θ can be adjusted to vary the reference path length to implement OPD=0 on each lateral pixel along X' in the camera, adjusting the angle θ. Correct adjustment can be checked differently depending on the OCT method employed. Let us consider a thin sheet of light. For instance, when using a broadband source 12 and TDOCT, when actuating on the length of the reference path 70, to cross the coherence gating axial interval where OPD=0, a perfect adjustment would mean that interference is seen on all columns of h pixels of 2D camera 61 (embodiment 100-9 in FIG. 9) or on all pixels along h of the 1D camera 62 (embodiment 100-12 in FIG. 12) at the same time. If by moving the reference stage 77 to change the OPD in FIG. 9 or 12, interference is seen "walking" from one column to next when using a 2D camera 61 in FIG. 9 or from a pixel to next when using a 1D camera 62 in FIG. 12, this means that the tilt of the reference wave front does not match the tilt of the scattered wave front due to the variation of the path length of the excitation sample wave, EL, and therefore the angle θ needs to be adjusted.

Figure 9:
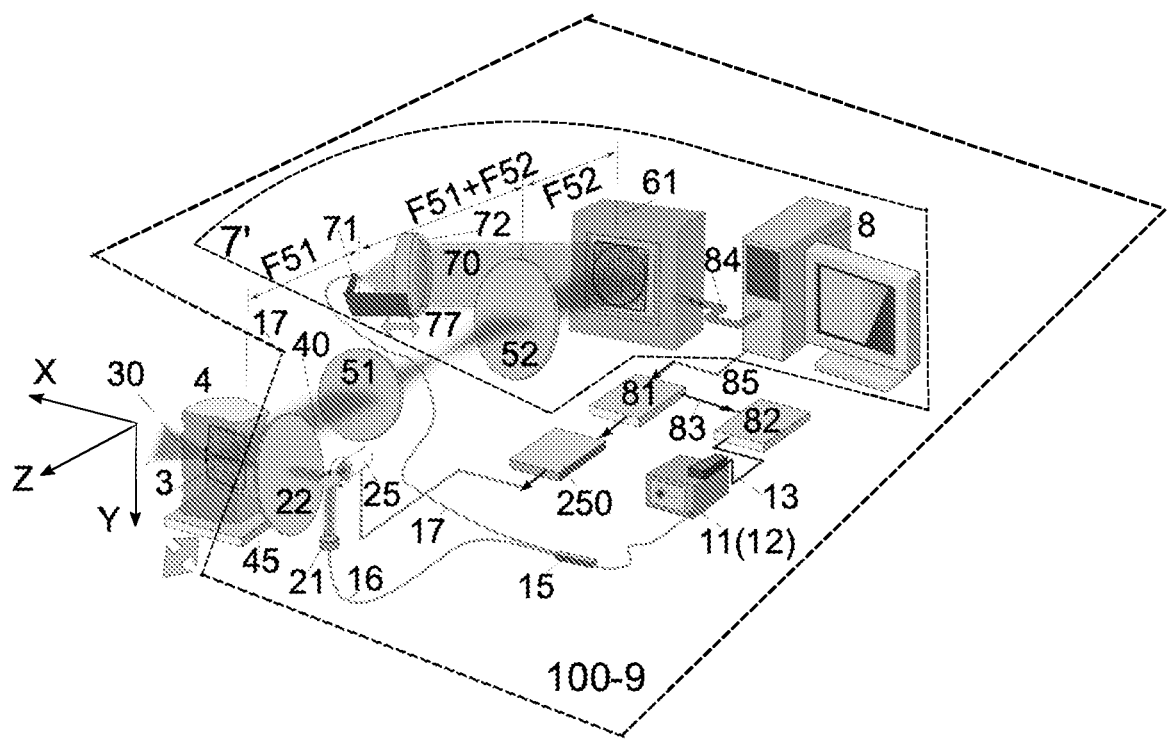
FIG. 9 shows an embodiment of the invention equipped with the embodiment in FIG. 8.

Light Sheet Created by Scanning Using an Excitation Scanner 25, Photodetector Block 6 Containing a 2D Camera 61 and where the Path Length Compensating Block 7' Employs a Reference Wave Sent Direct to the Camera 61 at an Angle FIG. 9 shows a similar embodiment to that in FIG. 7, however with the reference wave 70 tilted as explained in FIG. 8 and reaching the camera 61 direct. A similar procedure can be applied to the embodiments in FIG. 6a, FIG. 6b and FIG. 7. Similar tilt, but limited, can also be created in the embodiments in FIGS. 6a, 6b and 7 using the beamsplitter 74 to superpose the scattered sample wave 40 and reference wave 70. A tilt has also been used in the practise of full field swept source OCT (when using a swept source 11) and digital holography to create a carrier in the FT spectrum of the image created, to eliminate noise at low frequencies. However in those implementations the angle is small and its value does not depend on the path length of the sample wave travelling through the sample. In the invention, the angle is much larger and its value is uniquely determined by the camera pitch p and by the focal lengths of the focusing elements in the forming image interface to accommodate the path length variation of the excitation sample wave 30 propagating through the sample 4 along the excitation length, EL.

V Camera Frames for Each Deflecting Cycle

Let us say that the light sheet 3 is formed from scanning the excitation sample wave 30 vertically in FIGS. 7 and 9, over V=100 or V=1000 vertical distinct horizontal rows (V horizontal lines in FIG. 3). Only one line (or a few due to aberrations) in the camera 61 receives the line illuminated from the sample 4 at any distinct scanner 25 position. Along this line of pixels in the camera, interference takes place and signal is processed according to the different modalities disclosed later. The rest of pixels collect light from the reference power only, hence no interference, noise only. To reduce the noise created by lines in the camera 61 reached by the reference wave 70 only, cameras with rolling shutters can be advantageously used, such as sCMOS cameras. These allow exposing a single line of pixels, as the pixels in rows can be addressed and read out independently from other rows. For other cameras that cannot do a shuttered regime line by line, in order to avoid the 2D camera integrating over these noisy pixels, each camera 61 frame is filtered line by line. A threshold can be used to eliminate the pixels presenting noise. Another possible procedure consists in establishing a calibration procedure depending on the scanner tilt, for each tilt, it is known which line in the camera 61 should receive light. Hence signal from only those rows of pixels, where interference is expected to take place, are finally retained from each frame. For this mode of operation, the 2D camera 61 operates fast, collecting a whole frame for the duration of the excitation sample wave sitting at each coordinate v in the overall light sheet 3 to be created. Using a ultra-fast camera, such as Photron, at 10 KHz frame rate, for V=100, the scanner 25 performs a scan in 10 ms, or for V=1000, at 0.1 s. Such long times are compatible with saw-tooth signal applied by driver 250 to a galvo-scanner. For each frame, only one horizontal line is later retained and then all lines amalgamated in a "V-lines frame" for each frequency value of the swept source. The scanner is slower than the camera by V times. If then sweeping is applied of the swept source 11, for 500 pixels in depth Z, R=1000 complete frames, each of V-lines are required for each optical discrete frequency of the swept source, hence 10 or 100 seconds tuning period and equivalent volume acquisition, ie a total of RV individual camera frames, $10^5$ or $10^6$ respectively. Although this solution seems feasible, it would take too long. A solution that is faster while relaxing the demands for a fast camera is disclosed in the next section.

A Single Camera Frame Per Each Deflecting Cycle

Figure 10:
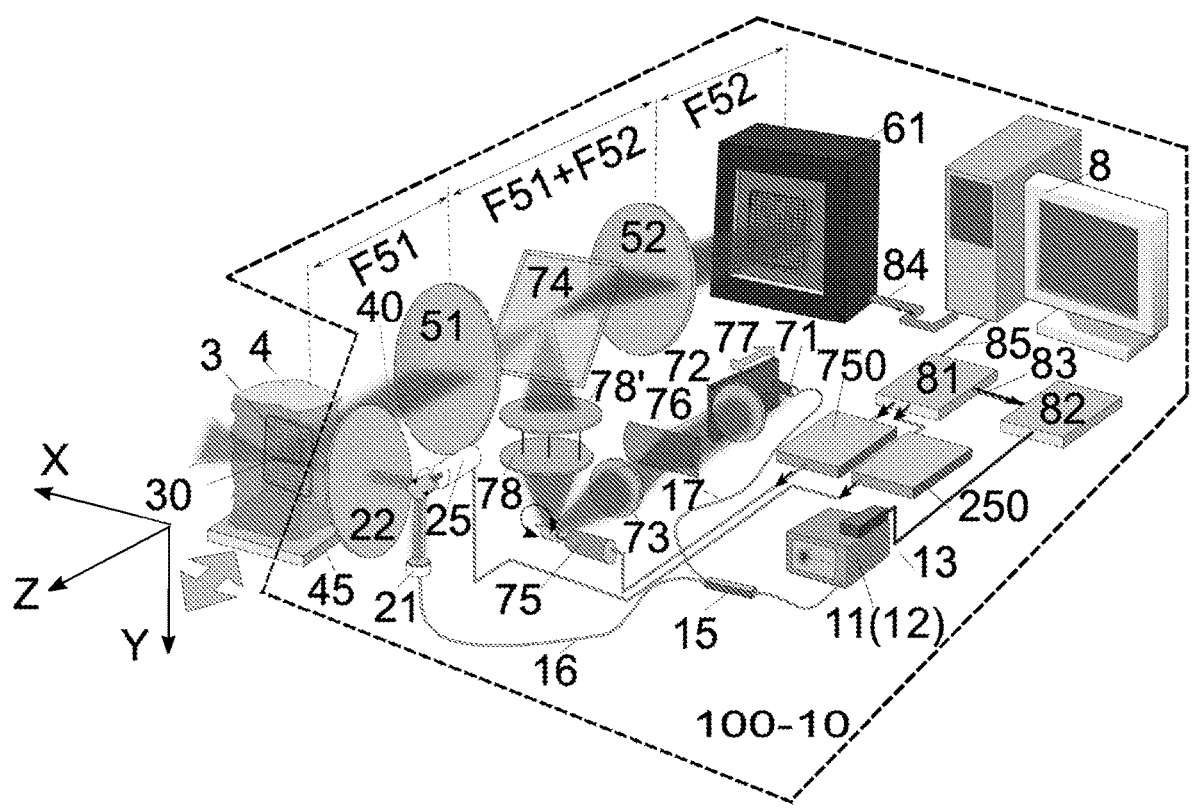
FIG. 10 shows an embodiment of the invention using two scanners and a 2D camera.

Light Sheet Created by Scanning Using an Excitation Scanner 25, Photodetector Block 6 Containing a 2D Camera 61, A Reference Block 7 Containing A Scanner 75 and Digital Path Correcting Mechanism The embodiment in FIG. 10 avoids the 2D camera integrating signal from rows not illuminated by the scattered sample wave 40, that represents a deficiency of the embodiments in FIGS. 7 and 9. In FIG. 10, a $2^{nd}$ scanner, 75 is placed in the reference block 7 part of the Path Length Compensating Block 7'. The reference wave is shaped as a light sheet and is scanned by the scanner 75 over the lens 52 via beamsplitter 74. The angular extension of the reference wave 70 as seen by the beamsplitter 74 should be similar to the angular extension of the scattered sample wave 40, produced by excitation sample wave 30 scattered by sample 4, as seen by the beamsplitter 74 via lens 51. Due to synchronous scanning performed by scanner 75, the reference wave 70 is projected on the same row v of pixels of the 2D camera 61 as illuminated by the scattered sample wave 40. Different implementations are possible as known in the art of scanning an illuminated line over a plane. As an example, the reference block 7 may consist in a telescope of reference collimator 72, cylindrical lens 76, lens 73, scanner 75 and telescope of lenses 78 and 78'. The figure shows the scattered sample wave 40 for the case when the scanner 25 launches the excitation sample wave on the axis of the forming image interface of telescope of lenses 51 and 52. A reference line is scanned vertically over the 2D camera 61 in synchronism with the line scattered from sample 4 due to excitation sample wave 30 being scanned through the sample 4 by the excitation scanner 25.

Other means known in the art can be used, with other groups of lenses in the reference block 7 to perform the same function as lenses 72, 76, 73, 78 and 78' around a scanner 75, for instance by using parabolic reflectors that are wide band achromats.

Other arrangements are possible, as known in the art of projecting sheets of light. These may include slits in combination with cylindrical lenses, to spatially filter the reference wave, or spatial light modulators (SLM)s to create a 1D distribution of the reference wave 70. If a SLM is used, then this can also accomplish the scanning function of scanner 75.

In the embodiment in FIG. 10, in opposition to the operation of the embodiments in FIGS. 7 and 9, the 2D camera 61 integrates for the whole duration of scanning time interval T of the beam being deflected by the excitation scanner 25 through sample 4, ie all lines in the light sheet 3, for all values V of the coordinate v, go into a single camera frame. For example, at a period S=10 ms sawtooth signal applied to the scanners 25 and 75 by drivers 250 and respectively 750, the 2D camera operates at $1/T_C$=100 Hz. Collecting 1000 frames for an axial scan to cover 500 distinct depths, would mean a $T_A$=10 s necessary for volume inspection. Considering a number of lateral pixels H and V of 100 to 1000, the volume size has (100–1000)×(100–1000)×500 voxels.

In comparison with embodiments in FIGS. 7 and 9, for structured illumination the step in phase is applied between the signals applied to the two drivers 250 and 750 of the two respective scanners 25 and 75 on one side and the sinusoidal or rectangular signal delivered by the SI driver 82 to modulator 13 on the other side.

Restoring Confocality

Confocality can be restored by reinstating the flying spot principle, ie by scanning the sample point by point, is by departing from a full field imaging, at the core of LSM and reintroducing some sort of lateral beam scanning in the detection path. At any given time, for each selected y coordinate, all x pixels along X are illuminated at once by the excitation sample wave 30. Therefore, confocality along X cannot be restored. However it makes sense to restore confocality along Y, as the lateral scanning along Y axis illuminates a single row of scattering centres in the sample 4 at y (conjugated with the pixels in the row v of the camera) at a time. In this case, the camera in the photodetector block 6 can be a 1D linear array of photodetectors or a line camera 62.

Figure 11:
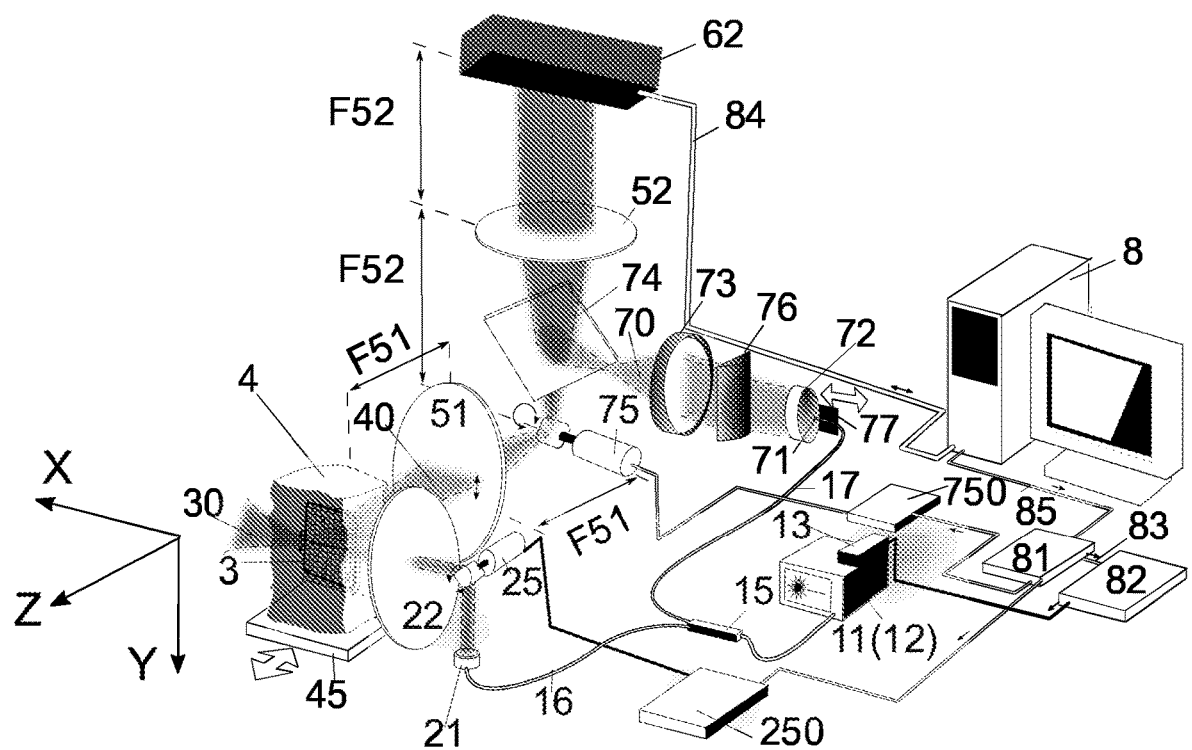
FIG. 11 shows an embodiment of the invention using two scanners and a 1D camera.

Light Sheet Created by Scanning Using an Excitation Scanner 25, a Photodetector Block 6 Containing a 1D Camera 62, a Forming Image Interface 5 Containing a Scanner 75, Digital Correcting Mechanism An embodiment that enhances confocality according to the seventh aspect of the invention, by ways of using a 1D camera is shown in FIG. 11. Irradiating the sample 4 by a single line at a time deprives other parts of the sample 4 of light that otherwise would have scattered light towards the camera. Exciting a single line (along X) of scattering centres at y at a time, in conjunction with a 1D camera (or a linear photodetector array) reduces contribution of scattering coming from scattering centres along X, above and below y. Using a 1D camera has the added advantage of speed and cost, in comparison with that of expensive 2D high rate cameras. There are line CMOS cameras operating at over 300 kHz line rate, such as Basler Sprint spl4096. Let us consider such a camera 62 operated at $1/T_C$=100 kHz reading rate, with $T_C$ the camera integration time. Using the scanner 75 and the H pixels in the 1D camera 62, a stitched raster image is obtained of V rows. Considering V=100 pixels along each column in the stitched raster, conjugated with V scattering centres along Y-axis in the sample 4, this means that if per each horizontal line in the stitched frame we allocate 10 microseconds, V=100 lines can be acquired from the sample in 1 ms. Both excitation sample wave 30 and the scattered sample wave 40 are deflected in 1 ms, up and down, meaning 2 ms per cycle, hence 500 Hz triangular driving signal applied to both the excitation scanner 25, and the scattered sample wave scanner 75. In this way, the 1D camera 62 (line camera) receives the scattered sample wave, line by line along X but from different y positions. To compensate the vertical movement of the scattered sample wave 40 before lens 51, the scanner 75 is used to implement de-scanning. Consequently, a line of light over the photo-detector pixels of the 1D array 62 results, that maintains its spatial position (static) but of different content for each V=1, 2 . . . V. The line of pixels along X in the sample is conjugate with the line of pixels in the 1D camera 62, due to a telescope in the forming image interface 5 made by lenses 51 and 52. To produce interference, a reference wave is split from the optical source 11(12) using the fibre splitter 15, conveyed as a light sheet diverging towards the beamsplitter 74 in the same way as the scattered sample wave 40 diverges towards beamsplitter 74 in order to produce similar light extension on the 1D camera 62 for both waves 40 and 70.

The two scanners 25 and 75 are driven in synchronism by the same signal generator 81, via respective drivers 250 and 750. Using means known in the art, the two scanning devices 25 and 75 can be collapsed into a single device, by using the opposite facets of a tilting mirror.

The reading of the 1D camera 62 is also synchronised with the signal driving the two scanners, via links 84 and 85. As an example, for each position y, corresponding to a line v in the final stitched image raster of V lines, the two scanners sit $T_C=10$ microseconds for each v and do V=100 or 1000 steps on each ramp under a triangular wave of period S=2 or 20 ms. For 2R=1000 distinct optical frequencies, to allow R=500 distinct points in depth z, the sweeping should be done in $T_A=2R \times V \times T_C=2$ or 20 s. This corresponds to the time of collecting the whole volume of H×V×R points from the sample volume. Speeding up the camera to 300 kHz would give a volume acquisition time of $T_A=6.6$ s for V=1000 and the two scanners operating at a period S=6.6 ms.

For the embodiments in FIGS. 6a, 6b, 7, 10 and 11, the Path Length Compensating Block 7' relies on digital signal processing to compensate for the delay encountered by the excitation sample wave 30, performed in the Signal Processor and Display block 8. For the embodiment in FIG. 9 and that presented in the following section, in FIG. 12, a similar hardware correcting path as disclosed in FIG. 8 is implemented by the Path Length Compensating Block 7'.

Figure 12:
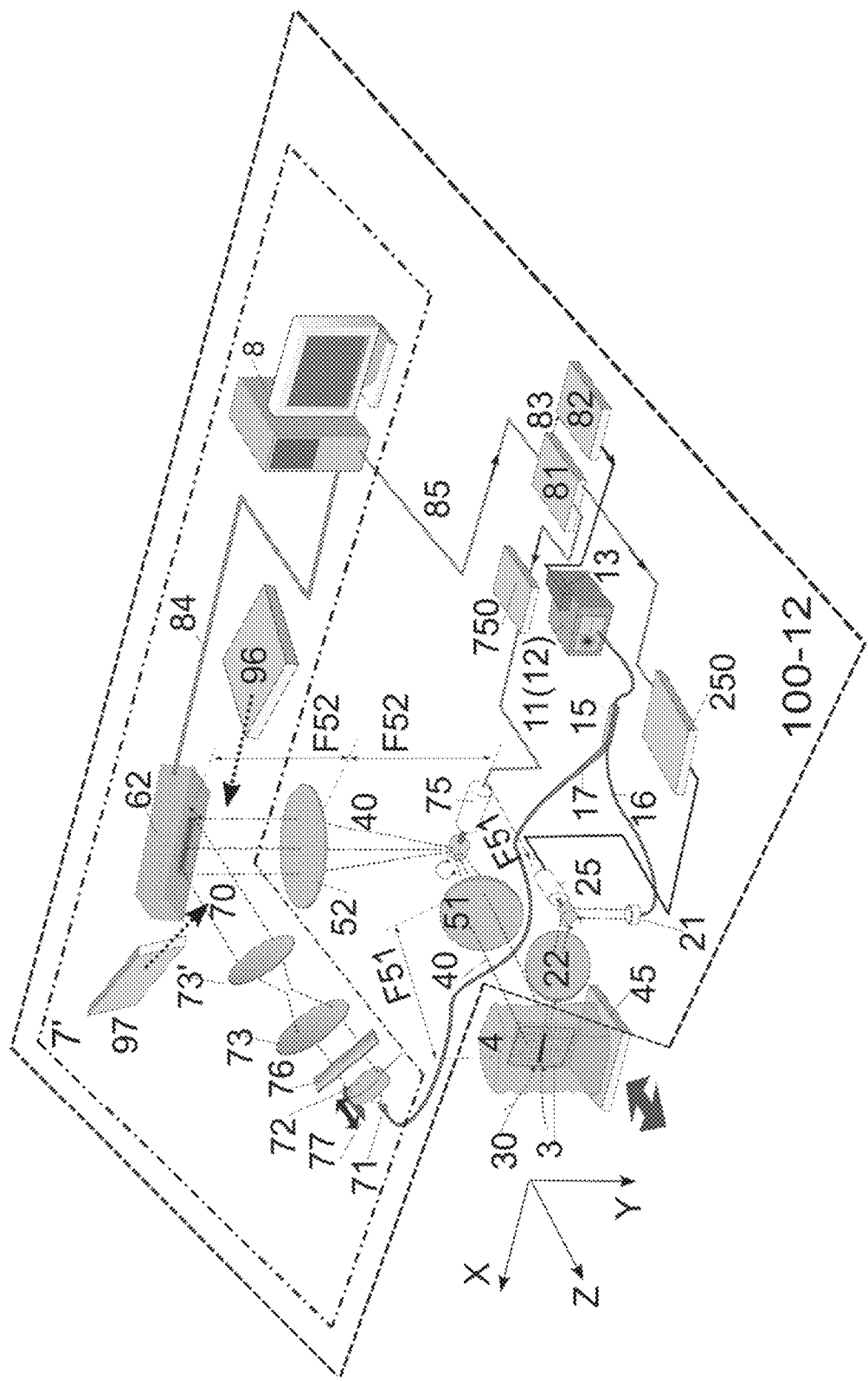
FIG. 12 shows another embodiment of the invention using a 1D camera.

Light Sheet Created by Scanning Using an Excitation Scanner 25, a Photodetector Block 6 Containing a 1D Camera 62, Forming Image Interface 5 Equipped with a Scanner 75 and where the Path Length Compensating Block 7' Employs Reference Wave Sent Direct to the Camera 62 at an Angle FIG. 12 discloses another version of the embodiment in FIG. 11, with the added benefit of hardware correction of OPD in the Path Length Compensating Block 7'. Here, the reference wave 70 is launched directly to the 1D camera 62, avoiding the need of a beamsplitter to superpose the two waves, scattered sample wave 40 and reference wave 70. The reference wave 70 is launched from the tip 71 of reference fibre 17 to collimator 72, followed by a cylindrical lens 76 towards a telescope of lenses 73 and 73'. The combined SLOCM system 100-12 can be easily reconfigured to perform conventional SLM regime by blocking the reference wave 70, either by using a fibre switch or an opaque screen 96. Fluorescence, or CARS, or STED, or Raman can also be simply reinstated by adding a filter 97. The same procedure of restoration of the LSM conventional regime is also implementable on the embodiment in FIG. 9 using a 2D camera 61.

A disentanglement of path variations along X and along Z for the camera shown in FIG. 4a and FIG. 4b can be obtained by engaging imaging systems from different directions, as disclosed below.

Figure 13:
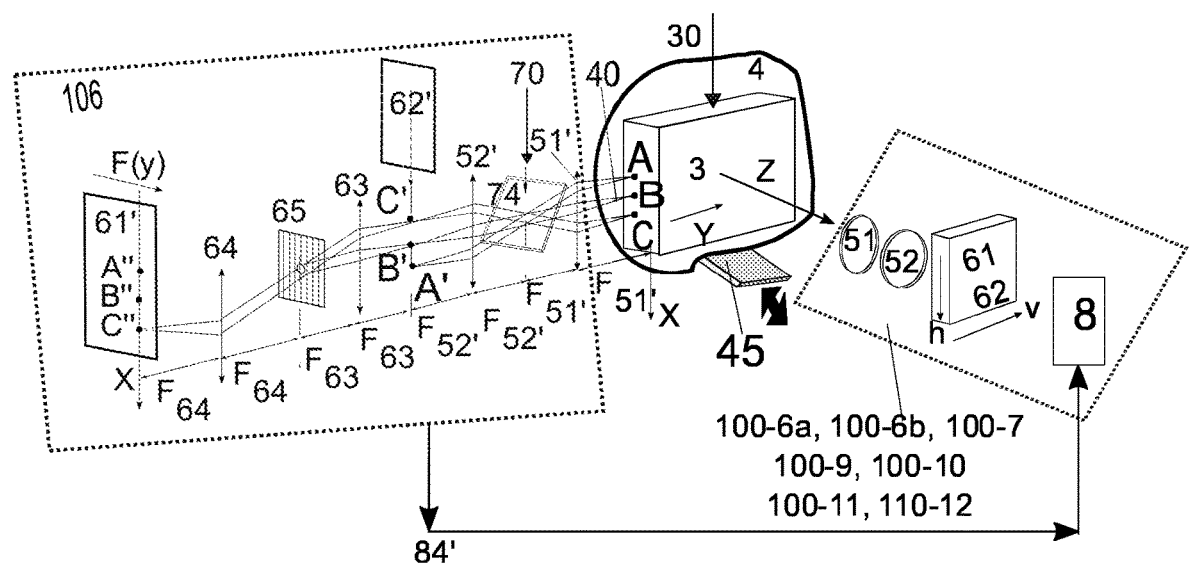
FIG. 13 shows an embodiment of the invention equipped with an extra full field OCT channel producing cross-section OCT images.

LSOCM Equipped with an Extra Imaging System with Light Sheet in the Detection Plane FIG. 13 discloses an embodiment of the invention where an extra imaging system 106 employs orientation of a light sheet 3 in the detection plane (x,z) and not perpendicular to the detection plane, as usual in the prior art LSM. This extra system complements an imaging system according to the invention, either 100-6a, 100-6b, 100-7, 100-9, 100-10, 100-11, 100-12. All LSM prior art configurations have the light sheet oriented perpendicular to the detection path, to be displayed on the camera, such as 61 in FIG. 13. With reference to imaging system, 106, adding coherence gating to inspection at a large angle allows a radical change in relative orientation of the light sheet 3, where the light sheet can be extended in the exact direction that conventional LSM demands the sheet to be the thinnest, in this case, Y, that is along the detection path. Light is launched into the sample along X and extends as a sheet along Y. However, for such a system, Y is along detection path and for the imaging system 106 represents the depth coordinate (and a case of thick light sheet). Light is launched along X from the top towards points A,B,C in the sample 4 and extends as a sheet along Y. Reference wave is added to the scattered wave 40 using a beamsplitter 74' and using a tapped radiation fraction from the OCT source 11(12) as in previous embodiments (not shown).

Both LSOCM system 100-6a (or any of 100-6b, 100-7, 100-9, 100-10, 100-11, 100-12) and the system 106 are under the control of a Signal Processor and Display system 8. The division of light between the two systems and provision of reference wave is performed using splitters as in previous embodiments and not shown in FIG. 13 for simplicity.

LSySpOCT. Implementing Ultra High Resolution Based on SpOCT Spectrometer Based OCT Such a configuration employs a ultra-broadband source 12 in both the LSOCM system 100-6a (or any of LSOCM systems in FIGS. 6b, 7, 9, 10, 11, 12) and in the imaging system 106. The system 106 implements the spectrometer (Sp) based OCT principle. A spectrometer-based OCT instrument processes the modulation of the optical spectrum due to an optical path difference, in this case along the depth coordinate axis Y. The spectrometer consists in a diffraction grating 65, lenses 63 and 64. Points A,B,C in the sample illuminated by the excitation sample wave 30, form their images via telescope of lenses 51' and 52' into the plane of points A', B', C'. Point C' is imaged as C" on the 2D camera 61'. Similarly, points A' and B' are imaged as points A" and B" above C". The grooves of the diffraction grating 65 are oriented along axis X. Diffraction of spectrum takes place in a plane (y,z). F(y) represents the spectral coordinate associated with diffraction of spectra, that is in the plane (y,z), but whose axis is not parallel with Y, as the lens 64 and camera 61' are placed along the direction of the diffracted order due to grating 65 being projected on the camera 61', direction tilted from the axis Y. Points A, B, C along the light propagating through the sample 4 are projected on the camera 61' via the forming image interface consisting in a telescope of the two lenses 51' and 52', lenses 63 and 64 and the diffraction grating, 65. For instance, all depths below each of the points A, B, C in the sample 4 along depth, Y, modulate the optical spectrum, the deeper they are, the denser the spectral modulation. In this way, after FFT or MS processing of data along F(y), a cross section (B-scan) OCT image is obtained, oriented along the lateral vertical axis X, and the depth in the sample along Y. The depth y along Y is encoded in the modulation of spectrum diffracted along direction F(y). Expected resolutions are: lateral, along X, limited by diffraction to sub-micron and axial, along depth Y, determined by the bandwidth of the optical source 12, to submicron using over 200 nm bandwidth supercontinuum source extending to visible, or a few microns if in infrared.

A dual imaging mode can be implemented using camera 61' in the system 106 in FIG. 13 that can operate at kHz rate, using the SpOCT regime, to deliver B-scan OCT images in the plane (x,y). Using a fast Microton camera, this can deliver speckle fluctuations in the sample 4 taking place in ms range and using a ultra-fast 2D camera such as from Photron, at tens of kHz or higher when using reduced regions of interest. At the same time, the LSOCM 100-6*b* (7, 9, 10, 11, 12) can monitor the structure in the same en-face slice in the plane (x,y) at a slower rate.

LSySSOCT. Swept source OCT. Similar functionality as above is achievable using a swept source 11 to feed both system 106 and LSOCM system and elimination of the grating, where based on SSOCT, OCT cross sections (B-scans) are obtained employing a 1D camera, 62', placed in the plane of image points A', B', C', as shown by the dashed line and arrow. By sweeping the frequency of the swept source 11, (not shown), a similar cross section OCT as above is obtained again. Expected resolutions are: lateral, diffraction limited to sub-microns and in depth along Y, submicron 5-7 microns using an available commercial swept source from Axsun or Santec, bandwidth of 100 nm, and better if making use of wider tuning bandwidth swept sources to be developed.

In both LSySpOCT and LSySSOCT, system compensation for the optical delay of the sample wave, due to travel of the excitation sample wave 30 along axis X in the sample 4 in the imaging system 106 is obtained by digital signal processing.

For the LSySSOCT operation, the principle of path compensation disclosed in FIG. 8 can also be applied, similar to embodiment in FIG. 12, to the camera 62', by either tilting the direction of the reference wave 70, or by launching the reference wave 70 at the right angle towards the camera 62', eliminating the need for splitter 74'.

In both cases above, volumetric inspection is achieved by moving the sample 4 along Z and collecting multiple OCT cross section images. When using SpOCT, at a frame rate of $1/T_C=400$ Hz using a 2D PCO camera, 400 z cross section OCT images are obtained in $T_A=1$ s. When using SSOCT and a 1D camera, the same number of frames will determine 200 depth resolved points along the depth Y coordinate, however in the later case, acquisition can be faster.

Dual Mode of Operation, Dual Full Field View, Measurement of the Index of Refraction Along Two Rectangular Directions In addition to the dual view mode disclosed by the embodiment in FIG. 7, another possibility is disclosed by the embodiment in FIG. 13. This illustrates two modes of operation unique to the invention, dual view and measurements of the index of refraction along at least a direction in the sample.

Dual view: Two imaging systems inspect the sample 4, the LSyOCT system 106 delivering OCT B-scans in the plane (x,y), using camera 61' (or 62'), to provide topography data to the LSOCM system, that could be any other embodiment 100 in the disclosure in FIG. 6*a*, 6*b*, 7, 9 10, 11 or 12, ie 100-6*a*, 100-6*b*, 100-7, 100-9, 100-10, 100-11, 100-12 delivering an en-face LSOCM image in the plane (x,y). Such systems can be also configured to perform LST or fluorescence LSM or Raman LSM.

Volumetric OCT inspection in two orthogonal systems: Volume inspection in the LSyOCT 106 and LSOCM 100 is achieved by moving the sample 4 along Z using the translation stage 45. In this case the LSyOCT 106 system collects multiple B-scans and the LSOCM 100 multiple en-face slices from different depths in the sample 4.

Measurement of the local index of refraction. For simplicity of explanation let us suppose that the sample 4 (an embryo, a worm, biopsied tissue) is squashed flat against an optical window towards the system 100-6*b* (or any of LSOCM versions in FIGS. 7,9,10,11,12) and squashed flat against an optical window toward the system 106. This makes $\delta l_Z=0$ and $\delta l_Y=0$ (as shown in FIG. 4*b*), reducing the variation of path length travelled by the sample wave to the value of the path travelled by the excitation sample wave 30 along X, only.

Along X using the LSyOCT 106: Comparing the differential delay $\Delta'_X$ between A-scans delivered by two adjacent camera pixels along X in either of the cameras, ie 61' (or 62') with the pitch of the cameras, $p'_X$ along X, and knowing the magnification of the forming image interface m', consisting in lenses 51', 52', 63, 64, the equivalent pitch in the sample is $p'_X/m'$, the index of refraction $n_X$ is obtained and its variation along X. Then $$\Delta'_X = n_X p'_X/m' \qquad (6)$$

and so, $$n_X = m'\Delta'_X/p'_X \qquad (7)$$

Along X using the LSOCM 100: Comparing the differential delay from pixels along X (ie along h) in either of the cameras, ie 2D camera 61 in the embodiments 100-6*b* (or LSOCM systems in FIG. 7, 9 or 10) or 1D camera 62 in either of embodiments 100-11 or 100-12 with the pitch of the cameras, $p_X$, and knowing the magnification of the forming image interface m consisting in lenses 51, 52, the index of refraction $n_X$ is obtained and its variation along X. Let us consider the delay measured between A-scan peaks $\Delta_X$ from signals of two consecutive pixels along h in the camera plane. Then $\Delta_X = n_X p_X/m$ and so, $n_X = m\Delta_X/p_X$.

Along Y combining data from both imaging systems in FIG. 13, from LSyOCT 106 and from LSOCM 100-6*b* (or any of the LSOCM systems in FIGS. 7,9,10): The method is based on comparing the path differences in the OCT image along its depth, coordinate y, given by system 106 with the distance between features along y (ie along v) in the LSOCM image given by system 100-6*b* (or any of the LSOCM systems in FIGS. 7, 9, 10). Once features are correlated in the two images, geometric path difference between them $\Delta'_Y/n_Y$, measured in the image generated by the 2D camera 61' or the 1D camera 62' in the LSyOCT system 106 is compared with the pitch $p_Y$ corrected for magnification m along Y in the 2D camera 61 in 100-6*b* (or LSOCMs in FIGS. 7,9,10). From multiple measurements along y, $n_Y = m\Delta_Y'/p_Y$ is calculated and an average $n_Y$ obtained.

Along Y combining data from both imaging systems in FIG. 13, from LSyOCT 106 and from LSOCM 100-11(12): The same as the above, however here the pitch along v, $p_Y$ is not physical as in a 2D camera. Considering that the excitation sample wave 30 is moved by scanner 25 along Y by a step size corresponding to the Rayleigh lateral extension due to diffraction, w, with magnification m for the forming image interface 5, this corresponds to lines in the 2D stitched frame formed from V readings of the camera 62, separated vertically by mw, ie this is the equivalent pitch, $p_Y$. As above, $n_Y = m\Delta_Y'/mw = \Delta_Y'/w$.

iSPI-LSMOCT (Two Microscope Objectives Dipped into a Petri Dish or Immersed in Fluid) and Hardware Solution for Path Compensation A version of LSM in prior art is a compact inverted selective plane illumination microscopy system (iSPIM), as presented in the paper "Inverted selective plane illumination microscopy (iSPIM) enables coupled cell identity lineaging and neurodevelopmental imaging in Caenorhabditis elegans", by Yicong Wu et al., published in *Proceedings of the National Academy of Sciences* 108.43 (2011), pp. 17708-17713. A compact combined system, with bulk adjustments, no fibre, created around the LSM version of inverted selective plane illumination microscopy (iSPIM) is disclosed in FIG. 14. The configuration allows an inverted microscope with microscope objective 92 below the sample support 41 for convenient positioning of the specimen 4. Support 41 can be a Petri dish or part of a microfluidic channel. The microscope objectives 79 and 88 are used to compensate for dispersion in the sample path due to the excitation cylindrical lens 26, and Detection microscope objective, 57. Splitter 15 splits the light into the excitation sample wave 30 and reference wave 70. After 15, the reference wave 70 travels via microscope objective 79 to a mirror 87, then to another microscope objective 88. Splitter 74 performs superposition of the scattered sample wave 40 from the sample 4, with the reference wave 70. Splitter 74 is only schematically shown here as a single component, in practice may contain several plate beamsplitters to secure superposition of the two waves either colinearly or making an angle. The angle between the axes of 88 and 57 can be adjusted to allow operation according to the hardware solution in FIG. 8, in order to implement a bulk path correction of OPD variation in the sample 4 along the direction X of the excitation sample wave launched by the cylindrical lens 26.

OPD can be adjusted by conveniently tilting microscope objective 79 and mirror 87 and moving vertically the assembly 89.

Splitter 74 can also be eliminated (hence shown in dashed line) and in its place camera 61 to be placed. Either way, with or without splitter 74, adjustment of angle between the two interfering waves can be performed on the camera 61 as disclosed in FIG. 8

The whole assembly of the 4 microscope objectives, camera 61, OCT source 11(12), mirror 87 and splitters 15 and eventually 74 are on a mount 89 that can be moved vertically on a pillar (not shown). The vertical displacement of 89, adjusts the depth z in the sample 4. This configuration is compatible with both broadband excitation and swept source to perform either TDOCT or SSOCT. For TDOCT, the block adjustment 89 modifies the z depth position in the sample 4 correlated with the height position of the Petri Dish 41, to implement at least 3 phase shifts for phase shifting interferometry. For SSOCT, an OPD=0 outside the sample volume is selected.

Figure 14:
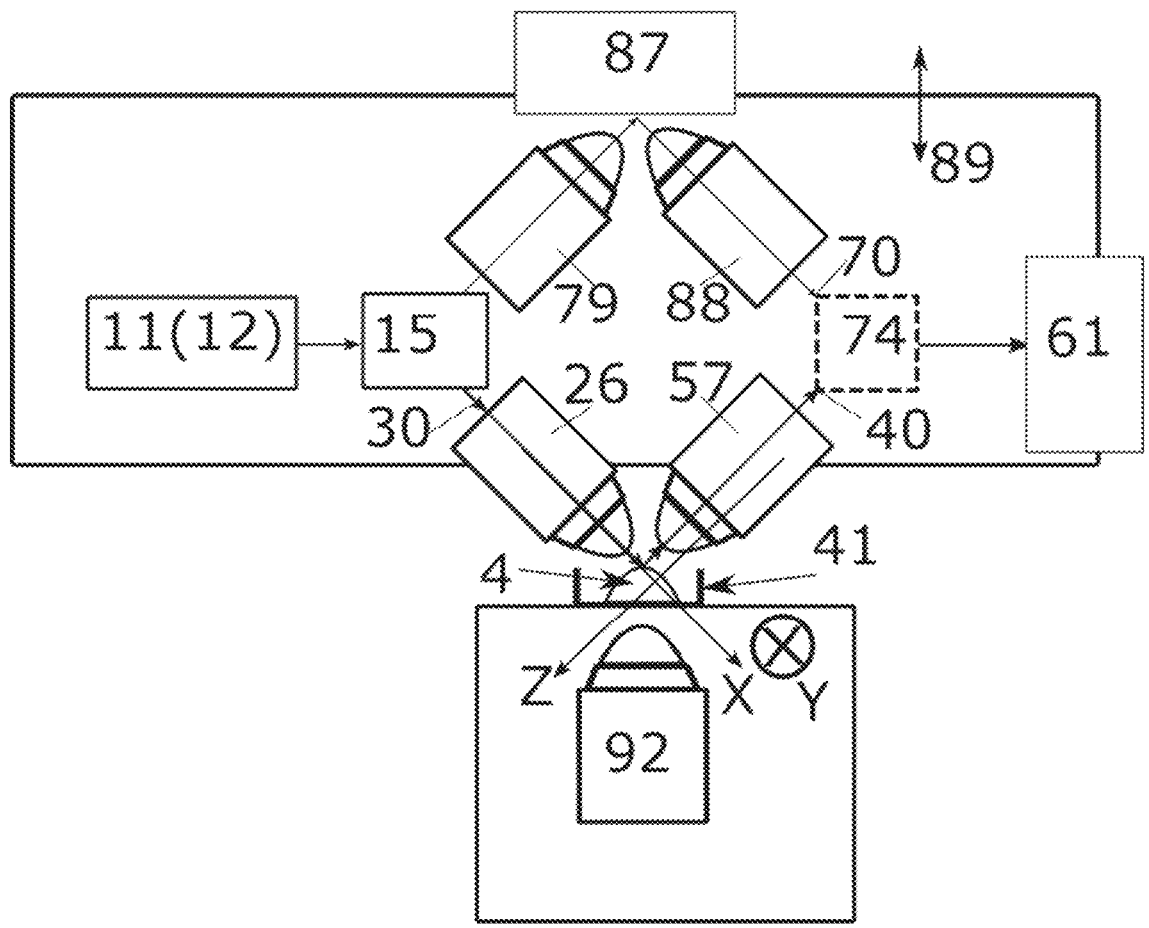
FIG. 14 shows a compact bulk optics embodiment of the invention, compatible with immersion into fluids.

Another problem addressed with configuration in FIG. 14 is that of possibility of avoiding aberrations at interfaces with the mounting environment, where microscope objectives 26 and 57 are immersed in index matching gel, according to LSM technology known in the art, as explained in Adam K. Glaser et al. "Multi-immersion open-top light-sheet microscopy for high-throughput imaging of cleared tissues". en. In: *Nature Communications* 10.1 (July 2019). Number: 1 Nature Publishing Group, pp. 1-8. issn: 2041-1723. doi: 10.1038/s41467-019-10534-0. All the set-up can also be upside down positioned to have the specimen above, like using an inverted microscope and having a conventional inspection microscope from the top.

Portable LSOCM

Figure 15:
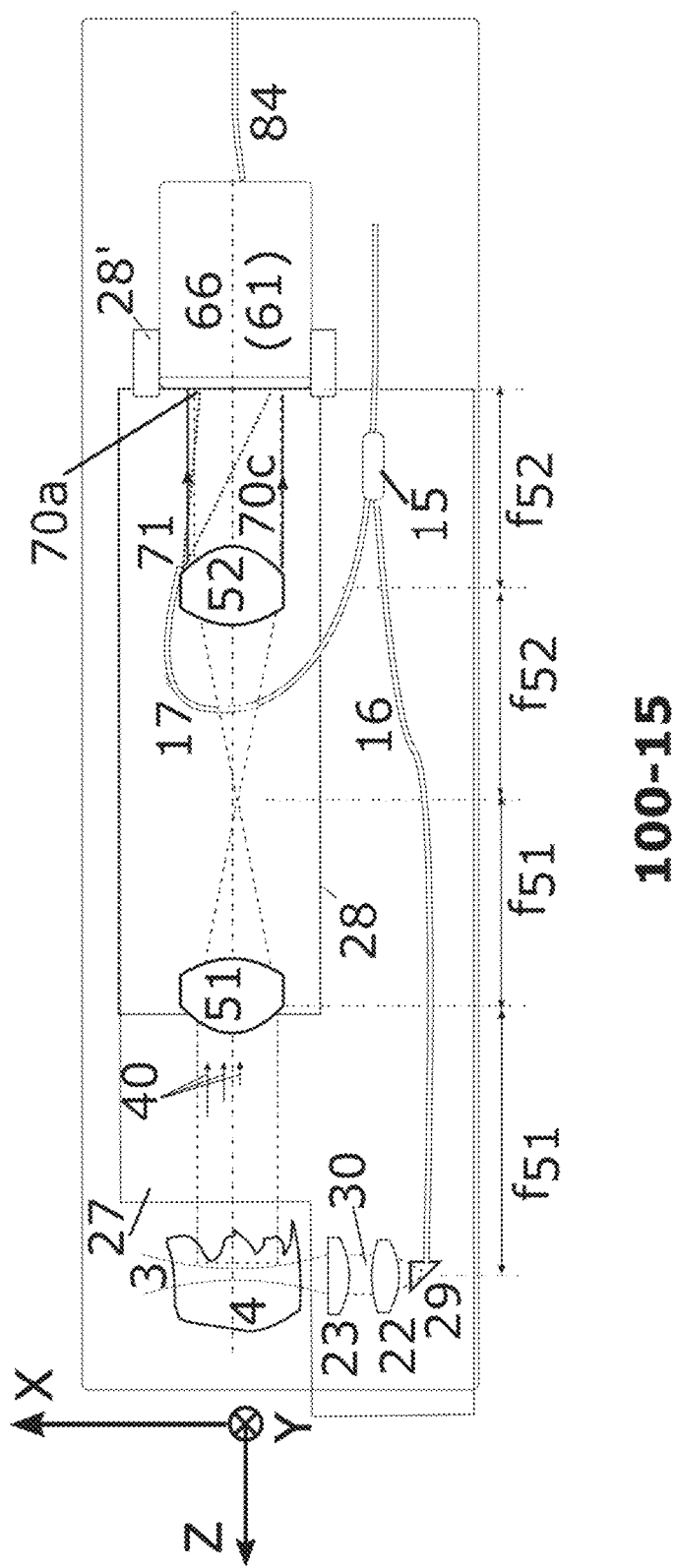
FIG. 15 illustrates an embodiment of the invention using a distant end adapter with a fibre bundle

FIG. 15 illustrates an embodiment that makes use of a portable adapter. The adapter 27 contains the splitter 15, the forming image interface 5 (FIG. 3) with lenses 51 and 52 that can be mounted via fixtures 28 and 28' on a fibre bundle 66 to convey light to a 2D camera (not shown) or a 2D camera 61 is mounted instead of the bundle. Excitation block 2 contains the fibre 16, a prism 29, collimator 22 and cylindrical lens 23, that conveys an excitation sample wave 30 towards the sample 4, forming a light sheet 3 at the focal length of lens 23. The reference wave 70 launched from fibre tip 71 creates rays of length 70*a* shorter that the length 70*c*.

An adapter is disclosed in the patent application by A. Podoleanu, M. Marques, M. R. Hughes, "Imaging apparatus and method", US2020/0037871 A1. Here we incorporate the solution of grouping the splitter 15 with the distal end of a fibre bundle for better control of the excitation path length, EL. The above mentioned patent application employs the conventional superposition of excitation and detection, where the excitation is at a shallow angle with the detection direction, ie all pixels in the sample are illuminated in a full field configuration from the same side of the camera 61 (bundle 66). Shallow incidence in the aforementioned patent application was in line with the need to make the adapter as thin as possible. Here there is no restriction in terms of lateral size, hence we launch a light sheet 3 laterally to the sample 4, while taking advantage of easier handling and portability that an adapter and bundle allows.

The mechanism of creating path differences for the rays within the reference wave 70 differs from that in FIG. 8, as here, due to confinement of space, no extra collimator can be used on fibre tip 71. Therefore here light is left to propagate in free space and the path varies along an arc and not linearly along the camera 61 (bundle 66) facet. Consequently, this type of launching reference wave can secure an approximative OPD path adjustment only. Let us consider that an extreme ray from the fibre tip 17 exhibits a normal incidence on the fibre bundle facet 66 or 2D camera 61, in which case the path length 70*a* is approximately equal to the focal length $f_{s2}$ of the lens 52. The other extreme ray of the diverging cone from fibre tip 17 travels along a longer path length 70*c* than 70*a*. Let us also consider that the camera 61 or bundle 66 have a lateral size, d, and the index of refraction of the sample 4 is n. Considering the magnification of the telescope made by lenses 51 and 52 as m, the light sheet has a size d/m along X. Then, the difference of reference path lengths 70*c* and 70*a* determines a path difference RL:

$$RL = \sqrt{d^2 + f_{s2}^2} - f_{s2} \qquad (8)$$

This has to match the lateral path difference in the light sheet: nd/m.

This leads to:

$$\frac{m}{n} - \frac{n}{m} = 2\frac{f_{s2}}{d} \qquad (9)$$

For $f_{s2}=d$ for example, this equation shows that magnification should be at least 2.41 n, ie slightly over 3. A lens 51 of focal length 2 mm and a lens 52 of 6.5 mm focal length, feeding a bundle or camera of d=6.5 mm lateral size would satisfy the OPD adjustment above.

Any residual adjustments of OPD can be applied using the digital methods further described below, implemented in a Signal Processor and Display 8 (not shown), using output signal 84.

Signal Processing

There are two main procedures applicable to the embodiments above, spectral domain and time domain OCT. Spectral domain refers to swept source OCT, using a swept source 11 and spectrometer-based OCT, using a broadband source 12 (the only applicable embodiment is that in FIG. 13, system 106, 2D camera 61'). The optical path difference (OPD) in the OCT interferometer is encoded in the modulation of the optical spectrum (channelled spectrum). The larger the OPD, the denser the modulation of the channelled spectrum. Time-domain OCT employs a broadband source 12 and operates around OPD=0.

Spectral Domain OCT

Two basic procedures are possible, using Fourier transformations or using Master Slave method. Let us now refer to the signal processing of the photodetected signal produced by each camera pixel.

Optical Source Consisting in a Swept Source (Tunable Laser) 11

Using a swept source 11, a pixel composed signal for each pixel (h.v) of the 2D camera 61 (FIGS. 6b, 7, 9, 10, 15) is created from the pixel values (h,v)(f) of all camera frames, with a frame for each optical frequency f, acquired during a frequency sweep of optical frequency f of the tunable laser (swept source).

Using a swept source 11, a pixel composed signal is also created for each pixel h of the 1D camera 62 in FIG. 6a and of the 1D camera 62' in FIG. 13. A pixel composed signal is also created for each pixel h of the 1D camera 62 in FIGS. 11 and 12, over events v within V repetitions of camera acquisitions within each stitched frame (H,V) made from V acquisitions of camera readings of H pixels. Therefore, an equivalent (h,v)(f) pixel in a stitched frame (H,V) can be considered when using a 1D camera 62 in FIGS. 11 and 12. For the duration of V repetitions of 1D acquisitions of camera 62 readings, optical frequency of the swept source is fixed at f. After completion of the V acquisitions, frequency f is advanced to a new value within the tuning bandwidth of the swept source 11.

The pixel composed signal is nothing else but the photodetected counterpart of the power spectrum at the interferometer output versus optical frequency. This represents a channelled spectrum with a density of modulation of peaks and troughs proportional to the OPD in the interferometer.

Examples above included the case of R=500 distinct points in depth that require according to Nyquist 2R=1000 different frequencies f (i.e. 2R frames). These will be selected during sweeping in 2R distinct steps of frequency $f_1, f_2, \ldots f_r, \ldots f_{2R}$. Optical frequency can also be swept continuously, in which case the instantaneous optical frequency is considered as an average for the duration of camera integration, whether camera is 1D or 2D, where the optical frequency variation within the duration of 2D camera integration, or during the time of a single or V acquisitions of 1D camera acquisitions, can be neglected.

Let us consider sweeping the swept source 11 in 1 s. Using a 2D camera as PCO, at 400 frames per second, gives an integration time of C=2.5 ms per frame, for a tuning bandwidth of 40 nm, the spectral definition is 0.1 nm per frame. The swept source 11 is swept at 40 nm/s and R=200 depth points are covered with 2R=400 spectral sampling points (distinct optical frequencies f). Using a 1D camera as Basler Sprint spl4096, at 240 kHz, with V=600 repetitions of acquisitions, a full stitched frame of V=600 lines is produced again at 400 Hz while spectral definition and sweeping speeds are similar. Number of lateral pixels is also similar, exceeding several hundreds.

This shows that similar sweeping rates, tuning bandwidth, number of pixels are achievable either using 2D cameras as in conventional LSM or using 1D cameras plus scanning as disclosed in the invention.

Using Fast Fourier Transform (FFT) Processing

A FFT of the pixel composed signal, as in the practice of swept source OCT, delivers an A-scan for the signal from each pixel. Peculiar for the invention, in opposition to conventional OCT, a single peak is obtained in each A-scan, according to the comments around FIG. 5. The A-scan peak is singular, of width determined by the coherence gate, $L_c$. Such A-scans for a thin sheet and ignoring scattering effects are shown in FIG. 16, consisting mainly in single peaks. FFT delivers much axially extended A-scans than necessary. For R distinct points in depth, let us say R=500, 2R=1000 spectra are necessary and the FFT returns a single peak for a value re from 1 to R, at an OPD position $r_c \times L_c$ along its axial range AR of the A-scan. For example, R=500 and $L_c$=2 microns give an axial range AR=R×$L_c$=1 mm, wherefrom only a single peak of 2 microns extension is useful.

Figure 17:
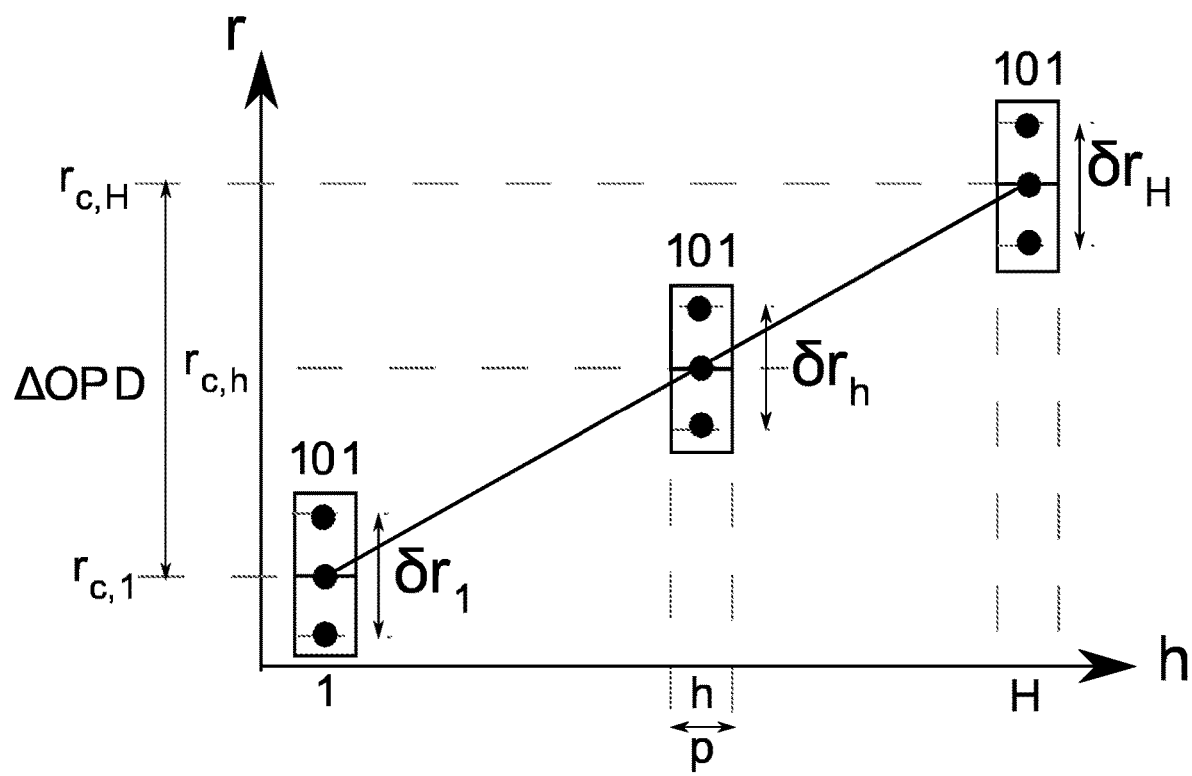
FIG. 17 shows the variation of the OPD along the transversal pixels of the photodetector block.

For thick sheets and due to scattering, for each pixel h in the row v, there is more than a single value $r_{c,h}$ out of the set of depths 1,2, ... R giving significant strength to the A-scan peaks, in a range $\delta r_h$. However, the A-scans still present a single main peak extending for a fraction of the OPD range. FIG. 17 illustrates a construction of a cross-section OCT image obtained from assembling A-scans from all pixels 1,2, ... h, ... H along the row v in the camera 61 or from all pixels 1,2, ... h, ... H along the 1D camera 62. Considering the A-scan 101 obtained for the signal delivered by pixel (h,v), the OPD=|EL+SL−RL|=$r_{c,h}L_c$.

Let us say that the sheet thickness w equals 3 axial resolution OCT elements, this means plus minus one more OPD points around $r_{c,h}$, ie the A-scans 101 consist in a range of $\delta r_h$=3 peaks centred on $r_{c,h}$. 3 blobs are shown corresponding to 3 peaks, the distance between the blobs along the OPD coordinate signifies the axial resolution interval in the sample, $L_c/n$, where n is the sample index of refraction. In agreement with FIG. 5, the axial distance between peaks delivered by different pixels (h,v) and (h',v) is proportional to n(x'−x') where x and x' are the position of scattering centres 'seen' by respective pixels (h,v) and (h',v).

This means that from 1 to H, ΔOPD=npH/m, where m is the magnification of the forming image interface 5 and p is the camera pitch along the horizontal axis, h, parallel to axis X.

When creating the brightness in the LSOCM image, for a photodetector pixel (h,v) signal, the A-scan is integrated, all 3 peaks are put together. The oblique line in FIG. 17 connecting the centres of A-scan peaks, $r_{c,h}$ displays the tilt of the coherence gate applied to the sample 4.

Each A-scan covers a length in OPD of 3 resolution intervals, $L_c/n$, out of R such intervals along the OPD of the A-scan 101. This example shows that many points along OPD of the A-scans are void, covering R axial resolution intervals. This suggests that a different signal processing method that can perform calculations around the points of interest in depth only, where the coherence gate is, may be more efficient. Such alternative method is Master Slave (MS), or in complex form, Complex Master Slave (CMS) OCT.

Master Slave OCT Method

As disclosed in the U.S. Pat. No. 9,383,187 "Method and Apparatus for Processing the Signal in Spectral Domain Interferometry and Method and Apparatus for Spectral Optical Domain Coherence Tomography", by A. Podoleanu and A. Bradu and in U.S. Pat. No. 10,760,893 "Master Slave Interferometry and Apparatus and Method for Master Slave Optical Coherence Tomography with any Number of Sampled Depths", by A. Podoleanu, S. Rivet, A. Bradu, M. Maria, MS and CMS methods return the same depth points values of the A-scan delivered by a FFT, using a distinct operation for each depth. A mask for each depth is generated at a calibration step before imaging, that represents the photodetected signal counterpart for the modulation of the spectrum at the interferometer output for the OPD corresponding to that depth. Then the signal in the A-scan for that depth is obtained by dot matrix multiplication of the pixel composed signal of 2R sampling points with the mask for that depth of 2R sampling points followed by integration of results.

This suggests that for a thin sheet, if the depth is known, a single multiplication operation is necessary, using a single mask, and for a thicker sheets, a few such operations only, engaging a few masks only.

For 2R sampling points, the number of operations using FFT is 2R log(2R). For the same number, MS method needs $(2R)^2$, which is much more. However, because a single peak is necessary for each pixel composed signal, only 2R operations are necessary, which is less than the number of the operations demanded by the FFT. This allows a quicker display of the LSOCM image (ie the compound en-face OCT image, which represents a similar map of LSM image). Also, the MS and CMS methods avoid storing data outside the depth of interest, data that FFT delivers.

Interplay of Choice of FFT Versus MS in the LSOCM Practice

Important in choosing the most suitable method to minimise time and resources is the accurate knowledge of the OPD variation. In situations where the diameter of the excitation wave 30 beam or the sheet 3 thickness is thick and also topography of sample plays an important role in the OPD variation, the overall OPD can deviate from the main component of OPD given by equation (1), determined by the optical path length of the excitation length, EL. In such situations, utilisation of FFT looks better suited than the MS method that requires knowledge of which masks to use, otherwise the MS method using all R masks along the axial range is slower than the FFT.

A possibility exists given by segmenting the A-scans delivered by FFT and obtaining a contour of OPD variation from a pixel h to next in the row v of camera pixels 61(62). This will determine with approximation the trend of OPD along h, as determined by the main component, EL. Variations around will be due to the topography of the sample. Once such a curve is known, MS can be enabled using a limited range of masks in a range of of indices r, to cover the OPD variations due to topography of sample and sheet thickness. Selecting a different mask from the storage of R masks, is equivalent with sliding the index r or the mask in accordance to the variation shown by the oblique line in FIG. 17. In this way, the next LSOCM image can be delivered quicker than using FFT alone, by sliding the mask index of the mask in the centre of the range δ r of masks.

Another possibility consists in eliminating or reducing the main bulk of OPD variation employing the hardware method of embodiments in FIGS. 8 and 15. Even if imperfect OPD compensation is achieved by the hardware method, the range of r values (exhibiting A-scan peaks) within the 1, 2 . . . R range is reduced.

Thinner Sheet than the Coherence Length in the Sample ($w<L_c/n$):

Let us consider the case when the sheet thickness 3 is less than the coherence gate width, $L_c/n$, determined by the bandwidth (in case of broadband sources) or tuning bandwidth (in case of swept sources) of the optical source 1. For a thin sheet, $\delta l_X$ is infinitesimally small in FIG. 4*a* and FIG. 4*b*. Let us ignore for the moment the topography of the sample in front of the forming image interface 5, c(x,y), in which case $\delta l_Z$ can be ignored, hence the delay from one A-scan peak to next is reduced to the main component $D_X=n(x'-x)$ only, according to equation (1). For a system whose forming image interface 5 has a magnification of 1, using H=250 pixels of pitch $p_X=2$ microns gives a lateral size imaged of 2×250=500 microns. The delay between the A-scan peaks at the extremities of the sheet along X is: $D_{Max}=n\Delta x$. Considering an index of refraction of the tissue n=1.4, $D_{Max}$=1.433 0.5 mm=0.7 mm. From one pixel to next within a row v, the A-scans need to be shifted axially relatively by $\delta OPD=D_{Max}/H=0.7$ mm/250=2.8 microns to cumulate a total of 0.7 mm OPD variation from one edge to the other of the sheet along X. The calculation above shows that in order to implement the hardware method, because n>1, the magnification m should be larger than 1. Therefore, for m=1, the only correction path method available is digital.

Using a segmentation method, the inclination of the coherence gate line connecting the A-scan peaks, as shown by the oblique line in FIG. 17, is obtained and system calibrated. Segmentation may not need to be applied again for the same type of sample for subsequent imaging.

When embodiments with hardware correction of path in FIGS. 9 and 12 are used, the A-scan peaks are aligned according to an average index of refraction used in the adjustment of correction, angle θ in FIG. 8. The relative axial shift of A-scan peaks from the average show directly the variation of the index of refraction of the sample 4 from the average, important application of the invention that allows disentanglement of the index of refraction from geometrical length when measuring OPD values.

In the case of the thin sheet with $w<\delta OPD/n=p_X$, each time the OPD in air is advanced by $np_X$, the coherence gate advances laterally from a pixel h to next, ie the coherence gate selects a number Δh=1 of pixels along h. If the coherence length is $5np_X=14$ microns, the coherence gate selects a number Δh=5 of pixels along h. This is a unique feature of the invention, where the axial resolution interval, measured along the OPD axis (which normally is depth), impacts the size of the OCT image along its lateral direction, X. In an en-face 2D OCT image, as produced by FIGS. 6*b*, 7, 10, 11, 14, 15, Δh represents the width of a stripe image, elongated along v, and restricted to Δh along h. In FIG. 6*a*, the en-face image reduces to 1D image, ie the stripe reduces to a single pixel.

Thick sheet: If the sheet 3 is thick, or if the sheet is launched thin, but thickened by aberrations due to the optics and sample, then more peaks are obtained in the A-scan from the pixel composed signal. In this case, the A-scans extend along the depth axis for an axial interval similar to the sheet thickness, ie for a range Δr of r values around $r_c$. A large thickness of the sheet w allows the effects of sample topography in front of the excitation launcher 2, $\delta l_X$, as shown in in FIG. 4*b*, to be manifest. The combined effect of topography variations and sheet thickness demand utilisation of more masks in the MS protocol that may make the MS less efficient than the FFT. Irrespective of thin or thick sheet, a LSOCM image can still be generated. The exact depth of the A-scan peak has no relevance for such an image. However the larger the thickness w, the worse the depth resolution in assembling a 3D volume of the sample from LSOCM slices.

Displaying a Thinner LSOCM Image than the Sheet Thickness in Case of a Thicker Sheet Than the Coherence Length ($w>L_c/n$)

Let us say that the coherence length in the sample is $L_c/n$ and the sheet thickness w is 3 times wider, ie $w=3L_c/n$. As illustrated in FIG. 17, this means that for each pixel h in the row v, OCT signal is obtained along a depth range of $3L_c/n$, ie a range δr, of r of plus minus 1 more steps $L_c/n$ around position given by $r_c$ in the middle of the sheet 3. This means that the LSOCM image for each pixel is given by 3 scattering centres along Z, in the sight of the respective camera pixel. If a thinner LSOCM image is needed, then to produce the highest possible axial resolution LSOCM image, a single value of the OCT signal is retained, that of the $r_{c,h}$ for each pixel in the middle of $\delta r_h$ range for each pixel, where significant signal is achieved. Initially, a full axial range is scanned using the translation stage 77. Then for each (h, v) pixel in the row v, the range $\delta r_h$ of values r giving significant A-scan peaks is retained. For the pixel h=1, a range $\delta r_1$ values, . . . , for the pixel h, a range $\delta r_h$ values and for pixel H=250 as in the previous examples, a range $\delta r_H$ values. An average is obtained of number of steps for each pixel, $\delta r_a = (\delta r_1 + \delta r_2 + \ldots + \delta r_h + \ldots \delta r_H)/H$, which for the example above, should amount to approximative 3. Then, the middle indices $r_{c,h}$ for each range of values $\delta r_h$ can be estimated for each pixel h. These values can then be connected to establish the trend in the OPD variation, as shown by the oblique line in FIG. 17. With a pitch $p_X=2$ microns, the increase in OPD in air, $\delta OPD$, from $r_{c,h}$ to $r_{c,h+1}$ should be $np_X=2.8$ microns for n=1.4 and in the sample, $p_X=2$ microns. An average $\delta r_a=3$ then gives an approximate thickness of the sheet of w=3×2 microns=6 microns.

In this way, a thinner LSOCM image can be generated by retaining from each A-scan for each pixel, the value of the peak for a single $r_c$ value as identified by the oblique line in FIG. 17.

The estimation above considers that the sample 4 facing the launcher is flat along Z, which may not be the case. Large topography variations may cause errors by moving the central indices $r_{c,h}$ of the intervals in FIG. 17. If the topography error $(n-1)\delta_X$ becomes comparable with $L_c/n$, the 3 intercepted depths are not placed at the correct depth along the line of sight of the pixel. Similarly, if the topography error $(n-1)\delta_Z$ becomes comparable with $L_c/n$, the A-scan for the 3 peaks for pixel h is shifted axially in relation to the A-scans for 3 peaks for neighbouring pixels h-1 and h+1. This comment allows to interpret a wavy curve instead of a straight line connecting the centres $r_{c,h}$ as due to topography variations.

In FIG. 17, only the contributions due to the front edge of the excitation sample wave 30 are shown. Due to the trailing edge of delayed excitation sample waves 30, the A-scans may register, especially in dense samples, trailing edges as shown in FIG. 16'. Some parts of the excitation sample wave 30 suffer delays along propagation through the sample, and although of smaller intensity, contribute to trailing edges of the A-scans as shown in FIG. 16'. Therefore, the A-scans 101 may be slightly more extended below the oblique line than above the oblique line. By deducting the A-scan for previous pixel h-1 from the A-scan of the considered pixel h (when h increases along X), an approximate range $\delta r_h$ is obtained that corresponds more to the front edge of the excitation sample wave 30. This procedure can also be extended to generating the LSOCM image, as further commented around the results presented in FIG. 20.

FFT Versus Master Slave OCT Method

The same tilt of the coherence gate is obtained along the lateral direction X as with the thin sheet, the only difference is that each A-scan contains $wn/L_c$ distinct points (3 are shown in FIG. 17, corresponding to $w=3L_c/n$). FFT requires 2R log(2R) while MS only 2R operations for each depth. As long as $wn/L_c < 2R \log(2R)$, MS provides a faster image than FFT. For example for $2R=1024=2^{10}$, as long as $wn/L_c<10$, the MS method is faster. For instance for a coherence length in the sample of 2 microns, MS is faster as long as the thickness of the sheet 3 is less than 20 microns. For thicker sheets, FFT would be faster. Therefore, for the embodiment in FIG. 13, 106, using 1D camera 62', FFT should be used to produce OCT cross sections along Y, as in such case, the extension of the sheet in the detection plane, along Y, is much larger than the width of the axial resolution interval. In all embodiments, in case of long tails of the coherence gate due to scattering, FFT may be better again.

Generation of LSOCM

Irrespective of the thin or thick sheet, a similar image to that provided by the LSM set-up can be generated as a stitched en-face OCT image from all en-face OCT images in the SS-OCT volume (one per each resolvable OPD step). Corresponding to the intersection of the coherence gate with the sheet thickness in depth, a stripe of bright pixels in each en-face OCT image is expected. By adding all stripes together, all lateral pixels in the en-face LSOCM images are lit up and an LSOCM can be assembled.

Correction for the Forward Scattering of the Excitation Sample Wave and for Thickness w Let us start with scattering and let us refer to embodiments such as in FIG. 6b, 7, 10, 11, 14, 15, where the en-face OCT 2D image results as a stripe, elongated along coordinate v (parallel to Y) and exhibiting a small width due to the singular peak in the A-scan (FIG. 5, 16) possibly enlarged by scattering (FIG. 16'). In these embodiments, depending on the scattering properties of the sample 4, the stripe width as determined by a range $\delta r_c$ (FIG. 17) in the en-face OCT may exceed the value expected due the combined effect of the sheet thickness w and of the coherence gate in the sample, $L_c/n$. As another effect, it is expected that the stripe width also to increase with $r_c$. We refer here to the stripe in the images of a 2D array 61 (FIG. 6b, FIG. 7, FIG. 10, FIG. 14, FIG. 15) or in the assembled en face frame of V collections of signals from the H photodetectors of a 1D array 62 in FIG. 11. The increase in the stripe width is consequence of the forward scattering of the excitation sample wave from one scattering event to the next. The larger the $r_c$, the larger the OPD corresponding to larger excitation lengths along X.

As commented above, due to scattering, scattering centres are hit by excitation sample waves exhibiting trailing edges, leading to an equivalent increase in the width of the coherence gate above the theoretical value. The immediate consequence of spatial extension of the excitation sample wave 30 due to forward scattering in its propagation along X through the sample is that the width of en-face OCT stripe along X may increase, depending on the sample scattering, from a minimum at a shallow depth in the sample 4, given by combined effect of w and theoretical value of the coherence length in the sample.

Figure 20A:
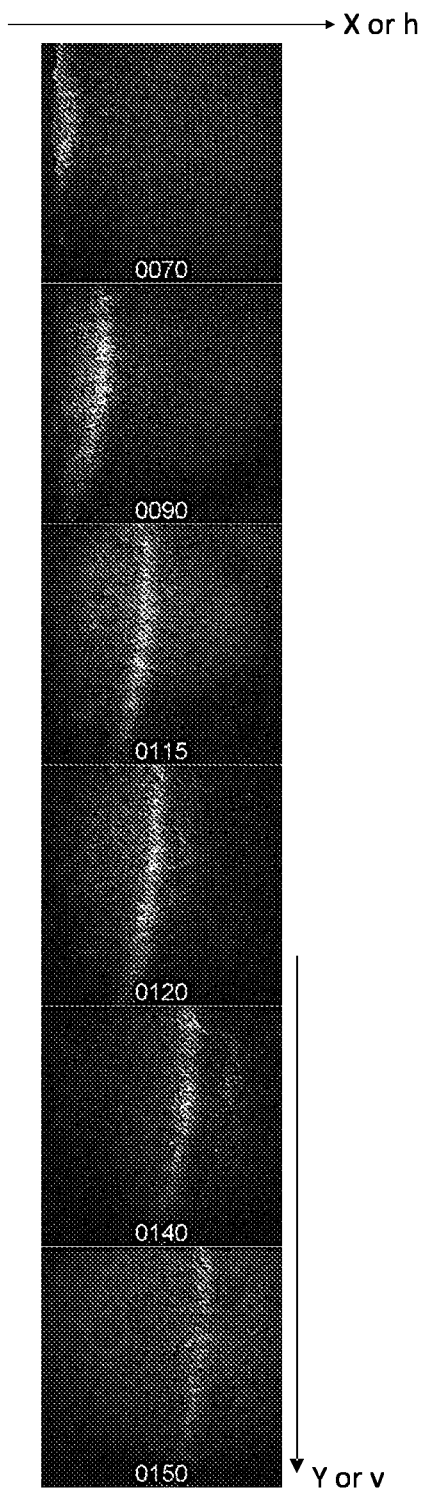
FIGS. 20a, 20b, 20c and 20d show images obtained with a proof of concept system based on the embodiment in FIG. 6b.

For each OPD of the en-face slice from the volume collected, the stripe obtained can be represented as a summation of row contributions due to the front edge of 30 reaching scattering centre at $x_h$, $i_h$ plus rows along pixels in the image at h=1 to h-1 due to the trailing edge (delayed contributions) of 30. In a set of en-face OCT images progressing along OPD, contribution due to the front edge of 30 can be separated from the contributions due to the trailing edge of 30 by deducting previous en-face images from the currently inferred en-face image. This can be simply done and then a LSOCM assembled from the corrected stripes. (Such stripes of en-face OCT images, evolving along X and h are shown in FIG. 20a, obtained using a system as such disclosed in FIG. 6b).

To perform correct deduction of the rows, we should obtain the weighing factors of the different components of the excitation wave hitting each scattering centre at $x_h$, where subscript h signifies that the scattering centre is conjugate to pixel h. The amplitude of each component of the forwarded excitation sample wave after hitting previous scattering centres located at $x_j$, with j=1, 2 ... h−1 is $g_h^j$. Let us consider the en-face image, $I_h$, sliced at a depth given by a selected r that settles the coherence gate on pixel h. This is made from rows of pixels along v (parallel to Y), each row placed at pixels 1,2, ... h−1, along a direction parallel to X. The intensity of the pixels in the row at h, $i_h$, corresponds to the interference of the reference wave 70 with the front edge of the excitation sample wave 30. All other rows, for h=1, 2, ... h−1, exhibit interference amplitude of the reference wave 70 with the trailing edge of the excitation sample wave 30, each of intensity, $i_j$. Considering the weighting factors $g_h^j$, $$I_h = \Sigma_{j=1}^{h} g_h^j i_j \qquad (10)$$

Contributions within each stripe due to the trailing edge of the excitation sample wave 30 can be reduced by deducting from each $I_h$, the previous en-face image, obtained when the coherence gate intersected pixel h−1. For quick image delivery, this could involve a simple deduction with all weighting factors $g_h^j$=1. A better correction would consist in inferring the weighting factors $g_h^j$. An approximate attenuation curve in each sample 4 with X can be initially done to obtain an estimation of coefficients $g_h^j$.

The suitability of such a procedure can be immediately assessed based on the nonuniformity of intensity in the stripes. If their brightness variation resembles the shape of A-scan peaks in FIG. 16', then the LSOCM image assembled from stripes according to equation (10) will lead to better brightness uniformity, i.e. the multiple contribution of trailing edges will be reduced.

If the stripe brightness exhibits a symmetric variation along h, then this shows less contribution of scattering and more contribution of signal due to scattering centres intercepted by a wide thickness w of the sheet 3 or thicker beam diameter w of excitation sample wave 30.

If w exceeds the axial (OPD) resolution interval, then the stripe width increases due to a combined effect of scattering and enlarged w. In this case, the result does not allow separation and reduction of trailing edge contributions in the excitation sample waves. Hence the need for the invention to operate with sufficient thin thickness w of the sheet 3 or with sufficient small filiform diameter of the launched excitation sample wave 30. The above examples show, that for the scope of the invention, given the size of microscopy samples, coherence length should be preferably micron or submicron, in any case not larger than 20 microns and thickness w should not be larger than a few more times than the coherence gate width in the sample, in any case not more than 10 times.

An example of assembling the stripes in the en-face OCT images at different OPD values into a LSOCM image is presented in the text accompanying the proof of concept results presented in FIG. 20*a,b,c,d*.

The same procedure above is applicable to the embodiment in FIG. 6*a*, in which case the stripe reduces to a line, given by a set of pixels along h.

Embodiments in FIGS. 9 and 12 produce LSOCM en-face images direct, due to the path correction method disclosed in FIG. 8. In such embodiments, the stripe of en-face OCT image extends laterally to the whole size H of the camera 61 or 62 and no assembly of smaller width stripes is necessary. In these cases, the contributions of trailing edges to the images cannot be reduced, ie equation (10) is not applicable in such cases.

Calibration

To this goal, a mirror tilted at 45 degrees is used to send excitation sample wave to a column of camera pixels in camera 61 or to the one of the pixels in the 1D camera 62 in previous embodiments. Optical power from the source 11 is reduced to avoid camera saturation. OPD can be changed by either translating the mirror tilted at 45 degrees, along X, ie modifying the excitation path length EL or by translating stage 77. Collecting two or more pixel composed signals for different OPD values, calibration in decoding the modulation of the pixel composed signal to obtain depth resolved information is achieved. Such a calibration method is known for people skilled in the art. Both widely spread resampling calibration, phase calibration with dispersion compensation (PCDC) and a method based on Master Slave OCT are presented in the paper by A. Bradu, N. M. Israelsen, M. Maria, M. J. Marques, S. Rivet, T. Feuchter, O. Bang, A. Podoleanu, "Recovering distance information in spectral domain interferometry", Scientific Reports 8, 15445 (2018), https://doi.org/10.1038/s41598-018-33821-0.

Calibration of FFT

In case the swept source tuning is nonlinear in optical frequency (most cases of swept sources), or there is dispersion left in the interferometer, methods known in the art are used to resample and linearize data based on at least two spectra at the interferometer output acquired for two different OPD values. As above, a mirror at 45 degrees is used. A possible method for calibration of FFT is the PCDC method in the Scientific Reports paper mentioned above.

Calibration of MS

Using the MS algorithm also described in the Scientific Reports paper mentioned above as well as in the patent U.S. Pat. No. 10,760,893, any number of masks, at least 1000 masks are calculated using at least two experimental spectra acquired. For each pixel in the camera column h out of 1,2, ... H of camera 61 or for each pixel of camera 62, the minimum axial range is that of at least the thickness of the light sheet, w (as shown in FIG. 4*a*). From the first column to the next, there is a variation in the path of the excitation sample wave of length, EL, that is nδx. This means that the SSOCT procedure has to cover a total axial range AR=nδx+ nw (w being the sheet thickness shown in FIG. 4*a*). Let us consider that the sample has a n=1.4 and the axial resolution of the system, determined by the tuning bandwidth of the source 11 in the sample is $L_c$/n=0.01 mm. For instance for δx=2 mm and a thick sheet of w=0.1 mm, with n=1.4, AR=2.94 mm. This requires at least AR/($L_c$/n)=294 masks=R. The CMS algorithm as mentioned above can calculate any number of masks. wn/$L_c$=10=δr is the minimum number of masks around each $r_c$ value. A first acquisition can use FFT or a CMS procedure with all masks, followed by segmentation of A-scans to infer the OPD value of the A-scan peak for all lateral pixels H, to infer the index $r_c$ of the mask to deliver the peak in the A-scan at the OPD value ~$r_c L_c$/n.

Other procedures can be used to infer the masks, for instance, experimentally, by acquiring the pixel composed signal for at least a pixel camera, for different OPD values as described in the paper, "Master-slave interferometry for parallel spectral domain interferometry sensing and versatile 3D optical coherence tomography", by A. Gh. Podoleanu and A. Bradu, published in Optics Express 21, 19324-19338 (2013), http://dx.doi.org/10.1364/OE.21.019324, with the difference that here a tilted mirror is used due to the light sheet configuration at 90 degrees used.

For SpOCT and SSOCT, left over mismatches in the length of air or mismatches of the length in glass, fibre and other optical elements, within the lengths EL+SL and RL are compensated based on methods known in the art, either hardware based on using glass slabs in the interferometer arm, of by software, using numerical phase calculation. Given the tolerance to dispersion of the CMS method, as presented in "Demonstration of tolerance to dispersion of master/slave interferometry", by A. Bradu, M. Maria, A. Gh. Podoleanu, published in Opt. Express 23, 14148-14161 (2015), 10.1364/OE.23.014148, correction of dispersion is not necessary.

Signal Processing Using Time Domain OCT

In this case, the optical source 1 consists in a broadband source 12. Methods of low coherence interferometry, ie time domain (TD)OCT are suitable in this case. By translating the stage 77, coherence gating can be moved from a column of pixels, h, to the next, h+1, of the 2D camera 61 in the embodiments in FIG. 6b, 7, 9, 10 or from a pixel to the next of the 1D camera 62 in the embodiments in FIGS. 6a, 11 and 12. By collecting at least 3 frames per coherence gate of the light source 12, coherence gating operation is enabled. For instance, for a central wavelength of 800 nm and full width half maximum bandwidth $\Delta\lambda$ of 230 nm, the coherence length $L_c$ is: $0.88\lambda^2/\Delta\lambda = 2.7$ microns. Moving the stage 77 in steps of $\sim L_c/3 \sim 0.9$ microns will lead to at least 3 frames per resolution interval $L_c$ that will allow building an en-face image for each 3 successive depth steps by using the widely known phase shifting interferometry method applied to full field OCT, as exemplified in the paper "A New Approach to the Measurement and Analysis of Impact Craters", by L. Kay, A. Gh. Podoleanu, M. Seeger, C. J. Solomon, published in Int. J. Impact Engn., Vol. 19, No. 8, 739-753, (1997). In this way, a whole volume of the sample 4 can be obtained.

Preferably, when using a broadband source 12, the hardware adjustment of OPD disclosed in FIG. 8 should be employed, as shown in FIGS. 10 and 12. In this case, when varying the OPD by using stage 77, the coherence gate is at the same OPD value for all camera pixels. This means that an en-face OCT can be obtained directly for each depth z chosen by stage 77. By translating stage 77, coherence gate is moved through the OPD range of signals from all pixels 1,2, ... h, ... H in the row v of the 2D camera 61 in FIG. 9 or in all of the pixels 1,2, ... h, ... H of the 1D camera 62 in FIG. 12, simultaneously.

For the other embodiments, as disclosed in FIGS. 6a, 6b, 7, 10, 11, 14 and 15 where the two waves are colinear, the en-face OCT images collected for different OPD values obtained by moving the stage 77, will display only a few pixels in FIG. 6a and stripes in FIGS. 6b, 7, 10, 11, 14 and 15 corresponding to the intersection of the tilted coherence gate (as shown in FIG. 17) with the light sheet through the sample 4. FIG. 17 was drawn initially to explain the location and the width of the stripe of pixels illuminated when using swept source OCT. For time domain OCT, the indices r in FIG. 17 can be put in correspondence with the OPD change imprinted by stages 45 or 77, where r=1,2, ... up to R represent path steps changes within an axial range of translation stages, each step in r representing an OPD resolution interval $L_c$. At each such step, image is obtained from scattering centres that are within a $L_c/n$ interval around OPD=0.

To obtain a LSOCM image, a global image needs to be assembled from all en-face images (single pixel in FIG. 6a or stripes in FIGS. 6b, 7, 10, 11, 14 and 15) obtained for different OPD values. If a range $\delta r$ of OPD values (FIG. 17) are necessary to move the coherence gate over all lateral pixels in the image, H, a number of at least $3\delta r$ frames need to be acquired. For each r, stepped by one, the OPD changes in air by a resolution interval, $L_c$. At least two other frames around each depth given by r are necessary, that correspond to sub-wavelength variation of the OPD to enable generation of OCT signal by ways of at least 3 phase shifts. Alternatively, the stage 77 is moved at sub-wavelength steps, let us say for a central wavelength of 840 nm, in steps of 840/3=280 nm, then parts of the en-face OCT (stripes) are obtained for each OPD value by evaluating interference strength in each pixel signal from every 3 consecutive frames. Then OPD is varied and A-scans are obtained for each pixel (h,v). Similar to the SSOCT procedure above based on either FFT or CMS, for each pixel, its A-scan is integrated over their OPD range to deliver an overall strength of interference, irrespective of the position of the peak within the A-scan. Then the pixel in the LSOCM image for the corresponding z placement of the excitation sample wave 30 or sheet 3 in the sample 4, is lit in proportion to the overall strength of interference so determined.

Considering the example above of H=250 pixels and a camera pitch of $p_X=2$ microns, the lateral image size is $\Delta X=0.5$ mm. Considering an index of refraction n=1.4, the OPD variation through the sample along X is n $\Delta X=0.7$ mm and this represents the axial range to be covered by moving stage 77. As the coherence gate moves laterally from pixel h−1 to pixel h, H−1=249 OPD value steps of $\delta OPD=2.8$ microns are necessary, in fact equal to $p_X n=2.8$ microns. Let us consider $L_c=\delta OPD$, in which case, for each step in OPD, coherence gate moves laterally from one pixel to next in the row of pixels h, ie $L_c=np_X=2.8$ microns. In this case, the stripe in the en-face OCT image covers a single column crossing pixel h, $\delta h=1$, when using a 2D camera (and covers a single pixel h when using a 1D camera). To cover the entire lateral size of the LSOCM image by stripes of narrow widths as determined by coherence gating, the stage 77 is moved in $\Delta r_c \sim H=250$ steps, each of $\delta OPD=2.8$ microns.

Let us now consider another example, where $L_c=5np_X=14$ microns. In this case, for each OPD resolution interval step, the stripe width is larger, covering 5 columns, of width $\delta h=5$, meaning that in order to explore all lateral size $n\Delta X=0.7$ mm, only $\sim H/5=50$ OPD steps are needed of 14 microns each, for the stage 77, ie. $\Delta r_c \sim 50$.

For each OPD selected value, to obtain a TDOCT en-face image, at least 3 frames are necessary to apply phase shifting interferometry.

In the cases above of $\Delta r_c=H=250$ steps for $L_c=2.8$ microns, 3H=750 frames are necessary to produce H=250 narrow stripes, whilst in the case of $\Delta r_c=50$ steps for $L_c=14$ microns, 3H/5=150 frames are necessary to produce 50 wider stripes.

If the sheet w is thicker than $L_c/n=p_X$, then the stripe width extends for larger than $\delta h$ values calculated above, as other scattering centres (x', z') within the sheet thickness w contribute towards the signal of neighbouring pixels to the respective (h,v) pixel in the final LSOCM image, for a given selected OPD value. Let us say that selected OPD acquires signal in the pixel (h,v) from the scattering centre at $(x_h, y_v, z)$. The same OPD value is also applicable for light from scattering centre $(x_{h-1}, y_v, z')$ where z'>z (shorter EL compensated by a larger SL). The same OPD value is also applicable for light from scattering centre $(x_{h+1}, y_v, z'')$ (larger EL compensated by a shorter SL), where z''<z, as long as both z' and z'' are intercepted by a thicker thickness w. This aspect is unique to the invention, where the thickness of the light sheet, w, that is measured along Z, impacts the lateral size $\delta h$ of the stripe.

The numerical illustrations also show, that for the scope of the invention, given the size of microscopy samples, coherence length should be preferably micron or submicron, in any case not larger than 20 microns and thickness w should not be larger than 10 times the coherence gate width.

When applying TDOCT, correct matching of glass and air lengths within the lengths EL+SL and RL are necessary.

Volumetric Imaging Using the LSOCM Based on Time Domain (TD)OCT and Sampling the Volume Using the Light Sheet For each LSOCM image, at least 3 different images for 3 different phases are necessary. Let us say that the same number of depths R=500 are acquired as used in the example above for spectral domain imaging. (This may correspond to a thin light sheet of 2 microns to investigate a sample 4 of axial range AR=1 mm thickness). This means that 1500 frames are needed. With a 2D camera at 400 Hz, the acquisition process requires $T_A$=3.75 seconds. With TDOCT, mechanical axial scanning is necessary, possible by using stage 45 in 3.75 seconds to scan the AR. To maintain coherence gating, stage 77 also has to be moved to compensate the increase in the scattered wave path length due to sample 4 movement closer to the camera, ie for smaller z values. For a δz movement of sample 4, the stage 77 should move nδz, where n is the index of refraction of sample 4, according to the practice of dynamic focus in TDOCT, that synchronises the axial movement of the focus gate and coherence gate. For better focus, it may be necessary to move lens 51 as well, according to procedures known to those skilled in the art, to compensate for the effect on convergence of the scattered sample wave due to the variation of the sample path along the detection path (from sample 4 to camera 61,62) through the sample 4 of an index of refraction n. The advantage of TDOCT is that dynamic focus can be implemented, ie for each depth z targeted in the sample 4, the OPD in the interferometer can be adjusted to bring the OPD=0 condition to the depth of interest.

Disentangling the Two Contributions to the Sample Wave Delay, Coming from the Excitation Path Length, EL and from the Scattered Wave Path Length, SL.

As per examples above, the topography variations affect assembling depth resolved cross sections. If depth resolved imaging is to be performed, then the light sheet should be sufficiently inside the sample, avoiding its superficial layers facing the forming image interface 5 and preferably, the sample flattened, ie no variation in the c(x,y) topography. If the sheet is thick, then the sample should also be preferably flattened along Y and Z, ie to minimise or annule the variation in the e(y,z) topography. The methods detailed below are important in handling the topography variations of the sample 4. In general, the sample is not flat, and even if flat, its flat surface towards the forming image interface 5 is not exactly parallel with the camera face, and its flat surface facing the excitation launcher 2 is not oriented perpendicular to the excitation sample wave 30 direction. Such topography variations, δl, as shown in FIGS. 4a and 4b, add extra contributions to the main component of path variation along the excitation length, EL, n(x'−x) from scattering centres at x and x' along the excitation sample wave 30 direction in the sample 4. The optical path length of the excitation wave up to the scattering point, EL plus the path length of the scattered wave from the scattering centre up to the photodetector camera, SL, make the total path length of the scattered wave, EL+SL. Both EL and SL vary due to the sample topography as shown in FIGS. 4a and 4b.

An important observation is here the fact that even if these topography variations are not known, the en-face OCT image for each OPD value and the global LSOCM image resulting from assembling all en-face OCT images is not corrupted in structure. This is totally different from conventional OCT where the depth succession of scattering centres in the sample determines the structure of the sample in the cross section OCT image. Here an incorrect positioning of the A-scan peak does not alter the structure of the en-face OCT image. If the A-scan peak for a certain OPD in the interferometer does not intersect the scattering centre at x, conjugate to pixel h in the camera, the intensity will be down. By varying the OPD the A-scan peak will be moved to intercept the scattering centre selected by the light sheet in front of the lateral pixel h in the v column (FIG. 3). So the essence in creating an en-face OCT global image (the LSOCM image) of the sheet 3 is to add up all en-face OCT image stripes for all values of distinct OPD values within the axial range. For each pixel, its A-scan is integrated over its OPD range to deliver an overall strength of interference, irrespective of the position of the peak within the A-scan. Then the pixel in the LSOCM image for the corresponding z placement of the excitation sample wave 30 or sheet 3 in the sample 4, is lit in proportion to the overall strength of interference so determined. The knowledge of the exact optical path of the A-scan peak along OPD is therefore not important in creating an OCT image equivalent to the LSM image.

What is however important, is to at least correct, even if not exactly, for the main bulk of the OPD variation, given by equation (1), encountered by the excitation wave along X, $D_X$=n(x'−x). This is important due to the variation of spectral domain OCT sensitivity with OPD. The larger the OPD, less is the sensitivity, therefore preferably, OPD values close to zero (but sufficiently far away to reduce noise effects due to low frequency components) should be adjusted when implementing hardware corrections such as disclosed in FIGS. 8 and 15.

To compensate for the decay of sensitivity with OPD, by simply setting the OPD=0 at the furthest extremity of excitation length, beyond the deepest x, $x_H$, then OPD is larger for shallow x values around $x_1$, than for deeper x values, hence the sensitivity increase with reduction of OPD may compensate some of the attenuation due to propagation of the excitation sample wave through the sample 4.

Topography of the sample facing the excitation launcher 2, e(y,z), may alter the cross section image within the A-scan created by the signal of a camera pixel (h,v), possible for thick sheets 3, while the topography facing the camera, c(x,y) may affect the relative positions of A-scans for pixels (h,v) and (h',v) in respect to each other, even for thin sheets. The global en-face OCT image, the LSOCM image, that is the OCT equivalent of the LSM is not affected by the topography variations because is constructed by superposing A-scans for all possible distinct values of OPD, ie relative variations between the contributing A-scans are irrelevant. However such variations may alter a cross section in the volume of data acquired, because these cross sections are built based on the axial relative position of A-scans and each A-scan is based on the relative depth positions of peaks within them.

Therefore, volumes created by scanning the thin light sheet 3 in depth along Z are correct, because for each position along depth, the depth value is determined by the sheet position, given by the translation stage 45 and its accuracy along Z, and by the sheet thickness, w. Inferring global en-face OCT images for each distinct, z, position of the light sheet leads to a volumetric image of the sample 4. The corresponding z depth can be scanned by moving the light sheet 3 (or excitation sample wave 30 along z), showing the uniqueness of the invention, where in order to determine accurately the depth, the thickness w has to be sufficiently small, smaller than the coherence gate width, comparable with it, in any case, if larger, such as at the extremities of the light sheet 3 at the smallest x and at the largest x along the excitation direction (as shown in FIG. 4a), by no more than a few times, in any case, not more than 10 times.

A smaller value w or comparable with the OCT axial resolution interval (along OPD axis) determined by the $L_c$, allows correct volumetric 3D reconstruction from en-face OCT images at different OPD values, as well as reduction of scattering effects using the procedure enabled by applying equation (10).

In case of thick sheets, large topography variations of the sample 4 may impact the spatial accuracy of the volume created by assembling A-scans and B-scans.

For such cases, especially of thick sheets, where topography needs to be assessed, and its values used in producing correct cross sections, the following extra procedures listed below are possible. They expand more the versatility to development of a LSM configuration equipped with coherence gating:

1. OCT measurement of the sample topography, ie of the sample height. This can be performed by:
   (a): placing the sample in front of an OCT system. This will give the topography e(y,z) and c(x,y) which then can be used to complement the corrections due to variations in the EL as above.
   (b). Embodiments can be modified to allow maintaining the sample 4 and photodetector block 6 in position and measuring the topography of the sample via full field TDOCT or SSOCT. For instance in FIGS. 6b and 7, the beamsplitter 74 can be rotated 90 degrees around an axis perpendicular on the detection plane (X,Z) intersecting the axis of forming image interface, perpendicular on the photodetector block 6. In such a position, beamsplitter 74 can be used to convey light to sample along Z, receiving light back from the sample via forming image interface 5 made of lenses 51 and 52 and using an extra reference path by means of a mirror placed the other side of the beamsplitter 74. Both types of OCT, TDOCT and SSOCT can be used in such an OCT modified architecture to infer the topography of the sample 4 facing the forming image interface 5, the height along axis Z, c(x,y). This can then be used in combination with the variations in the EL path as above.
   (c). Use of the LSyOCT embodiment in system 106 in FIG. 13, that provides cross-sections in the plane (x,y). Obtaining cross section (B-scan) slices for all z distinct positions, obtained by moving the sample 4 via stage 45 along Z, a volume of the sample is obtained. A cut of the volume in the plane (x,z) provides the height c(x,y), for each y, that can be used to evaluate correction $\delta l_Z$ (FIG. 4b) from pixel to pixel along X.
3. Using conventional flying spot OCT, based on the extra OCT system 105, as shown in FIG. 3 and FIG. 7. This can be used, via scanner 25, scanning along Y or using a 2D scanner 25 scanning along Y and Z, to obtain the topography of the sample e(y,z).
4. Correlation of sample features. By collecting en-face OCT images in the plane (x,y), from all distinct z positions R, by using the light sheet translated along Z, a volume of the sample 4 is assembled. Then, slices of the volume in the plane (y,z), at each x, can show discontinuity of features within the A-scans along Z at different y positions. The correction c(x,y) can be inferred by correlating such A-scans. For such an operation to be successful, the light sheet thickness should be less or comparable to the coherence length in the sample.

Speckle Variance for Movement Detection, Dynamic Vibration and Flow

To perform such analysis, the invention makes use of the heterodyne effect enabled by interference, due to beating of the scattered wave with a reference wave. Several images are collected and differences calculated according to means known in the art, as for instance presented in the paper: S. Caujolle, R. Cernat, G. Silvestri, M. Marques, A. Bradu, T. Feuchter, G. Robinson, D. Griffin, A. Podoleanu, *Speckle variance OCT for depth resolved assessment of the viability of bovine embryos, Biom. Opt. Express* 8, 5139-5150 (2017). Depending on each type of embodiment, different time scales can be employed. Differences can be made between: B-scan (cross section) OCT images, en-face OCT images or OCT volumes. Slow processes can be identified by using difference of volumes, as they require seconds to produce. For fast variations however, fast B-scans may be more suitable. Camera 61 in FIG. 6b, 7, 9, 10 can produce differences at different time intervals based on TDOCT, analysing fluctuations in the plane (x,y), ie in en-face views. Camera 62 in FIGS. 11 and 12, operating at 300 kHz, such as Basler Sprint spl4096, can give a TDOCT fast operation along X, at frame rates dictated by the scanner 25, which could be hundreds of Hz to kHz. To obtain TDOCT images, there is no need here for three phase changes in the OPD to obtain a TDOCT image, the movement of scattering centres creates that needed phase variation. B-scans can be inferred in SSOCT using the 1D camera 62 in FIGS. 11 and 12, in the plane (x,z) of the sample, for each y position of the scanner 25.

Figure 18:
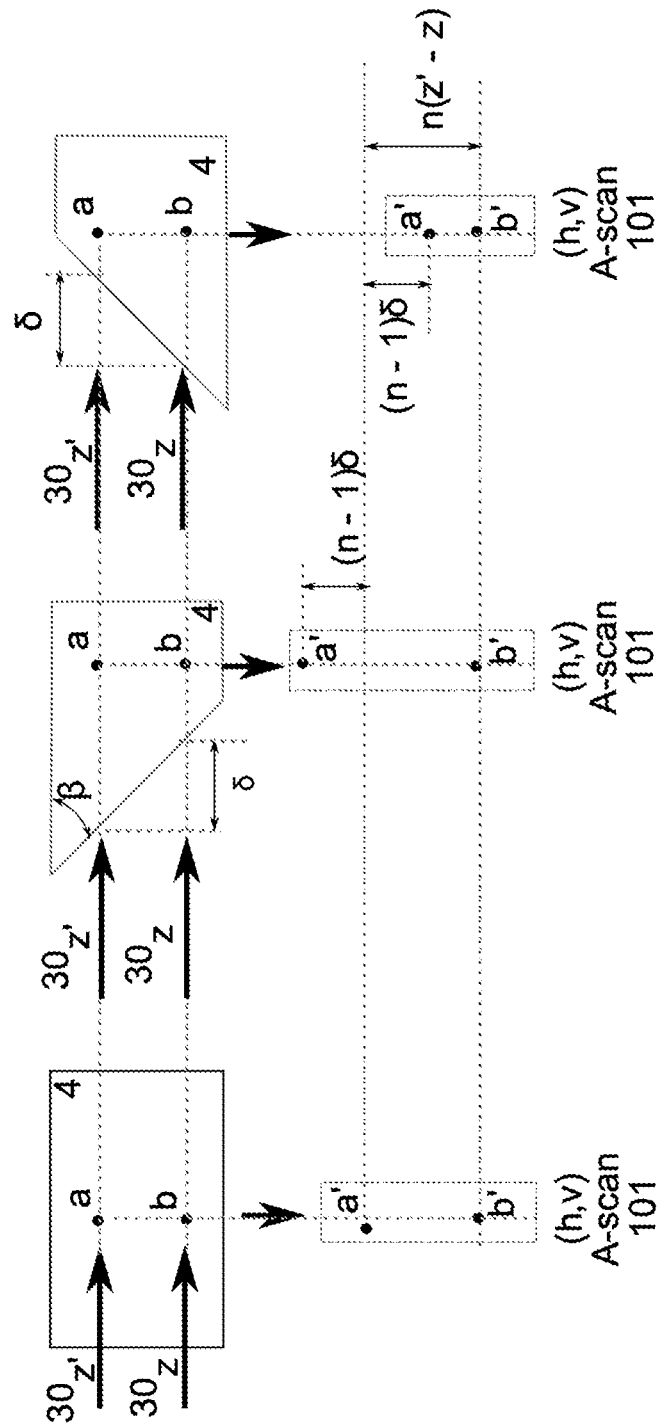
FIG. 18 illustrates the effect of the sample topography on the OCT A-scans.

Employing Deliberate Deformations of the Sample to Achieve OCT Axial Resolution Better than the Theoretical Limit A unique method to spatially separate features in microscopic samples along their depth, Z, is to employ the peculiarity of the invention, where the sample path is composed from two paths at substantially 90 degrees. With reference to FIG. 18, let us consider the topography of the sample 4, c(x,y) in front of the camera 61,62 flat, while the topography facing the excitation launcher 2, e(y,z) is flat but tilted along three different angles in the detection plane, (X,Z). The first sketch on the left is that of a sample 4 whose flat surface is perpendicular to the direction of the excitation sample wave 30, while the next two sketches exhibit large tilts, quantified by an angle β with the direction of the excitation sample wave 30. In the middle sketch, the ray along z travels the distance δ more in air than the ray along z'. In the sketch on the right, the ray along z' travels a distance δ more in air than the ray along z. The two rays, that are parts of the excitation sample wave 30, at coordinates z and z', considered within the thickness of the light sheet 3, illuminate two scattering centres in the sample 4, a and b. For simplicity, the refraction at the surface is ignored for the moment, a detailed calculation of path lengths is presented in FIG. 19. Underneath each case, the A-scan 101 image obtainable by OCT is shown, where the two blobs a' and b' signify the relative position along the OPD of the two peaks in the A-scan 101, due to scattering at a and b in the sample 4. For the first sketch, the distance between the peaks a' and b' is that expected between the scattering centres, given by the path of the scattered sample wave, n(z'−z), where n is the index of refraction of the sample 4. In the middle sketch, the distance is elongated due to the extra path length of the excitation length by (n−1)δ, while for the sketch of the sample 4 on the right, the distance is compressed by the same value of the path length of the excitation length, (n−1)δ. This immediately shows that if the distance between a and b is less than the axial resolution of OCT, by deforming the biologic specimen as shown in the middle sketch, a worm for instance, or by using a container or a microfluidic device with the shape in the middle, in the A-scan produced by the invention, the two points a' and b' become distinguishable.

Figure 19:
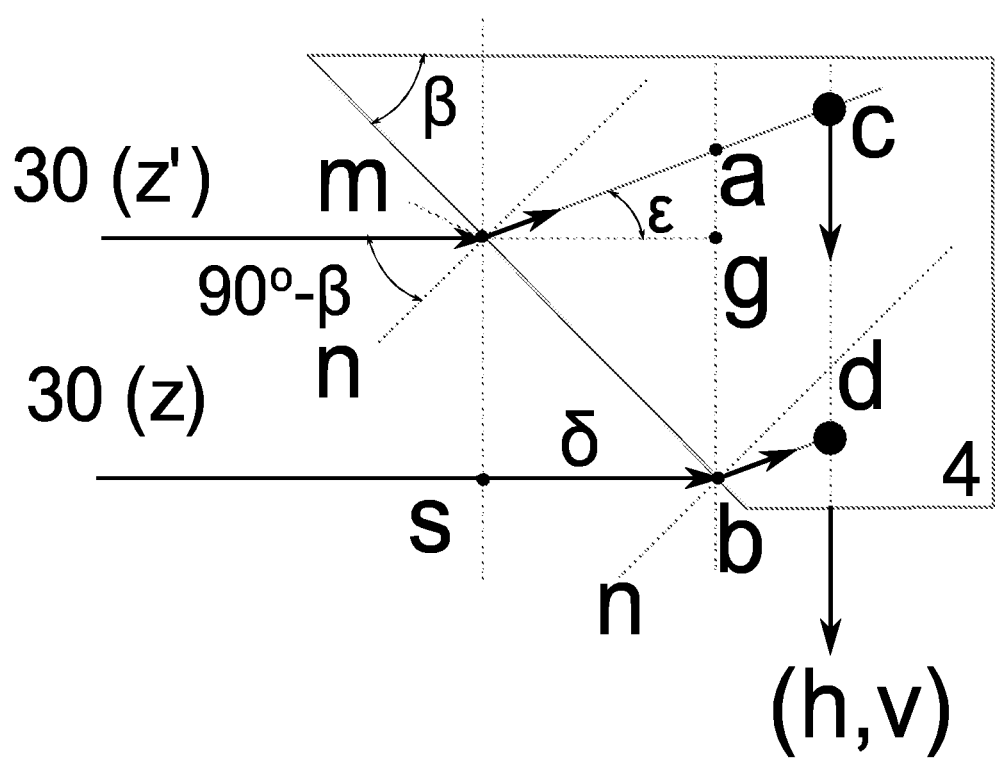
FIG. 19 shows an accurate calculation of path variation along the axial coordinate of the OCT A-scan due to the tilt of the sample in front of the excitation launcher.

The sketches in FIG. 18 are approximative, an accurate sketch of rays is shown in FIG. 19. Due to refraction at the surface of sample 4, the rays are deflected up from points of impact m and b, to scattering centres c and d along the line of sight of the pixel (h,v). The scattering centres c and d intercepted by the two rays from the excitation sample wave will be at a distance along Z of different length than z'−z. The OPD between the two paths along z and z' are given by the length ma in the sample plus the length ab in the sample (larger than z'−z) minus the length sb=δ in air. δ/mb=cos β, gb/mb=sin β. ag/δ=tan ε and tan β=(z'−z)/δ. Considering the normals n to the surface, Snell's law cos β/sin (90°−β−ε)=n=cos β/cos(β+ε). Hence, ab=ag+gb=(z'−z)tan ε/tan β+(z'−z). Using cos ε=δ/ma, the total OPD=n[(z'−z)/ (cos ε tan β)+(z'−z)tan ε/tan β+(z'−z)]−(z'−z)/tan β. This should be compared with n ab=n[(z'−z)tan ε/tan β+(z'−z)]. Their ratio gives a relative extension of:

$$Ex = \frac{\frac{n}{\cos\varepsilon} - 1}{n([\tan\varepsilon + \tan\beta]}$$ (11)

For an angle β=45°, the extension is 25%. For an angle β=25°, the extension is over 80%. These exact calculations show that axial resolution can be improved by more than 50% simply by tilting the specimen.

However these calculations also show that even if topography e(y,z) is ignored, considering samples with smooth variation in topography, the errors along depth for majority of samples can be ignored. A tilt of 45° is rather large and may only be encountered just at the surface when moving the z position of the light sheet 3 to the surface of the sample 4. Even in this case, Ex would be less than 25%, ie the error in distance along depth shown by the relative distance of peaks in the A-scans.

Proof of Concept

A configuration as that shown in FIG. 6b was assembled, using as 2D camera 61 an Andor DV887 camera with a 512×512 pixels sensor and as source 11, a swept source Broadsweeper BS840-01, wavelength tuning range 828-873 nm, linewidth 0.05 nm, maximum tuning rate 200 Hz from Superlum Ireland, tuning 45 nm around 840 nm. This gives:

$Lc=0.88\lambda^2/\Delta\lambda=13.8$ microns.

As sample 4, a rectangular scattering phantom cut out from a translucid semi-transparent porous rubber eraser was used. A simple homogenous sample was chosen to allow measurements. A cylindrical lens 23 of focal length 5 cm created the light sheet 3 launched through the phantom 4. The light sheet 3 thickness was w~30 microns, ie slightly larger than the coherence gate width=$L_c$/n, where n is around 1.4 in biosamples.

The images demonstrate the shift of image stripes with OPD along the lateral coordinate X, unique to the invention when the depth of the en-face OCT is advanced. Compound signals for all 512×512 pixels were assembled from 2R=450 frames. 6 en-face OCT images are shown in FIG. 20a from 6 depths corresponding to 6 values for r, out of a total set R=225 of OPD sampling points. The axis X is oriented horizontally, parallel to coordinate h, pixel number, as in FIG. 4b, where the excitation sample wave 30 comes from the left. Images shows en-face stripes. As the number shown for r progresses, OPD progresses, from first image at the top to bottom by Δr=150−70=122. The depth interval estimated from axial range measurements using a micrometer screw moving a translation stage in place of 77 in FIG. 6b, is δz=12.7 microns, giving Δz=δzΔr=1.55 mm. The images show that the width of the stripe slightly increases with the length EL travelled by the excitation sample wave 30 through the sample 4, as commented in the section Signal Processing. The centre of the stripe progresses from first image at the top to bottom by Δh=440−40=400 pixels. Considering the pixel pitch $p_x$ corrected for magnification, ie projected over the sample along X of 2.48 microns, this gives a displacement along X, Δx=Δh$p_x$=992 microns. This large OPD variation in the transversal direction of the OCT image is unique to the invention. An approximate index of refraction is obtained as: Δz/Δx=1550/992~1.56. (A measurement with a separate OCT system gave n~1.5).

The thickness of the stripes is ~35 lateral pixels, ie ~74 microns. Dividing this interval by the Lc/n, gives a range δr~8, is more than w/($L_c$/n)~3 estimated from the measurement of the light sheet thickness w. The wider value of the stripes than expected may be due to the trailing edge of the excitation sample wave 3, multiple scattering, and elongation of the light sheet 3 away from its focus (as shown in FIG. 4a).

Figures 2A, 2B:
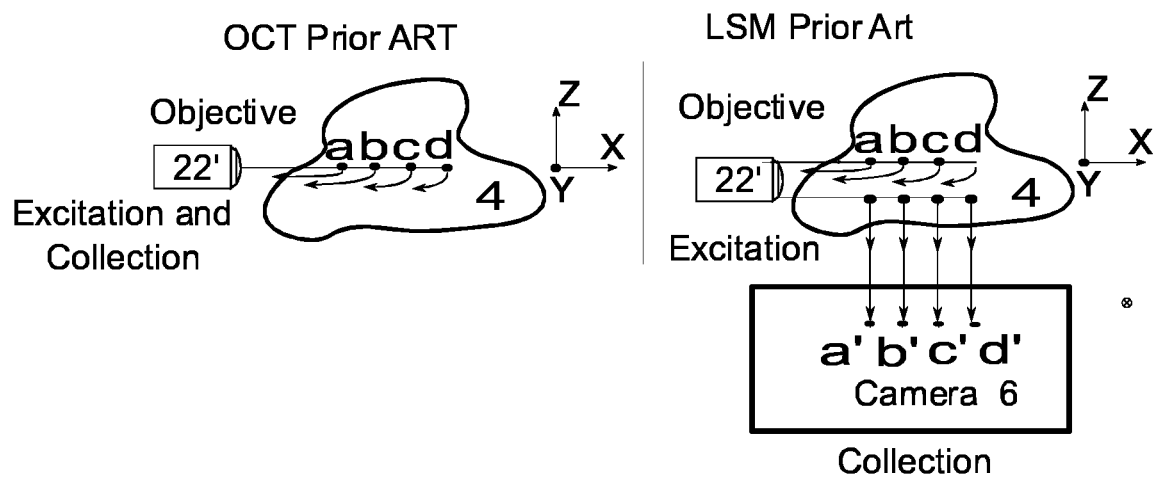
FIG. 2 shows the rays collected by CM and OCT on one hand and the LSM on the other hand, all in prior art.
Figures 20B, 20C, 20D:
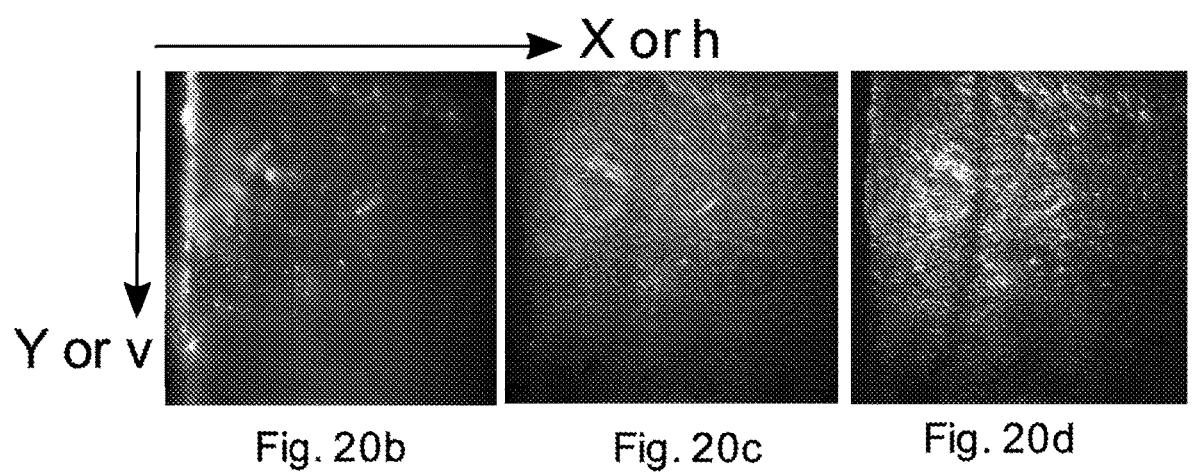

FIG. 20b shows the LSM image of the rubber obtained by covering the reference wave, while FIG. 20c represents a simple superposition of the R=225 en-face OCT images, leading to a typical LSOCM image. FIG. 2c presents similar features as in FIG. 20b, with the difference that in order to see inside the LSM image in FIG. 20b, the camera gain was largely increased to the level that saturation occurred at the surface facing the excitation sample wave and at some of the internal features. In comparison, the LSOCM image in FIG. 20c exhibits a better dynamic range. The fact that a sufficiently good image is obtained even without subtraction of OCT images (aimed at reducing the effect of forward scattering mentioned in the section on signal processing), proves that the system can deliver sufficiently good images even without an exact evaluation of the attenuation coefficients of the excitation sample wave 30 from one image to next in the panel in FIG. 20a.

Otherwise, for a more correct reproduction of brightness in the image, equation (10) should be used. Let us simplify by saying that the $1^{st}$ image is along row $h_1$, due to the front edge of the excitation sample wave 30, as shown in FIG. 16. In the $2^{nd}$ images rows 1 and 2 are illuminated, the image in row $h_1$ is now due to the trailing edge of the excitation sample wave 30 (as shown in FIG. 16') and the row ha due to the front edge of the excitations sample wave 30. $2^{nd}$ image can be multiplied by a correction coefficient to bring the intensity of the area covered by row $h_1$ in both images to the same value and then the first image is deducted from this corrected image. The result is a $2^{nd}$ image having brighter pixels in row $u_2$ only. The $3^{rd}$ image extends over pixels in rows $h_1$, $h_2$ and $h_3$. The strength of interference of signal delivered by pixels in row $h_3$ is given by interference of the front edge of the excitation sample wave 30 with the reference wave 70 while the pixels illuminated in the rows $h_1$ and $h_2$ are due to interference of the reference wave 70 with the trailing edges of the excitation sample wave 30. A corrected $3^{rd}$ image for attenuation is obtained by multiplying the $3^{rd}$ image with a factor that brings the integral of areas of rows $h_1$ and $h_2$ in the 3rd image similar to the integral or areas of rows $h_1$ and $h_2$ in the $2^{nd}$ image, and then the $2^{nd}$ image is deducted from it. The result is a 3rd image having bright pixels in row $u_3$ mainly, some residue will be left behind in rows $h_1$ and $h_2$. The procedure is then continued in the same way to all other 3 images. In this way, new 5 images are generated that exhibit narrower stripes mainly in those rows corresponding to interference of the reference wave with the front edge of the excitation sample wave 30. In fact such a procedure estimates the weighing coefficients in equation (10), $g_h^j$. Other procedures may be devised as well considering the compound attenuation of areas of lit pixels.

A LSOCM image can now be assembled from the first and the new 6 images having contributions mainly from the interference of the front edge of the excitation sample wave 30 with reference wave 70. In this way, better uniformity in the overall LSOCM image is obtained. Such an image is shown in FIG. 20d, where simple subtraction between adjacent en-face frames was used with no correction for attenuation as described above applied to all R images. This shows that even with no correction for attenuation of the excitation sample wave 30, the LSOCM image displays a more homogenous intensity than the LSM image in FIG. 20b and with better contrast than the LSOCM in FIG. 20c.

As expected, no difference is obtained between the structure in the LSOCM adding all rows in all images together (such as FIG. 20c) and the LSOCM where contributions of the trailing edge of the excitation sample wave 30 is reduced, by subtraction of previous images (FIG. 20d). This feature was commented in relation to forming a LSOCM image above, as its structure is determined laterally by the camera 61 or 62, while the depth information in the A-scans is irrelevant. The improvement in using the procedure based on equation (10) only leads to closer distribution to reality of brightness amongst the pixels, otherwise, the pixels where the excitation sample wave was stronger (left side of images) and with high energy distributed in the trailing edge of the excitation sample wave will show brighter than normal due to their inclusion in the final image for more than once.

Compatibility with Conventional Fluorescence LSM

By simply blocking the reference wave, as shown in FIG. 12, by inserting an opaque screen, 97, sequential LSM regime is obtained. By adding a filter, 96 in front of the camera 61, as shown in FIG. 12, allows fluorescence, or Raman or STED imaging. This can be applied to all other embodiments in FIG. 6a, 6b,7,8,9,10,11,14,15 to generate fluorescence, or Raman or STED images with pixel to pixel correspondence. A fluorescence filter composed from an emission filter rejecting the excitation light and a band pass filter for the fluorescence, 96, can be mechanically rolled in front of the 2D camera 61 in FIG. 6b, 7, 8, 9, 10, 14, 15 or in front of the 1D camera 62 in FIGS. 11 and 12. In those embodiments where a splitter 74 is used to superpose the reference wave 70 to scattered wave 40, the splitter 74 can also act as a fluorescence filter, 96. In such cases, to switch to non OCT regimes, the only step needed is to block the reference wave 70.

The LSOCM image so obtained from stripes of coherence gated images, either using SSOCT or TDOCT in the above embodiments, presents the following advantages in comparison with a conventional LSM 1. Enhanced sensitivity, due to the local reference wave, 70, that acts as an amplifier effect of the weak scattered sample wave, 40, as prove by the images in FIGS. 20c and 20d;
2. Having access to the complex-valued wave provided by interference, novel functionality is achieved in dynamic characterisation, allowing quantification of growth, flow, diffusion, cell migration and division. Phase information can be used to provide functional information, 35 supplied by phase differences to display dynamic small movement of sample parts, as an exhibition of liveliness or flow. This can be obtained by using either complex processing of FFT as well as complex Master slave (CMS) method. As the CMS generates a complex mask, a relative phase can be recovered as well along the optical frequency coordinate, as disclosed in the patent U.S. Pat. No. 10,760,893.
3. Display of indices of refraction variation in top of structural information. The invention refers uniquely to measuring the index of refraction variation by using information along the lateral size of the image, which offers a new type of information to be explored in microscopy.

The embodiments presented are not exhaustive, have been presented as a matter of example and modifications only. For instance, extra OCT system 105 is illustrated by way of example, in detail in FIG. 7 only, but equally could be added to the other embodiments in the same spirit.

To maximise interference, control of polarisation is needed, and such polarisation controllers including polarisers and wave plates, may be included along any path of the excitation sample wave 30, scattered sample wave 40 or reference wave 70, using either free space devices or in-fibre devices.

It should also be obvious for those skilled in the art, that excitation can be applied from two opposite directions to avoid attenuation of light along axis X, as presented in "Even fluorescence excitation by multidirectional selective plane illumination microscopy (mSPIM)" by Jan Huisken and Didier Y. R. Stainier, published in Optics Letters 32.17 (September 2007), pp. 2608-2610. For OCT operation, optical switches can be incorporated to sequentially switch the direction of excitation.

Where a scanner is mentioned, this can equally be implemented using a galvo scanner, a resonant scanner, an acousto-optic modulator or an electrooptic modulator, according to means known by those skilled in the art.

Alternatively, for those skilled in the art it is obvious that the embodiments in FIGS. 10, 11, and 12 can also be implemented using a single scanner, in which case both facets of the tilting mirror are used, mounted on a single scanner implementing the function of light deflection for both scanners 25 and 75, where the two waves, excitation sample wave 30 and reference wave 70 use the opposite facets of the mirror on the scanner shaft. One facet is used to deflect the excitation sample wave 30 towards the sample 4 and the other facet of the mirror to deflect the reference wave 70. This may involve the use of mirrors and lenses or other reflecting converging passive devices, according to means known in the art (not shown).

Excitation launcher 2 was shown separated from the forming image interface 5 in FIG. 3 and in the detailed embodiments, however it should be obvious for those skilled in the art that their functions can be incorporated by using a single microscope objective, with oblique direction of the excitation sample wave 30 through the extremity of the microscope objective and collection of the scattered sample wave 40 through the centre or the opposite side of the same microscope objective. Different procedures are known to those skilled in the art, such as using a mirror in the excitation block 2 to deflect the excitation sample wave 30, as described in the paper "Single objective light-sheet microscopy for high-speed whole-cell 3D super-resolution", by Meddens M B M, Liu S, Finnegan P S, Edwards T L, James C D and Lidke K A, published in Biomedical Optics Express, 7, 2219-2236, (2016), https://doi.org/10.1364/BOE.7.002219.

Full field in the context of the disclosure means simultaneous illumination of all pixels in a 2D or 1D camera.

Adjustment of optical path length was shown by using means in the reference path of the OCT interferometers, however equally they can be applied into the sample path according to procedures known by those skilled in the art.

Where two lenses have been used in a telescope, such as lenses 51 and 52, it should be understood that equally, a single lens or a single microscope objective can be employed, as known in the art and the beamsplitter 74 between the two lenses employed to superpose the reference wave, shifted to other parts of the optics, according to means known in the art.

Equally, a single microscope objective or lens can be replaced by a group of microscope objectives and lenses.

As a matter of preference, embodiments are using refractive elements, but this is not a limitation of the invention and any such element can be equally replaced with reflective elements.

Fibre splitters and plate beamsplitter have been shown as a 2 inputs by 2 outputs splitting elements, but equally, other splitting elements can be employed such as cube beamsplitters, and where a fibre or bulk optics splitter was employed, a bulk splitter and respectively a fibre element can be employed instead.

Shape conditioning of the reference wave was shown using spherical lenses, cylindrical lenses, however other arrangements are possible, as known by those skilled in the art. These may include combinations of slits with cylindrical lenses, to spatially filter the reference wave, or spatial light modulators (SLM)s to create a 1D distribution of the reference wave 70.

The invention claimed is:

1. Apparatus for imaging a sample, comprising:
an optical source of coherence length $L_c$ in air, where $L_c$ is less than 20 microns;
a photodetector block, wherein the photodetector block comprises an array of H photodetectors;
wherein the optical source is arranged to drive a first optical splitter with two outputs, where the first optical splitter is arranged such that, at its 1st output, an excitation sample wave is sent towards an excitation launcher, wherein the excitation launcher is arranged to launch the excitation sample wave along an axis X towards the sample to be imaged, irradiating H scattering centres $x_1, x_2, \ldots x_h, \ldots x_H$ in the sample, and where the spatial extension of the excitation sample wave along its transversal direction, w, is less than $11L_c$,
wherein from each scattering centre $x_h$, the excitation sample wave is scattered into a component scattered sample wave along a detection path,
where the component scattered sample wave travels a length SL(h) up to pixel h of the array of the photodetector block;
where the fraction of the excitation sample wave intercepted by the scattering centre h, leading to the scattered sample wave, represents a component of the excitation sample wave, with $h=1, 2 \ldots H$, where each such component travelled a length EL(h) from the first optical splitter up to scattering centre at $x_h$,
where the detection path is along an axis Z that makes a detection angle that is substantially perpendicular to the direction of the excitation wave, X, and where the axis Z is also along the depth direction in the sample,
a forming image interface placed along the detection path,
conveying the H component scattered sample waves onto the photodetector block,
where the photodetector block is oriented substantially perpendicular to the detection path,
where the forming image interface forms an image of each scattering centre in the sample at $x_1, x_2, \ldots x_h, \ldots x_H$ onto respective photodetectors $1, 2, \ldots h, \ldots H$ of the array of the photodetector block,
and where due to travelling through the sample, due to the optical properties of the sample and due to the geometrical distance between scattering centres $x_h$ and $x_{h+1}$ along axis X,
the component excitation sample wave travelling from the scattering centre at $x_{h-1}$ to the scattering centre at $x_h$ encounters an optical path length variation $\Box EL(h)$ given by the product of the distance between $x_{h-1}$ and $x_h$ multiplied by n, where n is the index of refraction of the sample, and
where the first optical splitter is arranged such the $2^{nd}$ output of the $1^{st}$ optical splitter delivers a reference wave that is conveyed towards the photodetector block via a reference block,
where the reference block is equipped with a device to adjust the length of the reference wave travelled RL(h) from the point of splitting in the $1^{st}$ optical splitter through the reference block up to each photodetector h of the photodetector block, and where
the optical path difference OPD(h) between the path lengths EL(h)+SL(h) and RL(h) differ from photodetector h to photodetector h+1,
where the variation of OPD(h) from one edge of the photodetector block to the other measured within the detection plane, |OPD(H)−OPD(1)|, is greater than $50L_c$,
and where the optical source, the $1^{st}$ optical splitter and the two paths lengths travelled by each component excitation sample wave plus each component scattered sample wave up to the photodetector h on one side and the path travelled by the reference wave up to photodetector h on the other side, form a two beam interferometer for each photodetector h, where such H interferometers present similar optical coherence tomography axial resolution intervals of $L_c$,
where the apparatus further comprises:
a signal processing block for processing the signals delivered by the H photodetectors of the array, wherein the signal processing block is configured to carry out a procedure to process the interference signal due to superposition of scattered sample waves and reference wave on each photodetector h,
where the signal processing block produces a raw en-face image of scattering centres $x_1, x_2, \ldots x_h, \ldots x_H$, whose intensity for each photodetector in the image is modulated by the strength of interference of signal from respective photodetectors $1, 2, \ldots h, \ldots H$ and where the depth resolution of the en-face image along Z is due to the combined effect of the thickness of the excitation sample wave, w, and of the coherence length in the sample, obtained by dividing the coherence length in air, $L_c$, by the index of refraction n of the sample.

2. Apparatus for imaging according to claim 1 wherein the array of photodetectors of the photodetector block is either:
a one-dimensional (1D) array of photodetectors, (1, 2, ... h, ... H); or
a two-dimensional (2D) array of photodetectors (H, V), where in both cases each photodetector represents a pixel.

3. Apparatus for imaging, according to claim 1, where the reference block prepares a tilted reference wave reaching the photodetector array by an angle θ, where the direction of the reference wave is within the plane formed by axis X and the detection path Z, and where the forming image interface creates the image of line of scattering centres $x_1, x_2, \ldots x_H$ with a magnification m, where sin θ=n/m, where n is the average index of refraction of the sample and where by adjusting the angle θ the RL(h) variation is adjusted to match the EL(h) variation along the row of photodetectors 1,2, ... H.

4. Apparatus for imaging, according to claim 1, where the excitation launcher comprises a cylindrical lens, that is used to generate a light sheet propagating through the sample along X, extending along an axis Y substantially perpendicular to axis X, and substantially perpendicular to axis Z, creating V distinctly resolved lines of light along axis X at positions $y_1, y_2, \ldots y_v, \ldots y_V$ along axis Y and where different sets of scattering centres $x_1, x_2, \ldots x_H$ along each such line at $y_v$, scatter waves, $SW(y_1), SW(y_2), \ldots SW(y_v), \ldots SW(y_V)$ each composed of H scattered sample waves and in order to intercept the V lines of scattered sample waves, the apparatus further comprises a 2D camera array of (H,V) photodetectors,
where the forming image interface projects each line of scattered sample waves from line $y_v$, on a different line v of the array of photodetectors part of the 2D camera, where H and V are positive integers and each is greater than or equal to 2.

5. Apparatus for imaging, according to claim 4, where the 2D camera is placed behind a fibre bundle.

6. Apparatus for imaging, according to claim 1, where the excitation launcher comprises: (i) an excitation optics interface that prepares a thin excitation beam or prepares an Airy or a Bessel excitation beam, and (ii) an excitation scanner of light from the excitation optics interface, that scans the excitation sample wave in the Y direction, wherein the Y direction is substantially perpendicular to axis X and axis Z, creating V distinctly resolved lines of light extending along X at scanned positions $y_1, y_2, \ldots y_v, \ldots y_V$, and where different sets of scattering centres $x_1, x_2, \ldots x_H$ along each such line at $y_v$ along X, scatter distinct waves, $SW(y_1), SW(y_2), \ldots SW(y_v), \ldots SW(y_V)$, each composed of H scattered sample waves, and in order to intercept the V lines of sample waves, the photodetector block further comprises V 1D arrays each of H photodetectors in the form of a 2D camera array of (H,V) photodetectors, where the forming image interface projects the scattered waves from scattering centres along line $y_v$, on a different line v of 1D array of photodetectors part of the 2D camera, where H and V are positive integers and each is greater than or equal to 2.

7. Apparatus for imaging, according to claim 1, where the excitation launcher comprises: (i) an excitation optics interface that prepares a thin excitation beam or prepares an Airy or a Bessel excitation beam, and (ii) an excitation scanner of light from the excitation optics interface, that scans the excitation beam in the Y direction substantially perpendicular to axis X and axis Z, creating V distinctly resolved lines of light extending along X at scanned positions $y_1, y_2, \ldots$ $y_v, \ldots y_V$, and where different sets of scattering centres $x_1, x_2, \ldots x_H$ along each such line at $y_v$, scatter distinct waves $SW(y_1), SW(y_2), \ldots SW(y_v), \ldots SW(y_V)$, each composed of H scattered sample waves, and in order to incept the successive lines of scattered sample waves, the apparatus supplementary comprises a de-scanning scanner in the forming image interface to project each of the V scattered wave for each line $y_v$ of scattered waves onto the photodetector block, where H and V are positive integers and each is greater than or equal to 2.

8. Apparatus for imaging, according to claim 7, where the de-scanning scanner and the excitation scanner are provided by the same scanner using a mirror with two facets, one for the excitation sample wave and the other for the reference wave.

9. Apparatus for imaging, according to claim 1, where the optical source is a swept source, and where the coherence length $L_c$ is inversely proportional to its tuning bandwidth, and where the signal processing block comprises a storage for the signal delivered by each h pixel obtained from all 2R camera frames acquired during one frequency sweep of the swept source, where the storage is used to create from all stored values a pixel composed signal for each pixel h with 2R samples, and where either:
(i) the procedure of the signal processing block is Fast Fourier Transformation and the signal processor comprises of a Fourier transform block that performs a Fourier transform over the pixel composed signal to produce a reflectivity profile in depth A-scan covering for each h, a number of R OPD(h) values along the coordinate Z,
or
(ii) the procedure of the signal processing block is Complex Master Slave OCT and the signal processor comprises of a Complex Master Slave processor for each h, R OPD(h) values out of the set of 1, 2, ... R samples in depth along the Z axis.

10. Apparatus for imaging, according to claim 1, where the optical source is a broadband source, where the coherence length $L_c$ is inverse proportional to its bandwidth, and where the signal processing block controls repetitions of image collection for at least 3 different OPD values differing by less than a central wavelength of the optical source obtained by actuating on a device to adjust the length of the reference wave.

11. Apparatus for imaging, according to claim 6, where a $2^{nd}$ reference wave is produced from the optical source by using a $2^{nd}$ optical splitter, that conveys a $2^{nd}$ reference wave and where the sample returns backreflected light via the excitation scanner and the $1^{st}$ splitter towards a $3^{rd}$ splitter to produce interference between the backreflected wave from the sample and the $2^{nd}$ reference wave in a $2^{nd}$ OCT system equipped with a point photodetector, and where the signal processing block combines the information from the sample wave towards the photodetector block with the information provided by the point photodetector.

12. Method to produce coherence gating images of a sample, the method comprising:
using an optical source of coherence length $L_c$, where $L_c$ is less than 20 microns, that is split in a splitter into an excitation sample wave and a reference wave,
where the spatial extension of the excitation sample wave along its transversal direction, w, is less than $11L_c$,
using at least a 1D array of photodetectors h=1, 2 ... H in a camera, oriented perpendicular to a detection direction, and where the excitation sample wave is launched towards a sample with scattering centres along an excitation direction substantially parallel to the camera, to excite the sample, and where the excitation direction is substantially perpendicular to the detection direction, where the detection direction and excitation directions define a detection plane and where the scattering centres in the sample generate scattered sample waves along the detection direction intercepted by a forming image interface that conveys an image on the camera of the scattering centres in the sample and where due to the non-zero value of the angle between the detection direction and the excitation direction and due to the index of refraction of the sample, the length travelled by the excitation sample wave through the sample varies by a differential path |x'-x| from a scattering centre at x to the next at x', where the scattering centres at x and x' are conjugate via the forming image interface with camera photodetectors h and h+1 respectively, from a camera photodetector h to next, h+1 in its row placed in the detection plane, and where the signals produced by each camera photodetector h are subject to coherence gating, that is implemented by using the reference wave superposed on the camera, and where for each photodetector h, an optical path difference OPD(h) is defined between: (i) the length of the sample wave from the splitter up to photodetector h made from the length of the excitation sample wave up to the scattering centre x and the length of the scattering sample wave from the scattering centre up to photodetector h and (ii) the length of the reference wave from the splitter up to photodetector h, and a signal processing procedure is applied to the signal from each photodetector to: (i) evaluate its strength of interference versus OPD, (ii) integrate the interference signal along OPD axis to deliver an overall strength of interference signal from each photodetector and (iii) produce an interference 1D en-face image of pixels, with a pixel for each photodetector by using for each pixel signal, the overall strength of interference so evaluated for each respective photodetector and where the thickness of the en-face image is determined by a combination of two factors, the thickness of the excitation sample wave w and the coherence length in the sample, $L_c/n$, where n is the index of refraction of the sample.

13. Method to produce coherence gating images of a sample according to claim 12 where the interference en-face image is assembled from the overall strengths of interference for all H pixels, irrespective of the EL(h) value imprinted by the variation of path length from one pixel to the next.

14. Method to produce coherence gating images of a sample according to claim 12 where elementary en-face 1D OCT images are each acquired for a different OPD(h), and where the image for OPD(h−1) is deducted from the image for OPD(h) to obtain an en-face corrected OCT image with brighter pixels in the image mainly corresponding to photodetectors in the row h, and where the interference en-face image is assembled by superposing all en-face corrected OCT images for all H pixels.

15. Method to produce coherence gating images of a sample according to claim 12, where supplementary, a V number of 1D array of photodetectors h=1, 2 . . . H are used in a 2D camera of (H,V) photodetectors with v=1,2, . . . V and where the sample is excited with a light sheet parallel with the camera plane and where an interference 2D en-face image of pixels, with a pixel for each photodetector is assembled from the supplementary 1D en-face interference images for each v.

16. Method to produce coherence gating images of a sample according to claim 12 where the signal processing procedure uses a reference wave inclined on the camera at an angle θ, where sin θ=n/m, where n is the average index of refraction of the sample and m the magnification of the forming image interface creating an image of the sample on the camera.

17. Method to produce coherence gating images of a sample according to claim 12, where the optical source is a swept source, and where a pixel composed signal for each camera pixel is created from the pixel values of all camera frames acquired during one frequency sweep of the swept source, to produce full field swept source OCT images from the sample, obtained by processing the pixel composed signal for each pixel.

18. Method to produce coherence gating images of a sample according to claim 12, where the excitation sample wave is being scanned in a plane intersecting the sample, that sequentially covers line by line a sheet of light through the sample using a first scanner and where the camera comprises a 1D array of photodetectors, and a second scanner is used inside the forming image interface in such a way as to produce a stationary image of the scattered sample wave projected over the camera irrespective of the tilt of the first scanner.

19. Method to produce coherence gating images of a sample according to claim 12 where the signal processing procedure applied to cope with the path variation from one pixel to the next employs either: (i) a Fast Fourier Transform (FFT) method to process the pixel composed signal for each pixel, where from one pixel in the camera to the next along the excitation direction, the A-scans resulting by FFT are shifted relatively in depth by the differential path D, or (ii) a Complex Master Slave (CMS) method using a set of masks to process the pixel composed signal for each pixel, where from one pixel in the camera to the next along the excitation direction, the set of masks input to the CMS method is advanced by δEL(x'−x).

20. Method to produce coherence gating images of a sample according to claim 12, where the information on the pitch of pixels in the camera is combined with the optical delay measured by the procedure used by the signal processing block to infer information on the index of refraction of the sample.

21. Method to produce coherence gating images of a sample according to claim 12, where by deforming the sample in front of the forming image interface, expansion of optical path inside the sample allows better axial resolution than $L_c/n$, where n is the index of refraction of the sample.

* * * * *